US012293147B2

(12) United States Patent
Foss et al.

(10) Patent No.: US 12,293,147 B2
(45) Date of Patent: May 6, 2025

(54) DEVICE, METHOD, AND GRAPHICAL USER INTERFACE FOR ANNOTATING TEXT

(71) Applicant: Apple Inc., Cupertino, CA (US)

(72) Inventors: Christopher P. Foss, San Francisco, CA (US); Patrick Lee Coffman, San Francisco, CA (US); Jason Clay Beaver, San Jose, CA (US); Toby Charles Wood Paterson, San Francisco, CA (US); Alastair Kenneth Fettes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 17/085,779

(22) Filed: Oct. 30, 2020

(65) Prior Publication Data
US 2021/0049321 A1    Feb. 18, 2021

Related U.S. Application Data

(63) Continuation of application No. 16/333,103, filed as application No. PCT/US2017/053172 on Sep. 25, 2017, now Pat. No. 10,860,788.
(Continued)

(51) Int. Cl.
*G06F 17/00* (2019.01)
*G06F 3/0483* (2013.01)
(Continued)

(52) U.S. Cl.
CPC .......... *G06F 40/169* (2020.01); *G06F 3/0483* (2013.01); *G06F 3/04883* (2013.01);
(Continued)

(58) Field of Classification Search
CPC .. G06F 40/169; G06F 3/0483; G06F 3/04883; G06F 3/04886; G06F 40/171; G06F 2203/04803; G06F 2203/04808
See application file for complete search history.

(56) References Cited

U.S. PATENT DOCUMENTS 5,155,813 A    10/1992  Donoghue et al.
5,367,353 A    11/1994  Amanuma et al.
(Continued)

FOREIGN PATENT DOCUMENTS

CN    101667100 A    3/2010
CN    103135915 A    6/2013
(Continued)

OTHER PUBLICATIONS

Conroy, Kevin. Digital Document Annotation and Reflow. Diss. Thesis, University of Maryland at College Park, 2004 (Year: 2004).*
(Continued)

*Primary Examiner* — Andrew T McIntosh
(74) *Attorney, Agent, or Firm* — Kubota & Basol LLP

(57) ABSTRACT

In accordance with some embodiments, a method is performed at a device with one or more processors, non-transitory memory, and a touch-sensitive display. The method includes displaying, on the touch-sensitive display, a text region that includes a first portion of text and a second portion of text. The method includes detecting, on the touch-sensitive display, an input within the text region. The method includes, in response to detecting the input within the text region, moving the first portion of text relative to the second portion of text to display a non-text region between the first portion of text and the second portion of text that does not include any text and converting at least a portion of the non-text region into a drawing panel provided to receive drawing input via the touch-sensitive display and display a corresponding graphic in response to receiving the drawing input.

42 Claims, 48 Drawing Sheets

Related U.S. Application Data

(60) Provisional application No. 62/399,322, filed on Sep. 23, 2016.

(51) Int. Cl.
*G06F 3/04883* (2022.01)
*G06F 3/04886* (2022.01)
*G06F 40/169* (2020.01)
*G06F 40/171* (2020.01)

(52) U.S. Cl.
CPC ........ *G06F 3/04886* (2013.01); *G06F 40/171* (2020.01); *G06F 2203/04803* (2013.01); *G06F 2203/04808* (2013.01)

(56) References Cited

U.S. PATENT DOCUMENTS

| | | | |
|---|---|---|---|
| 5,367,453 A | 11/1994 | Capps et al. | |
| 5,956,020 A | 9/1999 | D'Amico et al. | |
| 6,323,846 B1 | 11/2001 | Westerman et al. | |
| 6,570,557 B1 | 5/2003 | Westerman et al. | |
| 6,611,258 B1 | 8/2003 | Tanaka et al. | |
| 6,677,932 B1 | 1/2004 | Westerman | |
| 7,028,253 B1 | 4/2006 | Lieberman et al. | |
| 7,259,752 B1 | 8/2007 | Simmons | |
| 7,489,306 B2 | 2/2009 | Kolmykov-Zotov et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,159,501 B2 | 4/2012 | Rao | |
| 8,239,784 B2 | 8/2012 | Hotelling et al. | |
| 8,279,180 B2 | 10/2012 | Hotelling et al. | |
| 8,379,047 B1 | 2/2013 | Diverdi | |
| 8,381,135 B2 | 2/2013 | Hotelling et al. | |
| 8,479,122 B2 | 7/2013 | Hotelling et al. | |
| 8,493,340 B2 | 7/2013 | Tremblay | |
| 8,587,526 B2 | 11/2013 | Engelhardt et al. | |
| 8,638,320 B2 | 1/2014 | Harley et al. | |
| 8,638,385 B2 | 1/2014 | Bhogal | |
| 8,736,575 B2 | 5/2014 | Kasahara et al. | |
| 8,847,983 B1 | 9/2014 | Ranganathan | |
| 8,910,253 B2 | 12/2014 | Johnson et al. | |
| 8,928,635 B2 | 1/2015 | Harley et al. | |
| 8,994,698 B2 | 3/2015 | Diverdi et al. | |
| 9,058,595 B2 | 6/2015 | Coffman et al. | |
| 9,075,464 B2 | 7/2015 | Mankowski et al. | |
| 9,223,464 B2 | 12/2015 | Mandre | |
| 9,268,997 B2 | 2/2016 | Sheth et al. | |
| 9,348,458 B2 | 5/2016 | Hotelling et al. | |
| 9,354,728 B2 | 5/2016 | Yilmaz et al. | |
| 9,430,141 B1* | 8/2016 | Lu ...................... G06F 3/04883 | |
| 9,753,556 B2 | 9/2017 | Bernstein et al. | |
| 9,933,937 B2 | 4/2018 | Lemay et al. | |
| 9,959,037 B2 | 5/2018 | Chaudhri et al. | |
| 10,079,786 B2 | 9/2018 | Yamakawa et al. | |
| 10,120,561 B2 | 11/2018 | Stewart et al. | |
| 10,168,899 B1 | 1/2019 | Feiszli et al. | |
| 10,241,627 B2 | 3/2019 | Yoon | |
| 10,338,783 B2 | 7/2019 | Barrus et al. | |
| 10,338,793 B2 | 7/2019 | Fisher | |
| 10,445,703 B1 | 10/2019 | Atkins et al. | |
| 11,429,274 B2 | 8/2022 | Missig et al. | |
| 2002/0015024 A1 | 2/2002 | Westerman et al. | |
| 2002/0048404 A1 | 4/2002 | Fahraeus et al. | |
| 2002/0059350 A1 | 5/2002 | Iwema et al. | |
| 2002/0107885 A1 | 8/2002 | Brooks et al. | |
| 2003/0071850 A1 | 4/2003 | Geidl | |
| 2003/0214539 A1 | 11/2003 | Iwema et al. | |
| 2004/0070573 A1 | 4/2004 | Graham | |
| 2004/0085301 A1 | 5/2004 | Furukawa et al. | |
| 2004/0252888 A1* | 12/2004 | Bargeron ............ G06V 30/1423 382/188 |
| 2005/0156915 A1 | 7/2005 | Fisher | |
| 2005/0183005 A1* | 8/2005 | Denoue ................ G06F 40/169 715/255 |
| 2005/0190059 A1 | 9/2005 | Wehrenberg | |
| 2005/0262164 A1 | 11/2005 | Guiheneuf et al. | |
| 2006/0010396 A1 | 1/2006 | Beezer et al. | |
| 2006/0017692 A1 | 1/2006 | Wehrenberg et al. | |
| 2006/0033724 A1 | 2/2006 | Chaudhri et al. | |
| 2006/0071910 A1 | 4/2006 | Kim et al. | |
| 2006/0092138 A1 | 5/2006 | Kim et al. | |
| 2006/0197753 A1 | 9/2006 | Hotelling | |
| 2006/0200759 A1* | 9/2006 | Agrawala ............ G06F 40/103 715/209 |
| 2006/0267967 A1 | 11/2006 | Hinckley et al. | |
| 2007/0011651 A1* | 1/2007 | Wagner .................... G06F 8/33 717/110 |
| 2007/0097421 A1 | 5/2007 | Sorensen et al. | |
| 2007/0157076 A1* | 7/2007 | Lin ........................ G06F 40/171 715/231 |
| 2007/0214407 A1 | 9/2007 | Bargeron et al. | |
| 2008/0042978 A1 | 2/2008 | Perez-Noguera | |
| 2008/0094369 A1 | 4/2008 | Ganatra et al. | |
| 2008/0201438 A1 | 8/2008 | Mandre | |
| 2008/0225007 A1 | 9/2008 | Nakadaira et al. | |
| 2008/0228007 A1 | 9/2008 | Hoshino et al. | |
| 2009/0073144 A1 | 3/2009 | Chen et al. | |
| 2009/0161958 A1 | 6/2009 | Markiewicz et al. | |
| 2009/0167728 A1 | 7/2009 | Geaghan et al. | |
| 2009/0187860 A1 | 7/2009 | Fleck et al. | |
| 2010/0095205 A1 | 4/2010 | Kinoshita | |
| 2010/0107099 A1 | 4/2010 | Frazier et al. | |
| 2010/0181121 A1 | 7/2010 | Tremblay | |
| 2010/0293460 A1 | 11/2010 | Budelli | |
| 2010/0306705 A1 | 12/2010 | Nilsson | |
| 2011/0012856 A1 | 1/2011 | Maxwell et al. | |
| 2011/0050601 A1 | 3/2011 | Son et al. | |
| 2011/0140847 A1 | 6/2011 | Schafer et al. | |
| 2011/0164376 A1 | 7/2011 | Tabasso et al. | |
| 2011/0239146 A1 | 9/2011 | Dutta et al. | |
| 2011/0254806 A1 | 10/2011 | Jung et al. | |
| 2012/0032925 A1 | 2/2012 | Sekiya | |
| 2012/0036927 A1 | 2/2012 | Sanders et al. | |
| 2012/0068941 A1 | 3/2012 | Arrasvuori et al. | |
| 2012/0169646 A1 | 7/2012 | Berkes et al. | |
| 2012/0182271 A1 | 7/2012 | Wu et al. | |
| 2012/0206330 A1 | 8/2012 | Cao et al. | |
| 2012/0216150 A1 | 8/2012 | Wernecke | |
| 2012/0229471 A1 | 9/2012 | Takai | |
| 2012/0233270 A1 | 9/2012 | Lee et al. | |
| 2012/0242603 A1 | 9/2012 | Engelhardt et al. | |
| 2012/0262407 A1 | 10/2012 | Hinckley et al. | |
| 2012/0263381 A1 | 10/2012 | Yoshida | |
| 2012/0306778 A1 | 12/2012 | Weeldreyer et al. | |
| 2012/0306927 A1 | 12/2012 | Lee et al. | |
| 2012/0311422 A1 | 12/2012 | Weeldreyer et al. | |
| 2012/0311499 A1 | 12/2012 | Dellinger et al. | |
| 2013/0046544 A1 | 2/2013 | Kay et al. | |
| 2013/0088465 A1 | 4/2013 | Geller et al. | |
| 2013/0106731 A1 | 5/2013 | Yilmaz et al. | |
| 2013/0106766 A1 | 5/2013 | Yilmaz et al. | |
| 2013/0127757 A1 | 5/2013 | Mann et al. | |
| 2013/0136377 A1 | 5/2013 | Luo et al. | |
| 2013/0167086 A1 | 6/2013 | Kim et al. | |
| 2013/0229390 A1 | 9/2013 | Diverdi | |
| 2013/0229391 A1 | 9/2013 | Diverdi | |
| 2013/0242708 A1 | 9/2013 | Cadiz et al. | |
| 2013/0257777 A1 | 10/2013 | Benko et al. | |
| 2013/0263027 A1 | 10/2013 | Petschnigg et al. | |
| 2013/0300719 A1 | 11/2013 | Wang | |
| 2013/0314337 A1 | 11/2013 | Asano | |
| 2013/0326582 A1 | 12/2013 | Kruzeniski et al. | |
| 2013/0328810 A1 | 12/2013 | Li et al. | |
| 2013/0342729 A1 | 12/2013 | Kim et al. | |
| 2014/0019855 A1 | 1/2014 | Kim et al. | |
| 2014/0022193 A1 | 1/2014 | Kim et al. | |
| 2014/0028634 A1 | 1/2014 | Krah et al. | |

(56) References Cited

U.S. PATENT DOCUMENTS

| | | |
|---|---|---|
| 2014/0035845 A1 | 2/2014 | Kameyama |
| 2014/0055427 A1 | 2/2014 | Kim et al. |
| 2014/0059487 A1 | 2/2014 | Baumann et al. |
| 2014/0067965 A1 | 3/2014 | Yamakawa et al. |
| 2014/0068493 A1 | 3/2014 | Moon et al. |
| 2014/0068504 A1 | 3/2014 | Sun et al. |
| 2014/0081610 A1 | 3/2014 | Diverdi et al. |
| 2014/0108004 A1 | 4/2014 | Sternby et al. |
| 2014/0108976 A1 | 4/2014 | Steiner et al. |
| 2014/0108979 A1 | 4/2014 | Davidson et al. |
| 2014/0108989 A1 | 4/2014 | Bi et al. |
| 2014/0152589 A1 | 6/2014 | Komoda et al. |
| 2014/0187318 A1 | 7/2014 | Gallizzi et al. |
| 2014/0194162 A1 | 7/2014 | Tsudik |
| 2014/0210097 A1 | 7/2014 | Chen et al. |
| 2014/0210730 A1 | 7/2014 | Mankowski et al. |
| 2014/0210797 A1 | 7/2014 | Kreek et al. |
| 2014/0210979 A1 | 7/2014 | Richter et al. |
| 2014/0219564 A1 | 8/2014 | Demiya |
| 2014/0245139 A1 | 8/2014 | Lee et al. |
| 2014/0253462 A1 | 9/2014 | Hicks |
| 2014/0253465 A1 | 9/2014 | Hicks et al. |
| 2014/0253521 A1 | 9/2014 | Hicks |
| 2014/0253522 A1 | 9/2014 | Cueto |
| 2014/0267064 A1 | 9/2014 | Lu |
| 2014/0267078 A1 | 9/2014 | Kukulski et al. |
| 2014/0280603 A1 | 9/2014 | Rideout et al. |
| 2014/0331187 A1 | 11/2014 | Hicks et al. |
| 2014/0334732 A1 | 11/2014 | Jung et al. |
| 2014/0337705 A1 | 11/2014 | Glover et al. |
| 2014/0340318 A1 | 11/2014 | Stringer |
| 2014/0354553 A1 | 12/2014 | Dai et al. |
| 2014/0354555 A1 | 12/2014 | Shahparnia et al. |
| 2014/0359410 A1 | 12/2014 | Lee |
| 2015/0007061 A1 | 1/2015 | Mandre |
| 2015/0009155 A1 | 1/2015 | Tsao et al. |
| 2015/0029162 A1 | 1/2015 | Harris et al. |
| 2015/0058718 A1 | 2/2015 | Kim et al. |
| 2015/0058789 A1 | 2/2015 | Namgung et al. |
| 2015/0067469 A1* | 3/2015 | Shuto ............... G06F 40/169 715/232 |
| 2015/0067483 A1* | 3/2015 | Demiya ............ G06F 40/171 715/249 |
| 2015/0069204 A1 | 3/2015 | Daniels et al. |
| 2015/0082217 A1 | 3/2015 | Tumwattana |
| 2015/0089389 A1 | 3/2015 | Cohen-Zur et al. |
| 2015/0106714 A1 | 4/2015 | Jeong et al. |
| 2015/0109257 A1 | 4/2015 | Jalali |
| 2015/0127403 A1 | 5/2015 | Petty |
| 2015/0138127 A1 | 5/2015 | Kurita |
| 2015/0169069 A1 | 6/2015 | Lo et al. |
| 2015/0186348 A1* | 7/2015 | Hicks ................. G06F 40/58 715/769 |
| 2015/0205398 A1 | 7/2015 | Le |
| 2015/0212692 A1 | 7/2015 | Hyun et al. |
| 2015/0221106 A1 | 8/2015 | Winnemoeller et al. |
| 2015/0248235 A1 | 9/2015 | Offenberg et al. |
| 2015/0338949 A1 | 11/2015 | Westerman |
| 2015/0347987 A1 | 12/2015 | Ali |
| 2015/0363035 A1 | 12/2015 | Hinckley et al. |
| 2015/0365306 A1 | 12/2015 | Chaudhri et al. |
| 2015/0370350 A1 | 12/2015 | Hunt et al. |
| 2016/0070686 A1* | 3/2016 | Yu ................... G06F 16/958 715/230 |
| 2016/0070688 A1* | 3/2016 | Yao .................. G06F 40/169 715/232 |
| 2016/0098186 A1 | 4/2016 | Sugiura |
| 2016/0179222 A1 | 6/2016 | Chang |
| 2016/0188017 A1 | 6/2016 | Bell |
| 2016/0259766 A1 | 9/2016 | Ivanov et al. |
| 2016/0299585 A1 | 10/2016 | Lee et al. |
| 2016/0349897 A1 | 12/2016 | Ishikawa |
| 2016/0364025 A1 | 12/2016 | Bernstein et al. |
| 2016/0364026 A1 | 12/2016 | Bernstein et al. |
| 2016/0364027 A1 | 12/2016 | Bernstein et al. |
| 2016/0364091 A1 | 12/2016 | Bernstein et al. |
| 2017/0024178 A1 | 1/2017 | Jeong et al. |
| 2017/0091153 A1 | 3/2017 | Thimbleby |
| 2017/0109032 A1 | 4/2017 | Mélinand et al. |
| 2018/0050592 A1 | 2/2018 | Bouaziz et al. |
| 2018/0081536 A1 | 3/2018 | Ueno et al. |
| 2018/0121074 A1 | 5/2018 | Peron et al. |
| 2018/0129391 A1 | 5/2018 | Files et al. |
| 2018/0239444 A1 | 8/2018 | Siddiqui et al. |
| 2018/0329589 A1 | 11/2018 | Sonnino et al. |
| 2018/0335932 A1 | 11/2018 | Ta |
| 2018/0349020 A1 | 12/2018 | Jon et al. |
| 2019/0212809 A1 | 7/2019 | Tzou et al. |
| 2019/0220109 A1 | 7/2019 | Bernstein et al. |
| 2019/0220507 A1 | 7/2019 | Foss et al. |
| 2019/0324562 A1 | 10/2019 | Mn et al. |
| 2019/0339795 A1 | 11/2019 | Rebeschi et al. |
| 2019/0354205 A1 | 11/2019 | Rakshit et al. |
| 2019/0369754 A1 | 12/2019 | Roper et al. |
| 2019/0369755 A1 | 12/2019 | Roper et al. |
| 2020/0293125 A1 | 9/2020 | Bernstein et al. |
| 2020/0356254 A1 | 11/2020 | Missig et al. |
| 2020/0371629 A1 | 11/2020 | Hauenstein et al. |
| 2020/0401796 A1 | 12/2020 | Chateigner |
| 2021/0349606 A1 | 11/2021 | Chang et al. |
| 2021/0349627 A1 | 11/2021 | Chang et al. |
| 2022/0197493 A1 | 6/2022 | Missig et al. |
| 2023/0017201 A1 | 1/2023 | Jon et al. |
| 2024/0004532 A1 | 1/2024 | Soli et al. |
| 2024/0329757 A1 | 10/2024 | Bernstein et al. |

FOREIGN PATENT DOCUMENTS

| | | |
|---|---|---|
| CN | 103164158 A | 6/2013 |
| CN | 103853491 A | 6/2014 |
| CN | 103870028 A | 6/2014 |
| CN | 104142782 A | 11/2014 |
| CN | 104298551 A | 1/2015 |
| CN | 104423820 A | 3/2015 |
| CN | 104487928 A | 4/2015 |
| CN | 104487929 A | 4/2015 |
| CN | 104679379 A | 6/2015 |
| CN | 108845757 A | 11/2018 |
| CN | 109791465 A | 5/2019 |
| EP | 2071436 A1 | 6/2009 |
| EP | 2325804 A2 | 5/2011 |
| EP | 2530561 A2 | 12/2012 |
| EP | 2704408 A1 | 3/2014 |
| EP | 2778864 A1 | 9/2014 |
| EP | 2818998 A1 | 12/2014 |
| EP | 2843917 A1 | 3/2015 |
| EP | 2912540 A1 | 9/2015 |
| JP | H09-171378 A | 6/1997 |
| JP | H09-305306 A | 11/1997 |
| JP | H11-110119 A | 4/1999 |
| JP | 2003-296029 A | 10/2003 |
| JP | 2007-520005 A | 7/2007 |
| JP | 2008-27082 A | 2/2008 |
| JP | 2008-70994 A | 3/2008 |
| JP | 2010-183447 A | 8/2010 |
| JP | 2012-18644 A | 1/2012 |
| JP | 2012-238295 A | 12/2012 |
| JP | 2013-232033 A | 11/2013 |
| JP | 2014-153865 A | 8/2014 |
| JP | 2015-49901 A | 3/2015 |
| JP | 2015-56154 A | 3/2015 |
| JP | 2015-64882 A | 4/2015 |
| JP | 2015-88006 A | 5/2015 |
| JP | 2016-177589 A | 10/2016 |
| KR | 10-2009-0100248 A | 9/2009 |
| KR | 10-2010-0059343 A | 6/2010 |
| KR | 10-2011-0088594 A | 8/2011 |
| KR | 10-2012-0092036 A | 8/2012 |
| KR | 10-2014-0053554 A | 5/2014 |
| KR | 10-2014-0073225 A | 6/2014 |
| KR | 10-2014-0124788 A | 10/2014 |
| KR | 10-2015-0022527 A | 3/2015 |
| KR | 10-2015-0026022 A | 3/2015 |

(56) References Cited

FOREIGN PATENT DOCUMENTS

| KR | 10-2015-0026615 A | 3/2015 |
|---|---|---|
| KR | 10-2017-0139141 A | 12/2017 |
| TW | 201112040 A | 4/2011 |
| WO | 2010/119603 A1 | 10/2010 |
| WO | 2013/169300 A1 | 11/2013 |
| WO | 2013/169849 A2 | 11/2013 |
| WO | 2014/034049 A1 | 3/2014 |
| WO | 2014/105276 A1 | 7/2014 |
| WO | 2014/147724 A1 | 9/2014 |
| WO | 2016/200586 A1 | 12/2016 |
| WO | 2020/227445 A1 | 11/2020 |

OTHER PUBLICATIONS

Bargeron, David, and Tomer Moscovich. "Reflowing digital ink annotations." Proceedings of the SIGCHI conference on Human factors in computing systems. 2003 (Year: 2003).*
Sutherland, Craig J., Andrew Luxton-Reilly, and Beryl Plimmer. "Freeform digital ink annotations in electronic documents: A systematic mapping study." Computers & Graphics 55 (2016): 1-20 (Year: 2016).*
Sutherland, Craig, Andrew Luxton-Reilly, and Beryl Plimmer. "Who changed my annotation? An investigation into refitting freeform ink annotations." 2016 IEEE Symposium on Visual Languages and Human-Centric Computing (VL/HCC). IEEE, 2016 (Year: 2016).*
International Search Report and Written Opinion for International Application No. PCT/US2017/053172, Mar. 14, 2018, 28 pages.
Communication Pursuant to Article 94(3) EPC dated Sep. 3, 2021, European Patent Application No. 17778157.2, pp. 1-8.
Ricky Locke, "Kindle App Tips for IPad," www.slideshare.net, Jun. 30, 2013, XP055432422, Retrieved from the Internet on Dec. 6, 2017: https://www.slideshare.net/RickyLocke/kindle-app-tips-for-ipad, pp. 1-5.
Ricky Locke, "Kindle App Tips for IPad (Slides), " www.slideshare.net, Jun. 30, 2013, XP055432444, Retrieved from the Internet on Dec. 6, 2017: https://www.slideshare.net/RickyLocke/kindle-app-tips-for-ipad, pp. 1-57.
First Chinese Office Action dated Apr. 4, 2024, Chinese Application No. 202210384766.9, pp. 1-14 (English Translation Included).
Applicant Initiated Interview Summary received for U.S. Appl. No. 14/862,085, mailed on Mar. 30, 2018, 3 pages.
Corrected Notice of Allowability received for U.S. Appl. No. 18/315,251, mailed on Sep. 23, 2024, 2 pages.
European Search Report received for European Patent Application No. 16727905.8, mailed on May 8, 2019, 4 pages.
European Search Report received for European Patent Application No. 18716461.1, mailed on Sep. 4, 2020, 5 pages.
European Search Report received for European Patent Application No. 19731090.7, mailed on Oct. 14, 2022, 4 pages.
Examiner's Answer to Appeal Brief received for U.S. Appl. No. 16/417,025, mailed on Sep. 6, 2022, 10 pages.
Examiner's Answer to Appeal Brief received for U.S. Appl. No. 17/031,844, mailed on Dec. 18, 2023, 14 pages.
Extended European Search Report received for European Patent Application No. 24152367.9, mailed on Apr. 30, 2024, 15 pages.
Final Office Action received for U.S. Appl. No. 14/862,085, mailed on Sep. 10, 2018, 14 pages.
Final Office Action received for U.S. Appl. No. 15/978,125, mailed on Mar. 26, 2020, 13 pages.
Final Office Action received for U.S. Appl. No. 15/978,125, mailed on May 13, 2021, 19 pages.
Final Office Action received for U.S. Appl. No. 16/417,025, mailed on Jan. 21, 2022, 18 pages.
Final Office Action received for U.S. Appl. No. 16/417,025, mailed on May 18, 2021, 16 pages.
Final Office Action received for U.S. Appl. No. 16/417,025, mailed on Oct. 8, 2020, 16 pages.
Final Office Action received for U.S. Appl. No. 16/886,643, mailed on Feb. 6, 2023, 16 pages.
Final Office Action received for U.S. Appl. No. 16/886,643, mailed on Jan. 27, 2022, 14 pages.
Final Office Action received for U.S. Appl. No. 16/982,532, mailed on Jul. 27, 2023, 20 pages.
Final Office Action received for U.S. Appl. No. 17/031,678, mailed on Jan. 10, 2022, 30 pages.
Final Office Action received for U.S. Appl. No. 17/031,844, mailed on Aug. 8, 2022, 33 pages.
Final Office Action received for U.S. Appl. No. 17/946,374, mailed on Mar. 4, 2024, 20 pages.
International Search Report received for PCT Application No. PCT/US2023/021718, mailed on Nov. 3, 2023, 7 pages.
International Search Report received for PCT Patent Application No. PCT/US2016/033588, mailed on Oct. 4, 2016, 6 pages.
International Search Report received for PCT Patent Application No. PCT/US2018/023484, mailed on Jul. 23, 2018, 7 pages.
International Search Report received for PCT Patent Application No. PCT/US2019/034524, mailed on Nov. 18, 2019, 8 pages.
International Search Report received for PCT Patent Application No. PCT/US2020/031727, mailed on Oct. 8, 2020, 10 pages.
International Search Report received for PCT Patent Application No. PCT/US2021/031866, mailed on Nov. 8, 2021, 7 pages.
Non-Final Office Action received for U.S. Appl. No. 14/860,320, mailed on Jul. 19, 2016, 10 pages.
Non-Final Office Action received for U.S. Appl. No. 14/862,073, mailed on Oct. 19, 2016, 13 pages.
Non-Final Office Action received for U.S. Appl. No. 14/862,080, mailed on Jun. 22, 2016, 13 pages.
Non-Final Office Action received for U.S. Appl. No. 14/862,085, mailed on Mar. 19, 2018, 12 pages.
Non-Final Office Action received for U.S. Appl. No. 15/978,125, mailed on Dec. 12, 2019, 11 pages.
Non-Final Office Action received for U.S. Appl. No. 15/978,125, mailed on Jul. 5, 2019, 9 pages.
Non-Final Office Action received for U.S. Appl. No. 15/978,125, mailed on Nov. 3, 2020, 16 pages.
Non-Final Office Action received for U.S. Appl. No. 16/333,103, mailed on Mar. 16, 2020, 20 pages.
Non-Final Office Action received for U.S. Appl. No. 16/359,906, mailed on Aug. 21, 2019, 11 pages.
Non-Final Office Action received for U.S. Appl. No. 16/417,025, mailed on Feb. 5, 2021, 15 pages.
Non-Final Office Action received for U.S. Appl. No. 16/417,025, mailed on Jun. 29, 2020, 13 pages.
Non-Final Office Action received for U.S. Appl. No. 16/417,025, mailed on Sep. 2, 2021, 15 pages.
Non-Final Office Action received for U.S. Appl. No. 16/417,214, mailed on Aug. 6, 2020, 26 pages.
Non-Final Office Action received for U.S. Appl. No. 16/868,449, mailed on May 26, 2021, 30 pages.
Non-Final Office Action received for U.S. Appl. No. 16/886,643, mailed on Aug. 16, 2022, 18 pages.
Non-Final Office Action received for U.S. Appl. No. 16/886,643, mailed on May 24, 2021, 13 pages.
Non-Final Office Action received for U.S. Appl. No. 16/982,532, mailed on Jan. 4, 2023, 21 pages.
Non-Final Office Action received for U.S. Appl. No. 17/031,678, mailed on Jul. 8, 2021, 26 pages.
Non-Final Office Action received for U.S. Appl. No. 17/031,844, mailed on Dec. 3, 2021, 29 pages.
Non-Final Office Action received for U.S. Appl. No. 17/946,374, mailed on Aug. 23, 2023, 18 pages.
Non-Final Office Action received for U.S. Appl. No. 18/315,251, mailed on Mar. 7, 2024, 28 pages.
Non-Final Office Action received for U.S. Appl. No. 18/424,684, mailed on Aug. 14, 2024, 7 pages.
Notice of Allowance received for U.S. Appl. No. 16/333,103, mailed on Aug. 19, 2020, 10 pages.
Notice of Allowance received for U.S. Appl. No. 16/417,214, mailed on Feb. 25, 2021, 10 pages.
Notice of Allowance received for U.S. Appl. No. 14/860,320, mailed on Dec. 16, 2016, 8 pages.

(56) References Cited

OTHER PUBLICATIONS

Notice of Allowance received for U.S. Appl. No. 14/860,320, mailed on Mar. 7, 2016, 10 pages.
Notice of Allowance received for U.S. Appl. No. 14/862,073, mailed on Mar. 6, 2017, 10 pages.
Notice of Allowance received for U.S. Appl. No. 14/862,080, mailed on Dec. 27, 2016, 9 pages.
Notice of Allowance received for U.S. Appl. No. 14/862,085, mailed on Apr. 23, 2019, 5 pages.
Notice of Allowance received for U.S. Appl. No. 14/862,085, mailed on Jan. 9, 2019, 8 pages.
Notice of Allowance received for U.S. Appl. No. 15/978,125, mailed on Aug. 9, 2022, 6 pages.
Notice of Allowance received for U.S. Appl. No. 16/359,906, mailed on Feb. 20, 2020, 8 pages.
Notice of Allowance received for U.S. Appl. No. 16/359,906, mailed on Jan. 6, 2020, 8 pages.
Notice of Allowance received for U.S. Appl. No. 16/359,906, mailed on Mar. 26, 2020, 9 pages.
Notice of Allowance received for U.S. Appl. No. 16/417,025, mailed on Aug. 14, 2024, 5 pages.
Notice of Allowance received for U.S. Appl. No. 16/333,103, mailed on Aug. 19, 2020, 8 pages.
Notice of Allowance received for U.S. Appl. No. 16/868,449, mailed on Nov. 3, 2021, 8 pages.
Notice of Allowance received for U.S. Appl. No. 16/886,643, mailed on Jun. 29, 2023, 8 pages.
Notice of Allowance received for U.S. Appl. No. 16/886,643, mailed on Oct. 12, 2023, 10 pages.
Notice of Allowance received for U.S. Appl. No. 16/982,532, mailed on Jan. 24, 2024, 8 pages.
Notice of Allowance received for U.S. Appl. No. 16/982,532, mailed on May 8, 2024, 5 pages.
Notice of Allowance received for U.S. Appl. No. 17/031,678, mailed on Feb. 1, 2023, 8 pages.
Notice of Allowance received for U.S. Appl. No. 17/031,678, mailed on Sep. 15, 2022, 10 pages.
Notice of Allowance received for U.S. Appl. No. 17/946,374, mailed on Oct. 10, 2024, 17 pages.
Notice of Allowance received for U.S. Appl. No. 18/315,251, mailed on Sep. 11, 2024, 19 pages.
Patent Board Decision received for U.S. Appl. No. 16/417,025, mailed on May 7, 2024, 9 pages.
Adak et al., "Extraction of Doodles and Drawings from Manuscripts", ICIAP, 17th International Conference, Naples, Italy, Dec. 10, 2013, pp. 515-520.
Android and Me, "Samsung Galaxy Note 3 Review", Available Online at: <http://androidandme.com/2013/10-reviews/samsung-galaxy-note-3 review/>, 2013, 14 pages.
Anonymous, "How to Re-map the S-pen Button and Insert/remove to Do ANYTHING on the Device", Available Online at: <https://www.reddit.com/r/galaxynote4/comments/4ju5lh/how_to_remap_the_spen_button_and_insertremove_to/>, [retrieved on Sep. 13, 2019], May 28, 2016, 6 pages.
Basu Abhiroop, "Samsung Launches Cross-Platform Instant Messaging Service 'ChatON", Available Online at: <https://www.androidpolice.com/2011/08/29/samsung-launches-cross-platform-instant-messaging-service-chaton/>, Aug. 29, 2011, 5 pages.
Christopher W, "ScribMaster Draw and Paint - with Instant Messenger", Available Online at: <http://www.androidpit.com/scribmaster-draw-and-paint>, Oct. 8, 2013, 9 pages.
Color Hunter, "Create and Find Color Palettes Made From Images", Available Online at: <http://www.colorhunter.com>, 2016, 3 pages.
Css Drive, "Colors Pallete Generator", Available Online at: <http:www.cssdrive.com/imgaepalette/>, 2011, 2 pages.
Eichner, "Ios Sensors & Core Motion", Available Online at: <http://wwwbruegge.in.turn.de/lehrstuhl_1/home/98-teaching/tutorials/505-sgd-ws13-tutorial-core-motion>, 2016, 12 pages.

Farley, "Make Swatches from Photos in Photoshop", Available Online at: <http://www.sitepoint.com/makeswatches-from-photos-in-photoshop/>, 5 pages.
Fosseide et al., "Character Recognition in the Presence of Occluding Clutter", Proceedings of SPIE, vol. 7247, Retrieved on Aug. 10, 2021, Jan. 18, 2009, 13 pages.
Google, "Loklok", Available Online at: < http://loklok.co>, 2015, 2 pages.
Hayakawa, "Galaxy Note 3 Perfect Manual", vol. 1, Sotechsha Co. Ltd, Junichi Yanagisawa, May 12, 2015, 9 pages.
Hou et al., "An Algorithm of Calligraphy Beautification Based on Improved Velocity and Width Model", Computer Engineering and Social Media (CSCESM), 2015 Second International Conference on Computer Science, 2015, pp. 124-127.
Itunes Preview, "Draw Calendar-Fun Scheduling and Events", Fishington Studios, Available Online at: <https://itunes.apple.com/us/app/calendoodle-pen-ink-whiteboard/id815370160?mt=8>, 2014, 3 pages.
Jain, "Samsung Galaxy Note 3 Neo Review: Hidden Goodness", Available Online at: <https://www.mobigyaan.com/samsung-galaxy-not-3-neo-review-2>, Apr. 17, 2014, 48 pages.
Kazmucha, "How to Send Someone a Sketch with Apple Works", Available Online at: <https:/web.archive.org/web/20150525204929/http:ww.www.imore.com/how-sendsome-sketch-apple-watch>, May 7, 2015, 8 pages.
Lee et al., "PhantomPen: Virtualization of Pen Head for Digitial Drawing Free from Hen Occlusion & Visual Parallax", IDEA Lab, Department of Industrial Design, KAIST, Republic of Korea, Oct. 7-10, 2012, 10 pages.
Lee et al., "PhantomPen: Virtualization of Pen Head for Digitial Drawing Free from Pen Occlusion & Visual Parallax", YouTube video, Oct. 22, 2012, 2 pages.
Mailchimp Email Marketing, "Pictaculous, A Color Palette Generator", Available Online at: <http://www.pictaculous.com>, 2016, 1 page.
Matsushita et al., "Effect of Text/Non-text Classification for Ink Search Employing String Recognition", IEEE, 2012 10th IAPR International Workshop on Document Analysis Systems, May 7, 2012, pp. 230-234.
Millward, "LiiHo IM App: A New Way to Chat as You Draw Something and Doodle with Friends", Available Online at: < http://www.techinasia.com/liiho-im-doodling-app/>, Apr. 5, 2012, 6 pages.
Notes Plus, "5th Anniversary", Available Online at: <http://notesplusapp.com>, Apr. 4, 2013, 7 pages.
Perez, "Five Amazing Color Palette Generators", Available Online at: <http://readwrite.com/2008/08/01/five_amazing_color_palette_generators>, Aug. 1, 2008, 3 pages.
Rudling, "Erik Rudling - Intreprenur and Consulltannt in Speling", Available Online at: <http://erikrudling.com/taking-digital-notes-notes-plus-ipad-app-review/>, Jan. 6, 2015, 14 pages.
Schwaller et al., "Improving In-game Gesture Learning with Visual Feedback", ARXIV.ORG, Jun. 22-27, 2014, pp. 643-653.
Seiji et al., "Galaxy Note 3 Perfect Manual", vol. 1, Sotechsha Co. Ltd., Junichi, Yanagisawa, May 12, 2015, 9 pages.
Tianxiao Liu, "Overview of Handwriting Input Technology", CNKI, China Invention and Patent, vol. 12, [retrieved on Jul. 31, 2024], 2016, 5 pages (1 page of English Abstract and 4 pages of Official Copy).
Toshiba Corporation, "Microsoft Windows for Pen Computing users Guide", Version A1, Nov. 9, 1994, pp. 23-27, 70-77 (Machine Translation Submitted).
Wikipedia, "Calendar (application)", Available Online at: <https://en.wikipedia.org/wiki/Calendar_(application)>, Sep. 10, 2002, 5 pages.
Wikipedia, "Comparison of Instant Messaging Clients", Available Online at: <http://en.wikipedia.org/wiki/Comparison_of_instant_messaging_clients>, Mar. 1, 2016, 16 pages.
Windows, "Use A Pen to Draw, Write, or Highlight, Text on A Windows Tablet,", Available Online at: < https://support.office.com/

(56) References Cited

OTHER PUBLICATIONS en-US/article/Use-a-pen-to-draw-write-or- highlight-text-on-a-Windows-tablet-6d76c674-7f4b-414d-b67f-b3ffef6ccf53>, 2016, 8 pages.

* cited by examiner

Figure 5C

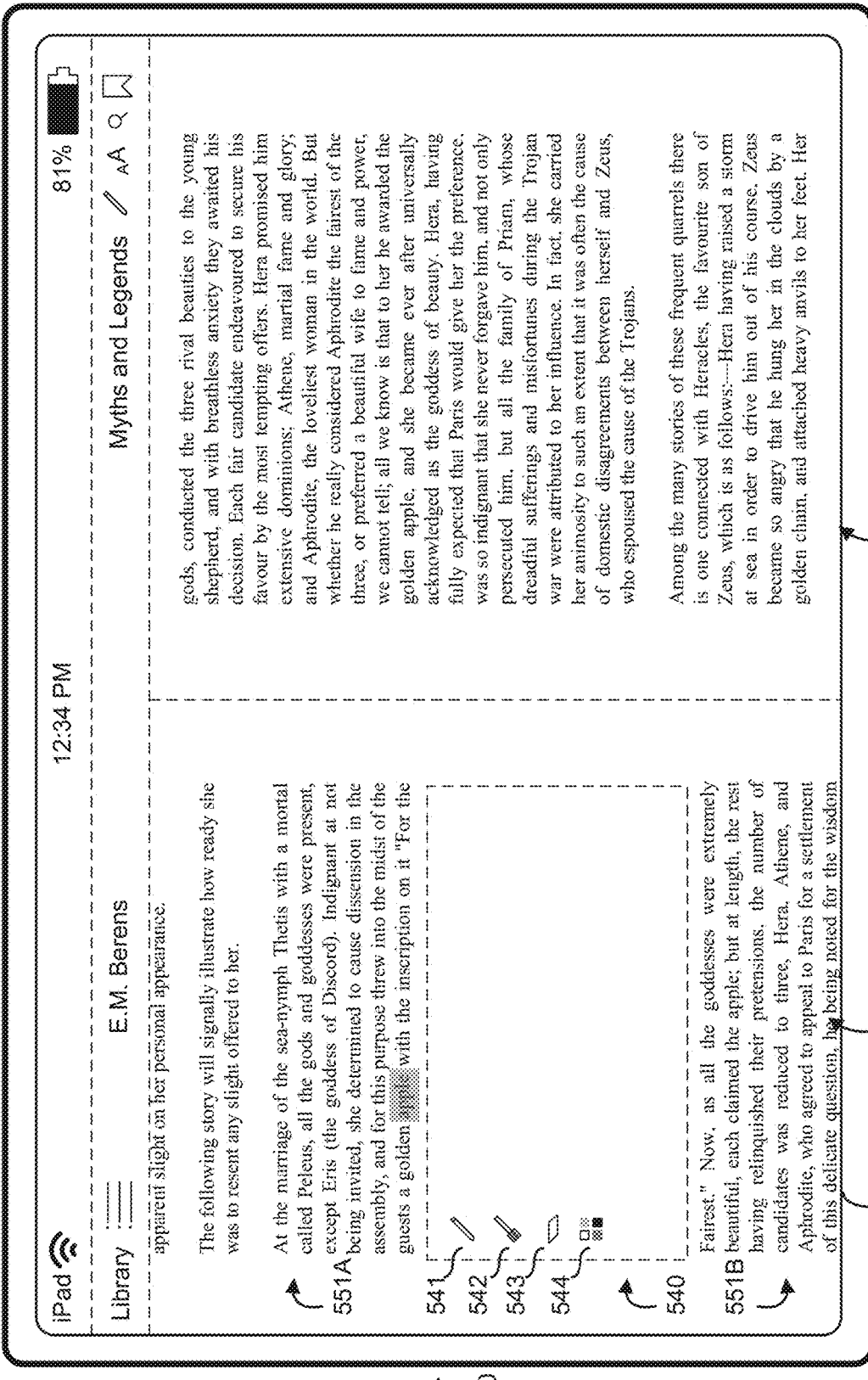

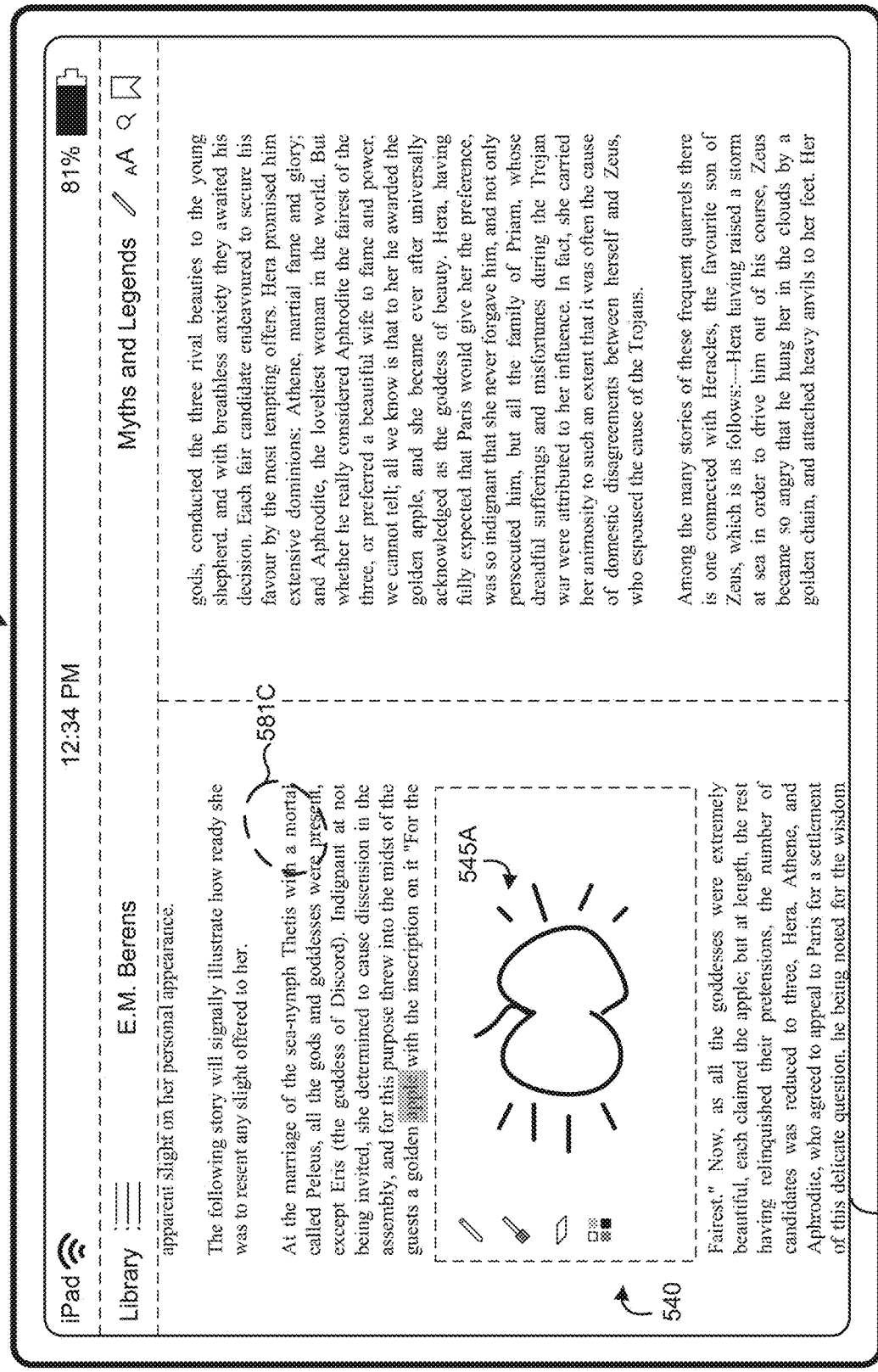

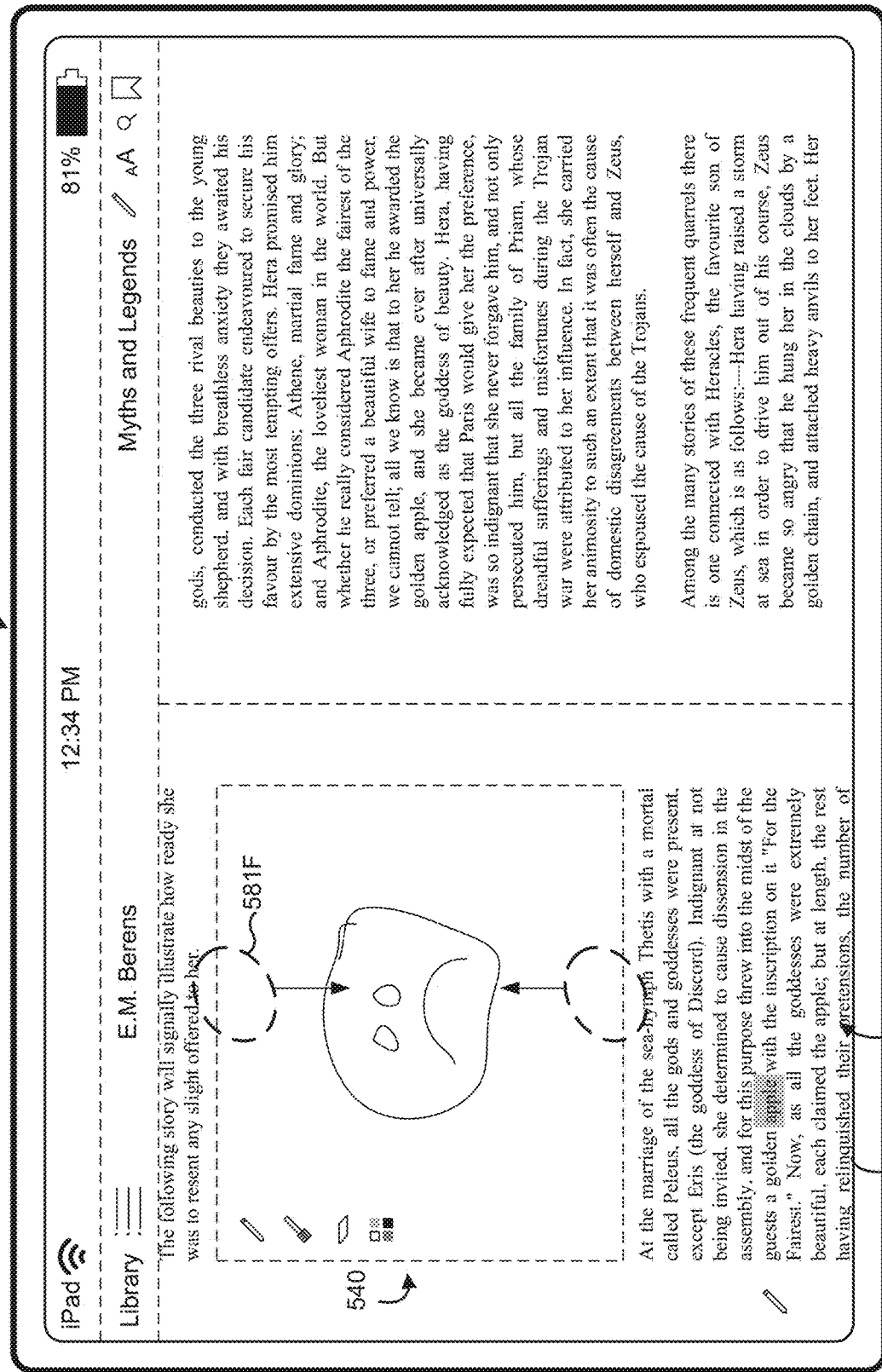

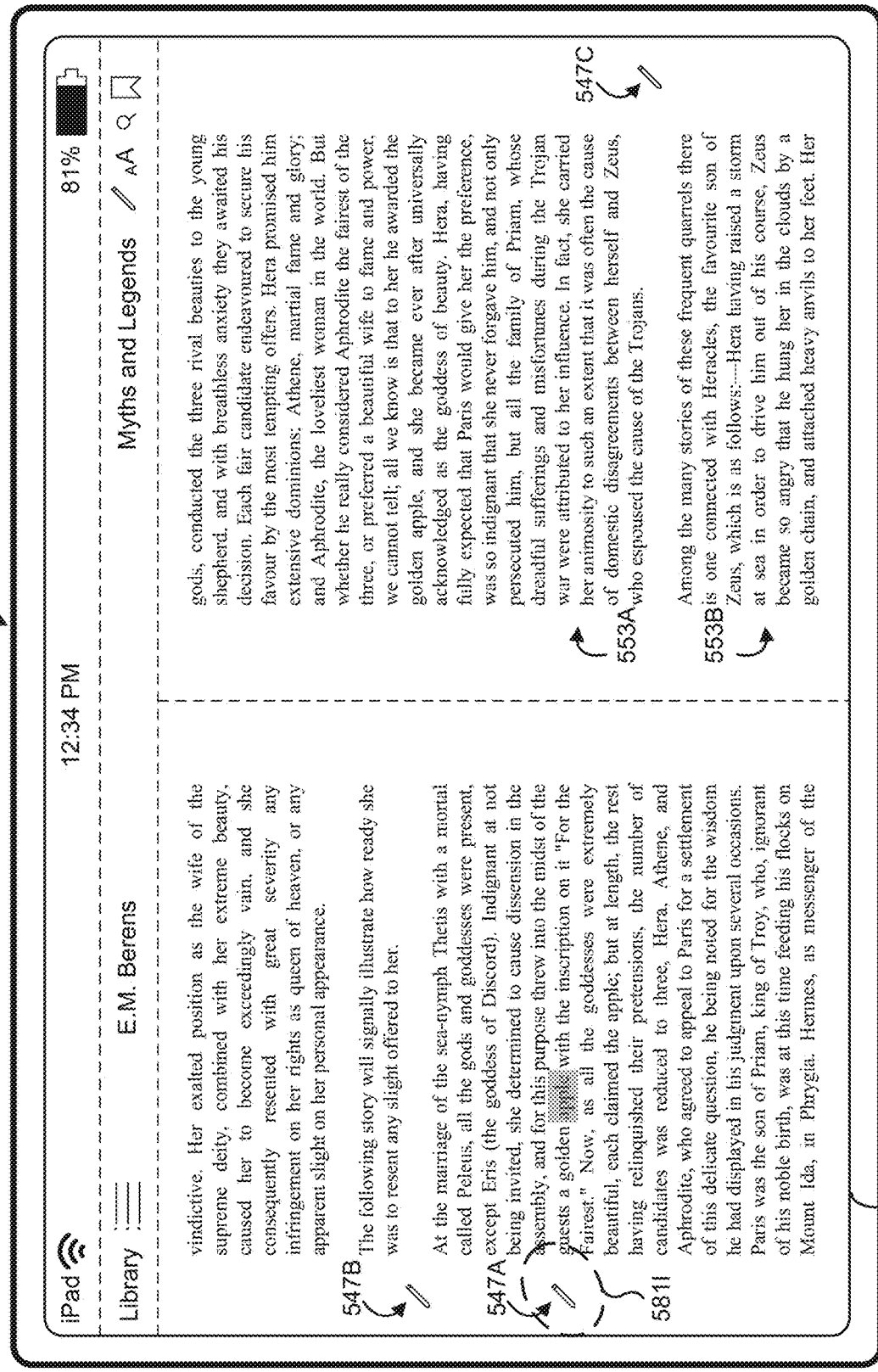

700

At a device with one or more processors, non-transitory memory, and a touch-sensitive display:

Displaying, on the touch-sensitive display, a first arrangement of text in which a first portion of the text has a first position with respect to a second portion of the text ⎯702

↓

While the text is displayed in the first arrangement, detecting, via the touch-sensitive display, a set of one or more annotation inputs ⎯704

> Detecting, via the touch-sensitive display, an input at a location of an annotations affordance displayed on the touch-sensitive display ⎯706

> Detecting, via the touch-sensitive display, one or more finger contacts ⎯708

> Detecting, via the touch-sensitive display, one or more stylus contacts ⎯710

> The set of one or more annotation inputs includes one or more underlining inputs at least partially detected at a set of locations below the first portion of the text and the second portion of the text ⎯712

> The set of one or more annotation inputs includes one or more strikethrough inputs at least partially detected at a set of locations over the first portion of the text and the second portion of the text ⎯714

> The set of one or more annotation inputs includes one or more encircling inputs at least partially detected at a set of locations surrounding the first portion of the text and the second portion of the text ⎯716

> The set of one or more annotation inputs includes a first set of one or more annotation inputs detected at locations associated with the first portion of the text, a second set of one or more annotation inputs detected at locations associated with the second portion of the text, and a third set of one or more annotation inputs detected at locations between the first portion of the text and the second portion of the text ⎯718

| 734 — Concurrently displaying, on the touch-sensitive display, a second arrangement of the text in which the first portion of the text has a second position with respect to the second portion of the text, wherein the second position is different from the first position, *and* a second representation of the annotation that is associated with both the first portion of the text and the second portion of the text, wherein the second representation is different from the first representation |

736 — At least a portion of the second representation is displayed proximate to the first portion of the text in the second arrangement and at least a second portion of the second representation is displayed proximate to the second portion of the text in the second arrangement 738 — At least a portion of the second representation is displayed below the first portion of the text in the second arrangement and at least a second portion of the second representation is displayed below the second portion of the text in the second arrangement 740 — At least a portion of the second representation is displayed over the first portion of the text in the second arrangement and at least a second portion of the second representation is displayed over the second portion of the text in the second arrangement 742 — At least a portion of the second representation is displayed surrounding the first portion of the text in the second arrangement and at least a second portion of the second representation is displayed surrounding the second portion of the text in the second arrangement 744 — The second representation includes a connector displayed between the first portion of the text and the second portion of the text in the second arrangement 746 — The second connector is the same shape as the first connector (C)

Concurrently displaying, on the touch-sensitive display, a second arrangement of the text in which the first portion of the text has a second position with respect to the second portion of the text, wherein the second position is different from the first position *and* a second representation of the annotation that is associated with both the first portion of the text and the second portion of the text, wherein the second representation is different from the first representation ⎯734

> The second representation has the same shape as the first representation ⎯748

> The second representation is a relocated and resized version of the first representation ⎯750

> A first portion of the second representation corresponding to a first portion of the first representation is displayed proximate to the first portion of the text in the second arrangement and a second portion of the second representation corresponding to a second portion of the first representation is displayed proximate to the second portion of the text in the second arrangement ⎯752

> A first portion of the second representation corresponding to at least a portion of the first representation is displayed proximate to the first portion of the text in the second arrangement and a second portion of the second representation corresponding to the at least a portion of the first representation is displayed proximate to the second portion of the text in the second arrangement ⎯754

> The second representation includes two separate portions of the first representation merged together ⎯756

Figure 7D

DEVICE, METHOD, AND GRAPHICAL USER INTERFACE FOR ANNOTATING TEXT

CROSS-REFERENCE TO RELATED APPLICATIONS

This application is a continuation application of and claims priority to U.S. patent application Ser. No. 16/333,103, filed on Mar. 13, 2019, which is the national phase entry of Intl. Patent App. No. PCT/2017/053172, filed on Sep. 25, 2017, which claims priority to U.S. Provisional Patent App. No. 62/399,322, filed on Sep. 23, 2016, which are hereby incorporated by reference in their entirety.

TECHNICAL FIELD

This relates generally to electronic devices with touch-sensitive surfaces, including but not limited to electronic devices with touch-sensitive surfaces that allow to annotate displayed text.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Aperture, iPhoto, Photos from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), a website creation application (e.g., iWeb from Apple Inc. of Cupertino, California), a disk authoring application (e.g., iDVD from Apple Inc. of Cupertino, California), or a spreadsheet application (e.g., Numbers from Apple Inc. of Cupertino, California).

Some user interfaces display text and allow a user to annotate the text. However, methods for adding annotations to the text are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for annotating text. Such methods and interfaces optionally complement or replace conventional methods for annotating text. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, and a touch-sensitive display. The method includes displaying, on the touch-sensitive display, a text region that includes a first portion of text and a second portion of text. The method includes detecting, on the touch-sensitive display, an input within the text region. The method includes, in response to detecting the input within the text region, moving the first portion of text relative to the second portion of text to display a non-text region between the first portion of text and the second portion of text that does not include any text and converting at least a portion of the non-text region into a drawing panel provided to receive drawing input via the touch-sensitive display and display a corresponding graphic in response to receiving the drawing input.

In accordance with some embodiments, a method is performed at a device with one or more processors, non-transitory memory, at a device with one or more processors, non-transitory memory, and a touch-sensitive display. The method includes displaying, on the touch-sensitive display, a first arrangement of text in which a first portion of the text has a first position with respect to a second portion of the text. The method includes, while the text is displayed in the first arrangement, detecting, via the touch-sensitive display, a set of one or more annotation inputs. The method includes, in response to detecting the set of one or more annotation inputs, displaying, on the touch-sensitive display, a first representation of an annotation that is associated with both the first portion of the text and the second portion of the text, wherein at least a portion of the first representation is displayed proximate to the first portion of the text in the first arrangement and at least a portion of the first representation is displayed proximate to the second portion of the text in the first arrangement. The method includes, after displaying the first representation of the annotation, receiving a request to rearrange the text. The method includes, in response to receiving the request to rearrange the text, concurrently displaying, on the display a second arrangement of the text in which the first portion of the text has a second position with respect to the second portion of the text and a second representation of the annotation that is associated with both the first portion of the text and the second portion of the text, wherein at least a portion of the second representation is displayed proximate to the first portion of the text in the second arrangement and at least a portion of the second representation is displayed proximate to the second portion of the text in the second arrangement.

In accordance with some embodiments, an electronic device includes a display unit configured to display a user interface, one or more input units configured to receive user inputs, and a processing unit coupled with the display unit and the one or more input units. The processing unit is configured to display, on the display unit, a text region that includes a first portion of text and a second portion of text. The processing unit is configured to detect, via the one or more input units, an input within the text region. The processing unit is configured to, in response to detecting the input within the text region, move the first portion of text relative to the second portion of text to display a non-text region between the first portion of text and the second portion of text that does not include any text and convert at least a portion of the non-text region into a drawing panel provided to receive drawing input via the touch-sensitive display and display a corresponding graphic in response to receiving the drawing input.

In accordance with some embodiments, an electronic device includes a display unit configured to display a user interface, one or more input units configured to receive user inputs, and a processing unit coupled with the display unit and the one or more input units. The processing unit is configured to display, on the display unit, a first arrangement of text in which a first portion of the text has a first position with respect to a second portion of the text. The processing unit is configured to, while the text is displayed in the first arrangement, detect, via the one or more input units, a set of one or more annotation inputs. The processing unit is configured to, in response to detecting the set of one or more annotation inputs, display, on the display unit, a first representation of an annotation that is associated with both the first portion of the text and the second portion of the text. At least a portion of the first representation is displayed proximate to the first portion of the text in the first arrangement and at least a portion of the first representation is displayed proximate to the second portion of the text in the first arrangement. The processing unit is configured to, after displaying the first representation of the annotation, receive a request to rearrange the text. The processing unit is configured to, in response to receiving the request to rearrange the text, concurrently display, on the display unit a second arrangement of the text in which the first portion of the text has a second position with respect to the second portion of the text and a second representation of the annotation that is associated with both the first portion of the text and the second portion of the text. The second position is different from the first position. The second representation is different from the first representation. As least a portion of the second representation is displayed proximate to the first portion of the text in the second arrangement and at least a portion of the second representation is displayed proximate to the second portion of the text in the second arrangement.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for annotating text, thereby increasing the effectiveness, efficiency, and user satisfaction with such devices. Such methods and interfaces may complement or replace conventional methods for annotating text.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7D are flow diagrams illustrating a method of adding hand-drawn annotations to reflowable text in accordance with some embodiments.

DESCRIPTION OF EMBODIMENTS

Many electronic devices have graphical user interfaces that display text, such as an electronic book or a word processing document. Some applications allow a user to add annotations to the text, such as notes or highlighting. In embodiments described below, an application allows a user to add hand-drawn annotations to text. For example, in some embodiments, a drawing panel is provided in which a user can provide input for a drawing annotation associated with a portion of the text. As another example, in some embodiments, input for a hand-drawn annotation can be applied directly to reflowable text and the annotation reflows with the text.

Figure 2:
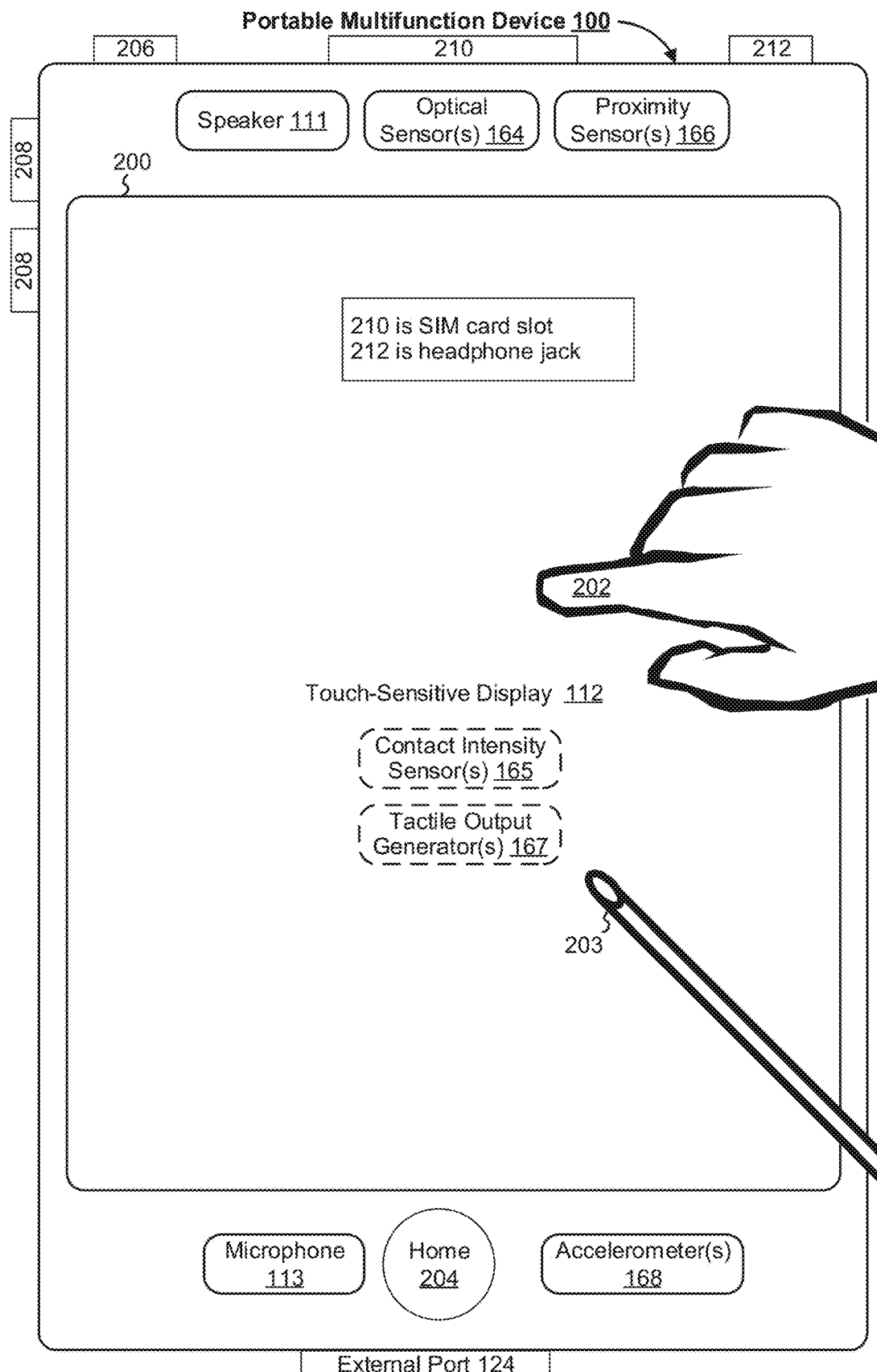
FIG. 2 illustrates a portable multifunction device having a touch screen in accordance with some embodiments.
Figure 3:
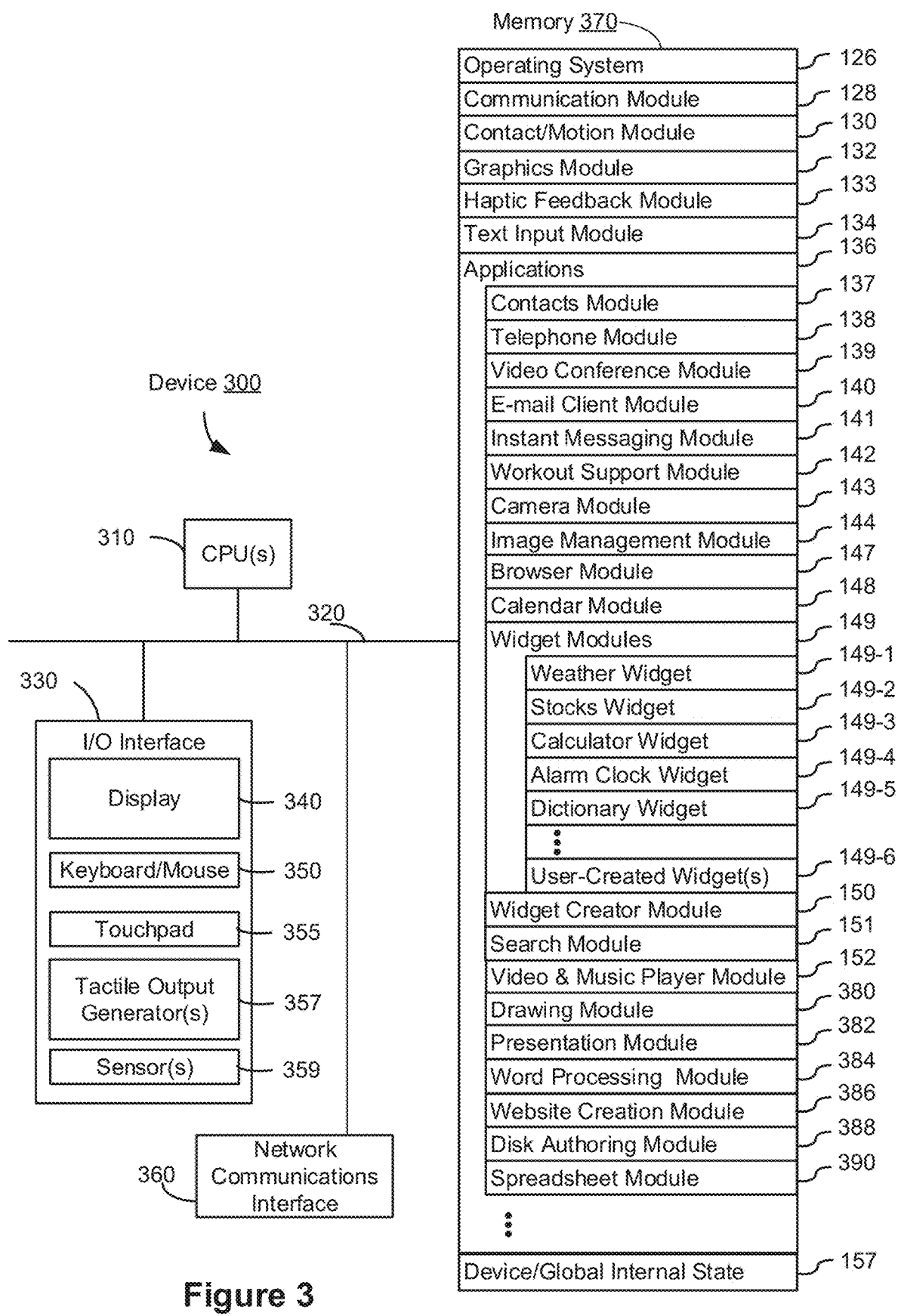
FIG. 3 is a block diagram of an example multifunction device with a display and a touch-sensitive surface in accordance with some embodiments.
Figure 4A:
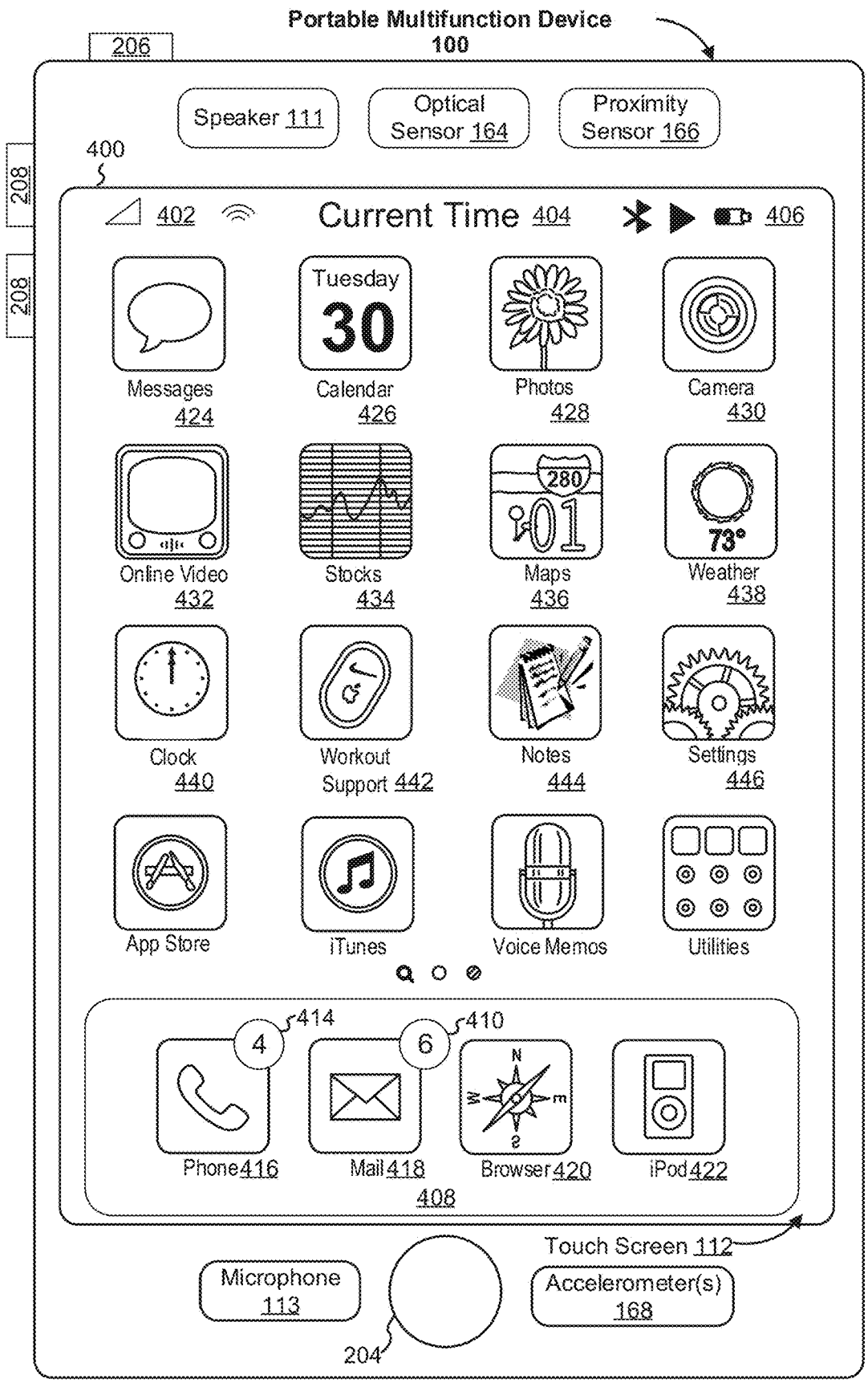
FIG. 4A illustrates an example user interface for a menu of applications on a portable multifunction device in accordance with some embodiments.
Figure 4B:
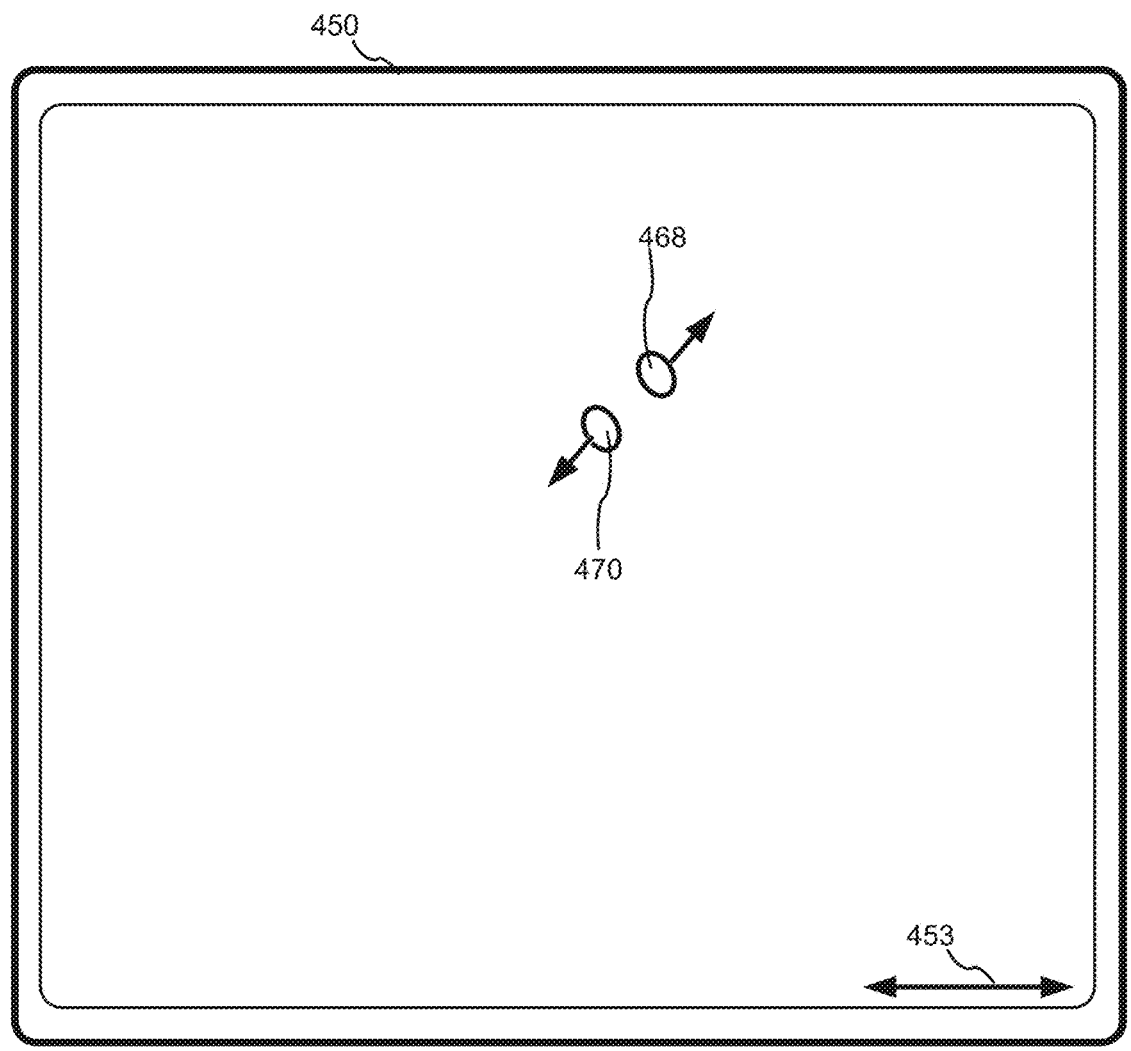
FIG. 4B illustrates an example user interface for a multifunction device with a touch-sensitive surface that is separate from the display in accordance with some embodiments.
Figure 4B:
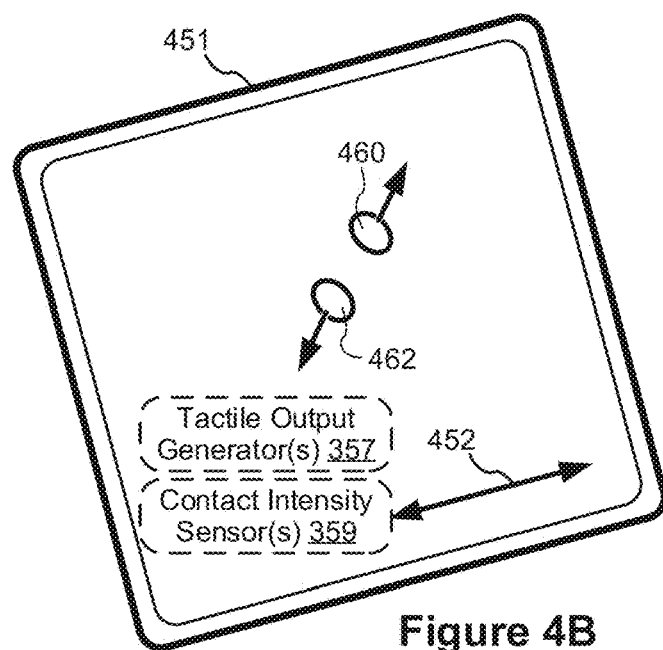
Figure 5A:
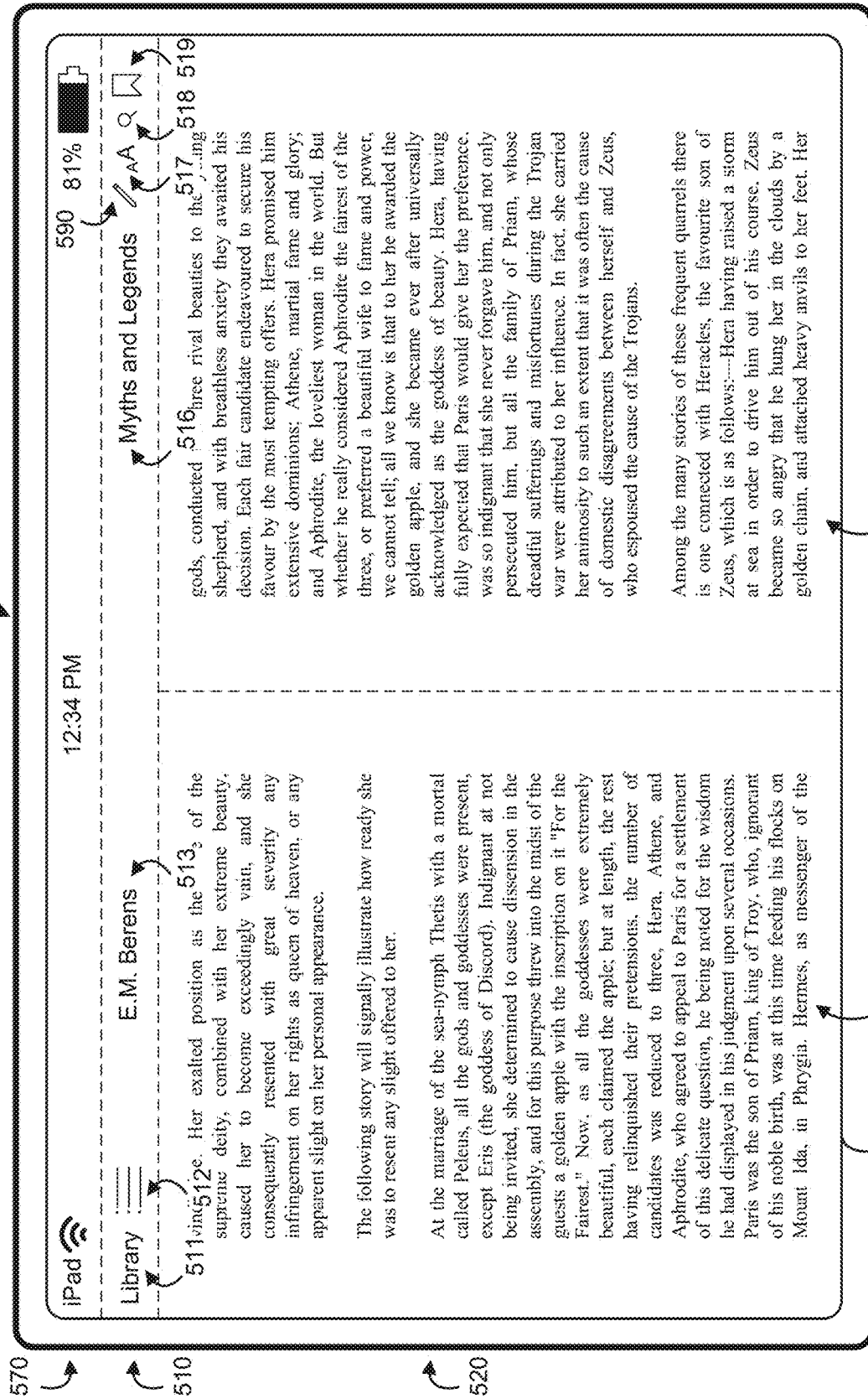
FIGS. 5A-5AF illustrate example user interfaces for adding annotations to text in accordance with some embodiments.

Below, FIGS. 1A-1B, 2, and 3 provide a description of example devices. FIGS. 4A-4B and 5A-5AF illustrate example user interfaces for adding annotations to text. FIGS. 6A-6D illustrate a flow diagram of a method of adding a drawing annotation to text. FIGS. 7A-7D illustrate a flow diagram of a method of adding hand-drawn annotations to reflowable text. The user interfaces in FIGS. 5A-5AF are used to illustrate the processes in FIGS. 6A-6D and 7A-7D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
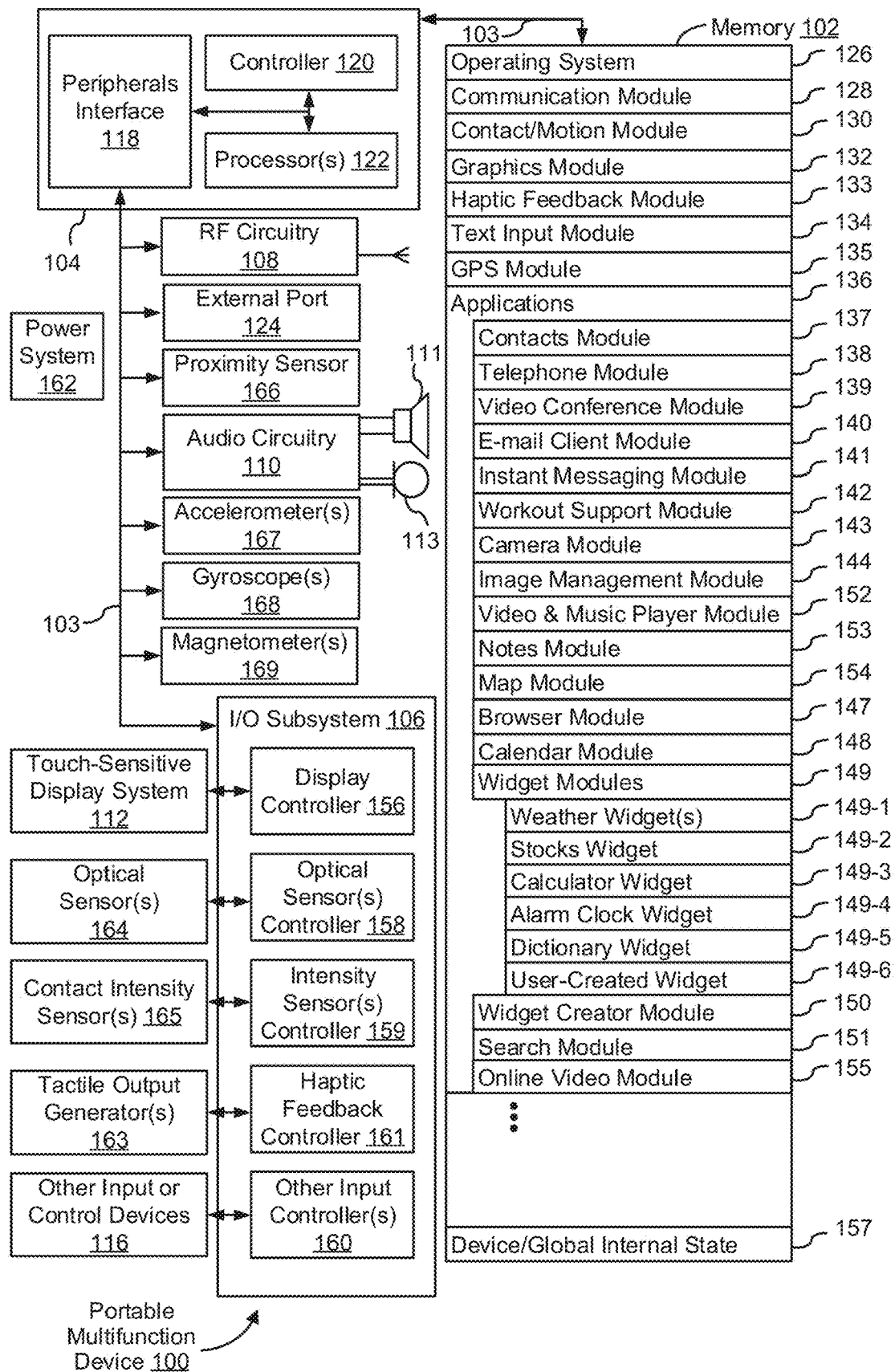
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
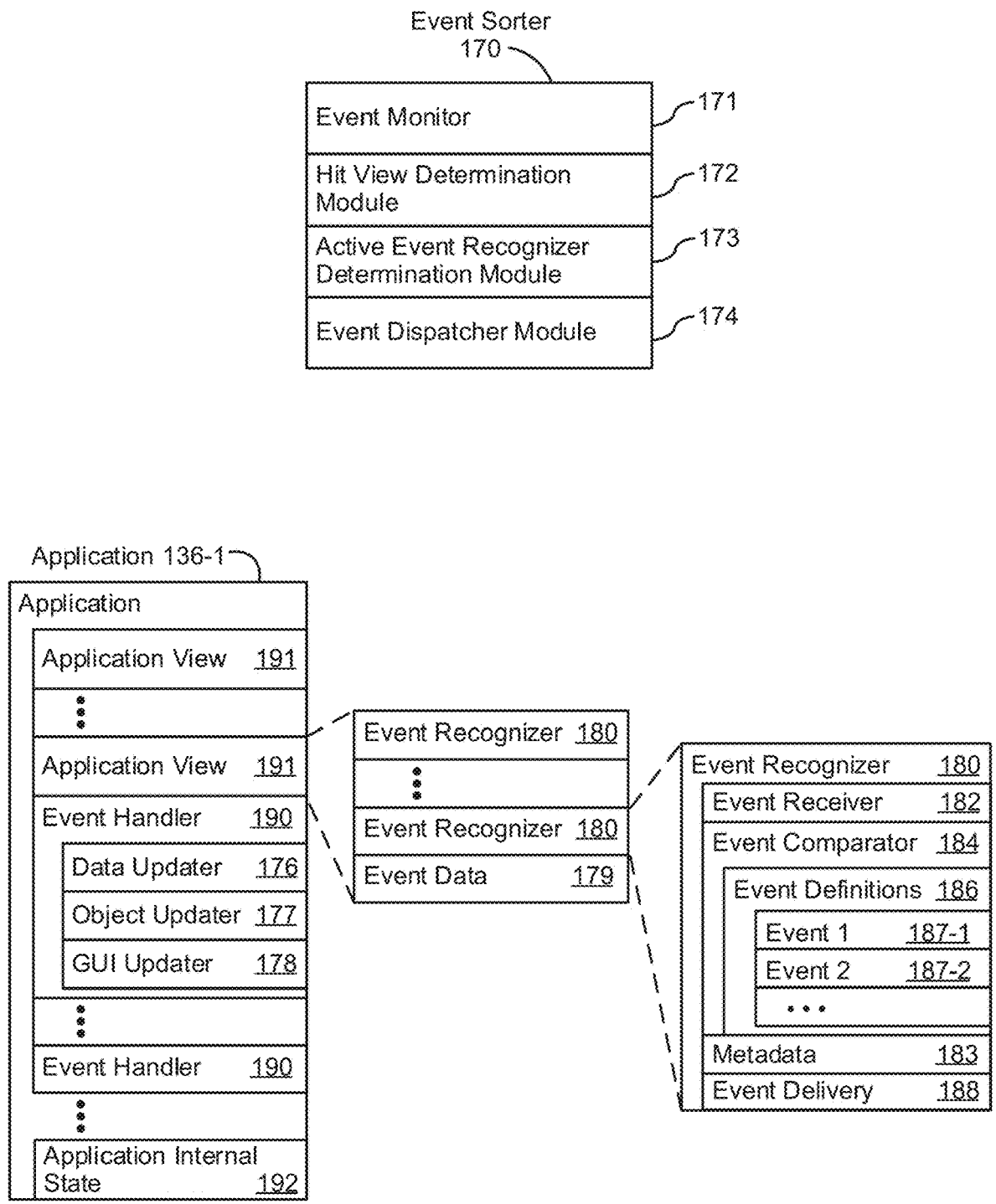
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions;

detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and Icon 422 for video and music player module 152, also referred to as iPod (trademark of Apple Inc.) module 152, labeled "iPod"; and Icons for other applications, such as:
- Icon 424 for IM module 141, labeled "Text";
- Icon 426 for calendar module 148, labeled "Calendar";
- Icon 428 for image management module 144, labeled "Photos";
- Icon 430 for camera module 143, labeled "Camera";
- Icon 432 for online video module 155, labeled "Online Video";
- Icon 434 for stocks widget 149-2, labeled "Stocks";
- Icon 436 for map module 154, labeled "Map";
- Icon 438 for weather widget 149-1, labeled "Weather";
- Icon 440 for alarm clock widget 169-6, labeled "Clock";
- Icon 442 for workout support module 142, labeled "Workout Support";
- Icon 444 for notes module 153, labeled "Notes"; and
- Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.) or stylus inputs, it should be understood that, in some embodiments, one or more of the finger inputs or stylus inputs are replaced with input from another input device (e.g., a mouse based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5AF illustrate example user interfaces for annotating text in accordance with some embodiments. The user interfaces in these figures are used to illustrate the processes described below, including the processes in FIGS. 6A-6D and FIGS. 7A-7D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates an e-book application as part of a user interface 500 displayed by a portable multifunctional device 100. The user interface 500 includes, in addition to the e-book application, within an application region, a device bar 570 at the top of the display including an identifier of the portable multifunctional device 100 (e.g., "iPad"), a wireless connection indicator, a current time, and a battery indicator indicating a charge level of the portable multifunctional device 100.

The user interface 500 includes, below the device bar 570 and spanning the rest of the display, an application region of an e-book application. Although primary described herein (with reference to FIGS. 5A-5AF) in the context of an e-book application, aspects described herein can be applied to other applications that display text, including word processing applications, PDF (portable document format) reader applications, and web browser applications.

The application region includes an application bar 510 at the top of the application region. In some embodiments, the application bar 510 is displayed at a bottom of the application region or at another location within the application region. The application bar 510 includes a library affordance 511 for displaying a library view within the application. The library view includes affordances for selecting e-books available for display by the application. The application bar 510 includes a contents affordance 512 for displaying a contents view within the application. As described further below, the contents view includes a table of contents of the e-book with affordances for displaying corresponding portions of the text of the e-book. As also described further below, a notes view is accessible from the contents view.

The application bar 510 includes author text 513 indicative of the author of the e-book and title text 516 indicative of the title of the e-book. The application bar 510 includes a text display options affordance 517 for changing display of the text of the e-book, e.g., the font or font size. The application bar 510 includes a search affordance 518 for searching the text of the e-book. The application bar 510 includes bookmark affordance 519 for adding a bookmark associated with the displayed text of the e-book. The application bar 510 includes a hand-drawn annotations affordance 590 described in detail below.

The application region includes a text display region 520 in which at least a portion of the text of the e-book is displayed. As shown in FIG. 5A, the text display region 520 includes a first column 521 and a second column 522, each including a portion of the text of the e-book. In various implementations, the text display region 520 includes a single column or more than two columns.

Figure 5B:
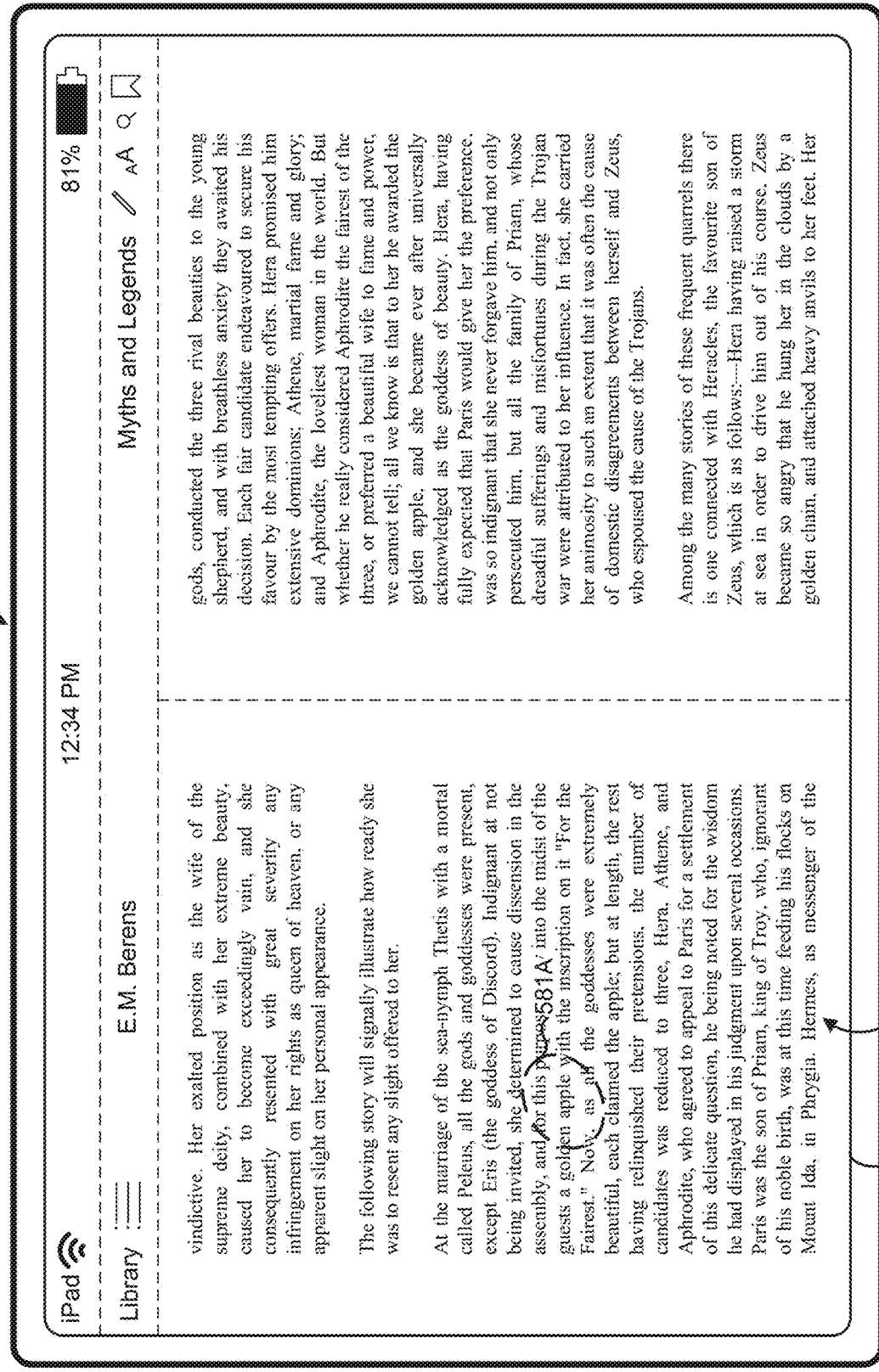

FIG. 5B illustrates the user interface 500 of FIG. 5A with a finger contact 581A detected at a location of the text. In particular, the finger contact 581A is at the location of the word "apple" in the first column 521 of the text display region 520. Although various finger contacts (illustrated as dashed ovals) and stylus contacts (illustrated as dashed circles with a stylus 203) are illustrated throughout the figures and described herein, it is to be appreciated that in various implementations, finger contacts can be replaced with stylus contacts and, similarly, stylus contacts can be replaced with finger contacts. In some embodiments, finger contacts are treated in the same manner as stylus contacts. In some embodiments, finger contacts are treated differently from stylus contacts.

FIG. 5C illustrates the user interface 500, which is displayed in response to detecting the finger contact 581A in FIG. 5B. In response to detecting the finger contact 581A, the word "apple" in the text display region 520 is selected and a selected text menu 530 is displayed in association with the selected text. In various implementations, if the finger contact 581A is a tap (e.g., the time of contact is less than a threshold), the selected text menu 530 is not displayed. In some embodiments, the user interface 500 does not change in response to detecting a tap of a finger. In some embodiments, the user interface 500 changes in ways other than displaying the selected text menu 530, such as scrolling the text or displaying a next page. In various implementations, if the finger contact 581A is a long press (e.g., the time of contact is greater than a threshold), the selected text menu 530 is displayed.

The selected text menu 530 includes a copy affordance 531 for copying the selected text to a clipboard. The selected text menu 530 includes a define affordance 532 for displaying a definition of the selected text. The selected text menu 530 includes a highlight affordance 533 for adding a highlighting annotation to the selected text. The selected text menu 530 includes a note affordance 534 for adding a note annotation to the selected text. The selected text menu 530 includes a drawing affordance 535 for adding a drawing annotation to the selected text.

FIG. 5C illustrates a finger contact 581B detected at a location of the drawing affordance 535.

FIG. 5D illustrates the user interface 500, which is displayed in response to detecting the finger contact 581B in FIG. 5C. In response to detecting the finger contact 581B, a first portion 551A of the displayed text in the first column 521 is moved upwards and a second portion 551B of the displayed text in first column 521 is moved downwards, revealing a non-text region. In FIG. 5D, at least a portion of the non-text region is converted into a drawing panel 540.

As shown in FIG. 5D, moving the first portion 551A of the displayed text relative to the second portion 551B of the displayed text to display the non-text region between the first portion 551A and the second portion 551B does not change display of the second column 522. In various implementations, some of the second portion 551B of the displayed text is reflowed onto the second column 522.

The drawing panel 540 is provided to receive drawing input and display a corresponding graphic in response to receiving the drawing input. The drawing panel 540 includes a number of drawing affordances 541-544 for changing a color or virtual drawing implement that modifies the drawing input and corresponding graphic. In particular, the drawing panel 540 includes a drawing-mode affordance 541 for entering into a drawing mode (e.g., selecting a virtual pencil tool) for adding lines to a drawing within the drawing panel 540. The drawing panel 540 includes a brush affordance 542 for selecting a virtual paintbrush for adding brushstrokes to a drawing within the drawing panel 540. The drawing panel 540 includes an eraser affordance 543 for erasing portions of a drawing within the drawing panel 540. The drawing panel 540 includes a color affordance 544 for selecting a color of additions to a drawing within the drawing panel 540.

FIG. 5E illustrates the user interface 500 of FIG. 5D, which is displayed in response to detecting drawing input within the drawing panel 540. In FIG. 5E, the drawing panel 540 displays a graphic of a drawing 545A corresponding to the detected drawing input. In various implementations, the drawing input can be one or more finger inputs and/or one or more stylus inputs.

FIG. 5E illustrates a finger contact 581C detected at a location outside the drawing panel 540.

Figure 5F:
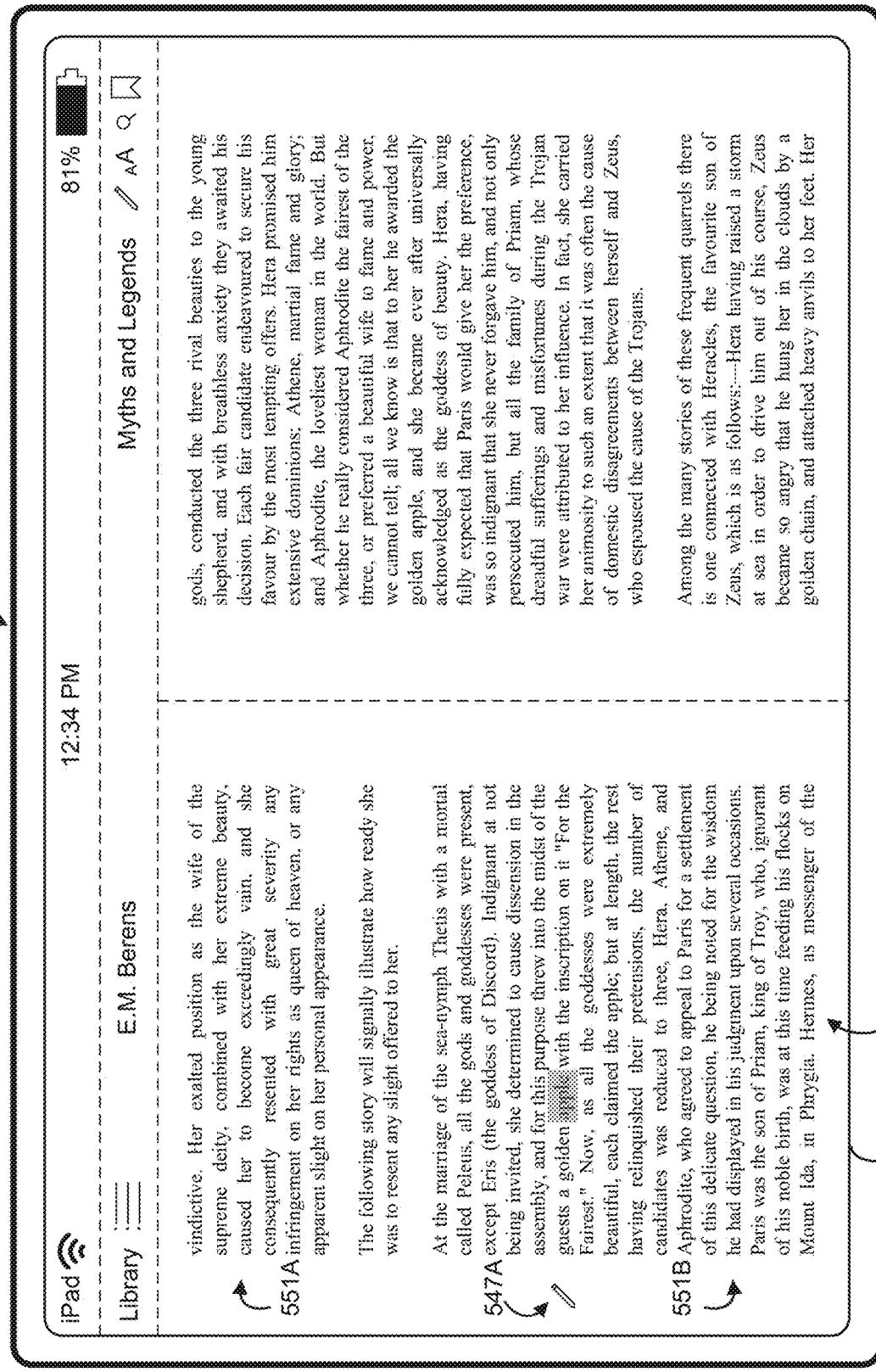

FIG. 5F illustrates the user interface 500, which is displayed in response to detecting the finger contact 581C. In FIG. 5F, the first portion 551A and second portion 551B of displayed text of the first column 521 are moved relative to each other to cease display of the non-text region and the drawing panel 540 thereof.

In FIG. 5F, the user interface 500 includes a drawing indicator 547A displayed at a location corresponding to a location between the first portion 551A and the second portion 551B. In particular, the drawing indicator 547A is displayed within a margin to the left of a location between the first portion 551A and the second portion 551B. Further, the selected text (e.g., the word "apple") is highlighted to indicate that the drawing annotation is associated with that text.

Figure 5G:
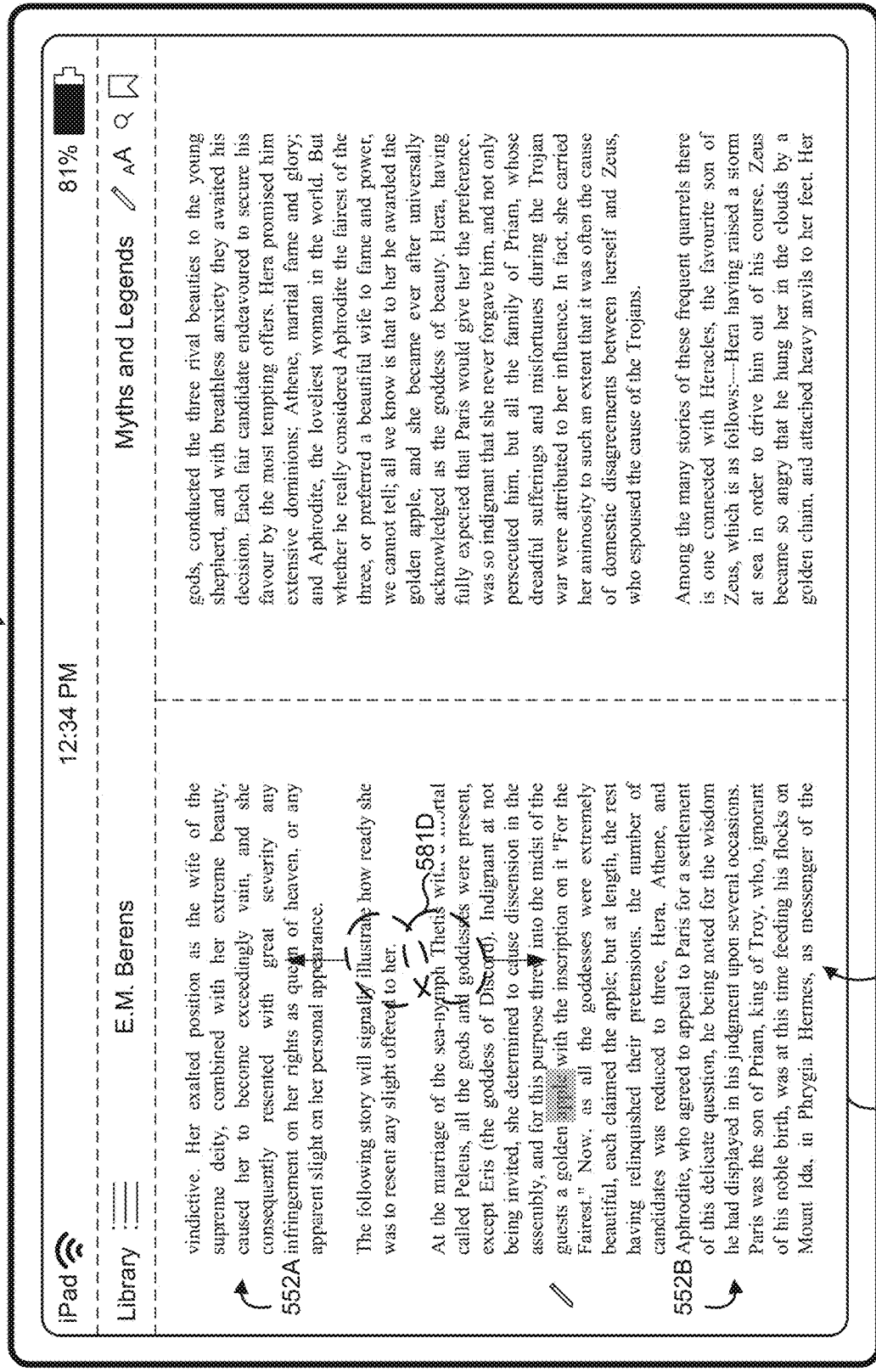

FIG. 5G illustrates the user interface 500 of FIG. 5F with a de-pinch gesture 581D detected within the first column 521A. The de-pinch gesture 581D is detected between a first portion 552A of the displayed text of the first column 521 (which differs from the first portion 551A illustrated earlier) and a second portion 552B of the displayed text of the first column 521 (which differs from the second portion 551B illustrated earlier).

Figure 5H:
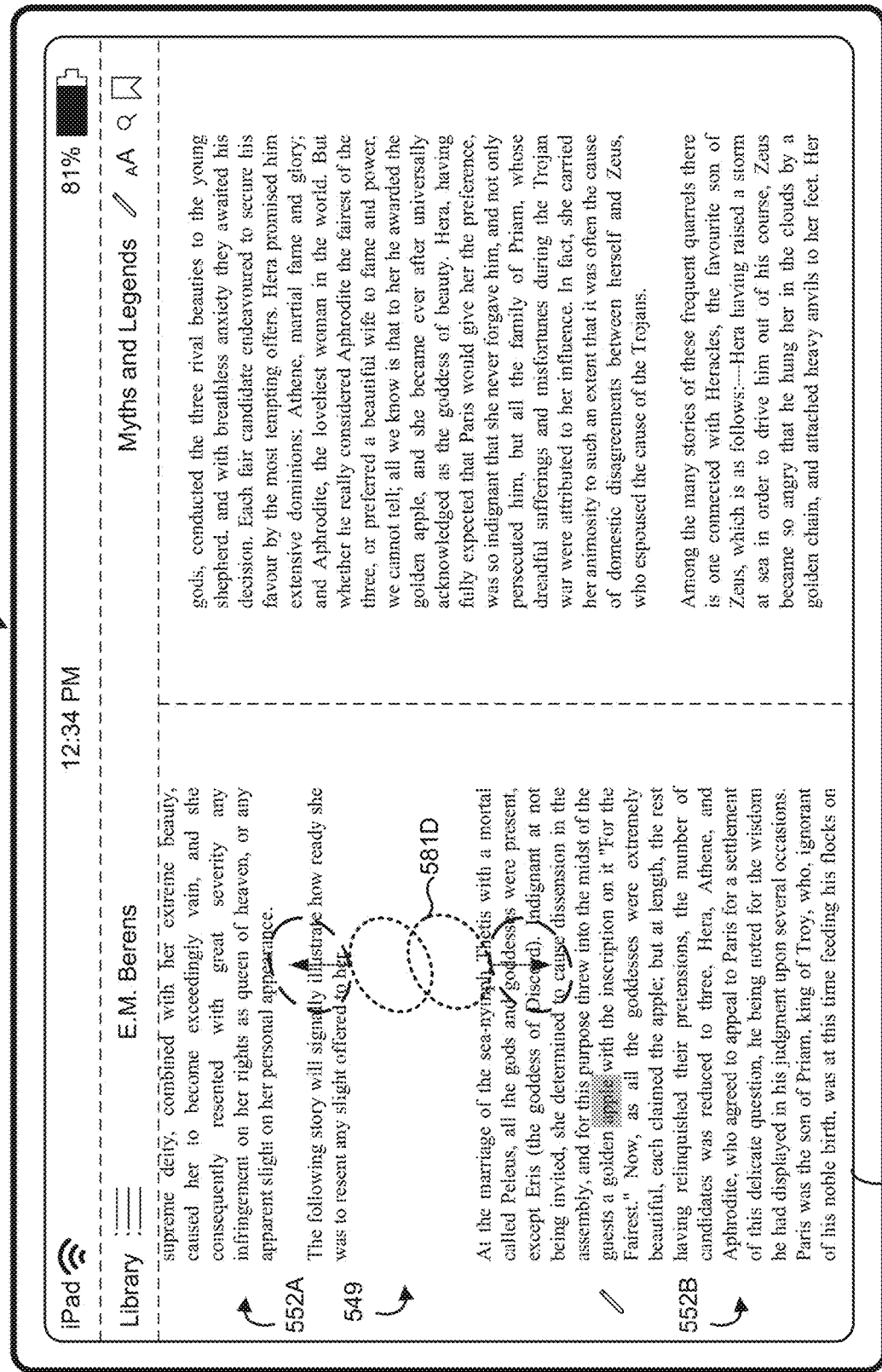

FIG. 5H illustrates the user interface 500, which is displayed in response to detecting a first portion of the de-pinch gesture 581D. In particular, FIG. 5H illustrates the user interface 500 in response to detecting a first finger contact and a second finger contact moving a first distance away from each other. In FIG. 5H, the first portion 552A is moved relative to the second portion 552B to display a non-text region 549 between the first portion 552A and second portion 552B.

Figure 5I:
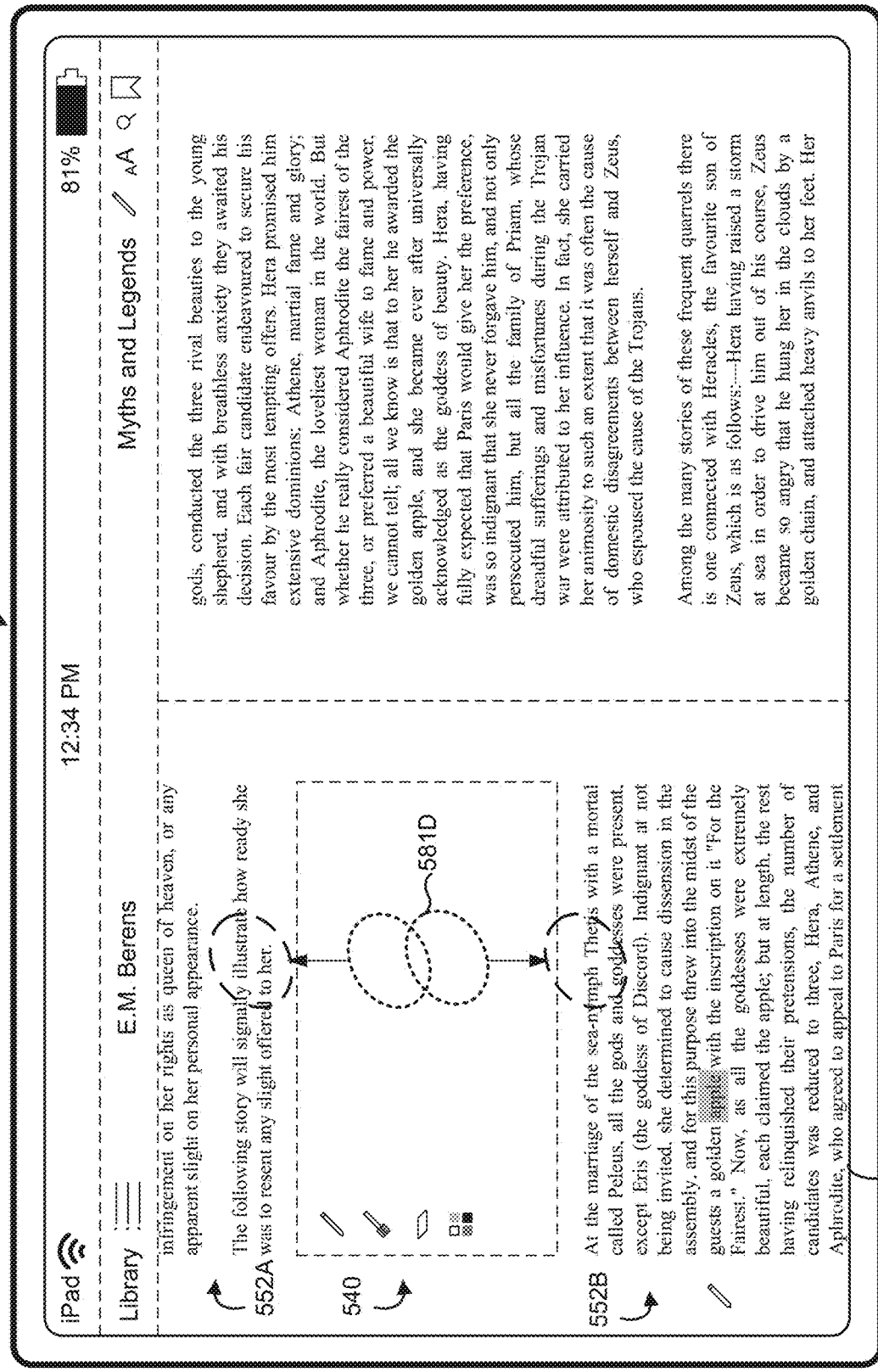

FIG. 5I illustrates the user interface 500, which is displayed in response to detecting a second portion of the de-pinch gesture 581D. In particular, FIG. 5I illustrates the user interface 500 in response to detecting the first finger contact and second finger contact moving a second distance away from each other and lift-off of the first finger contact and second finger contact.

In FIG. 5I, the non-text region 549 is increased in size and at least a portion of the non-text region 549 has been converted into a drawing panel 540.

Figure 5J:
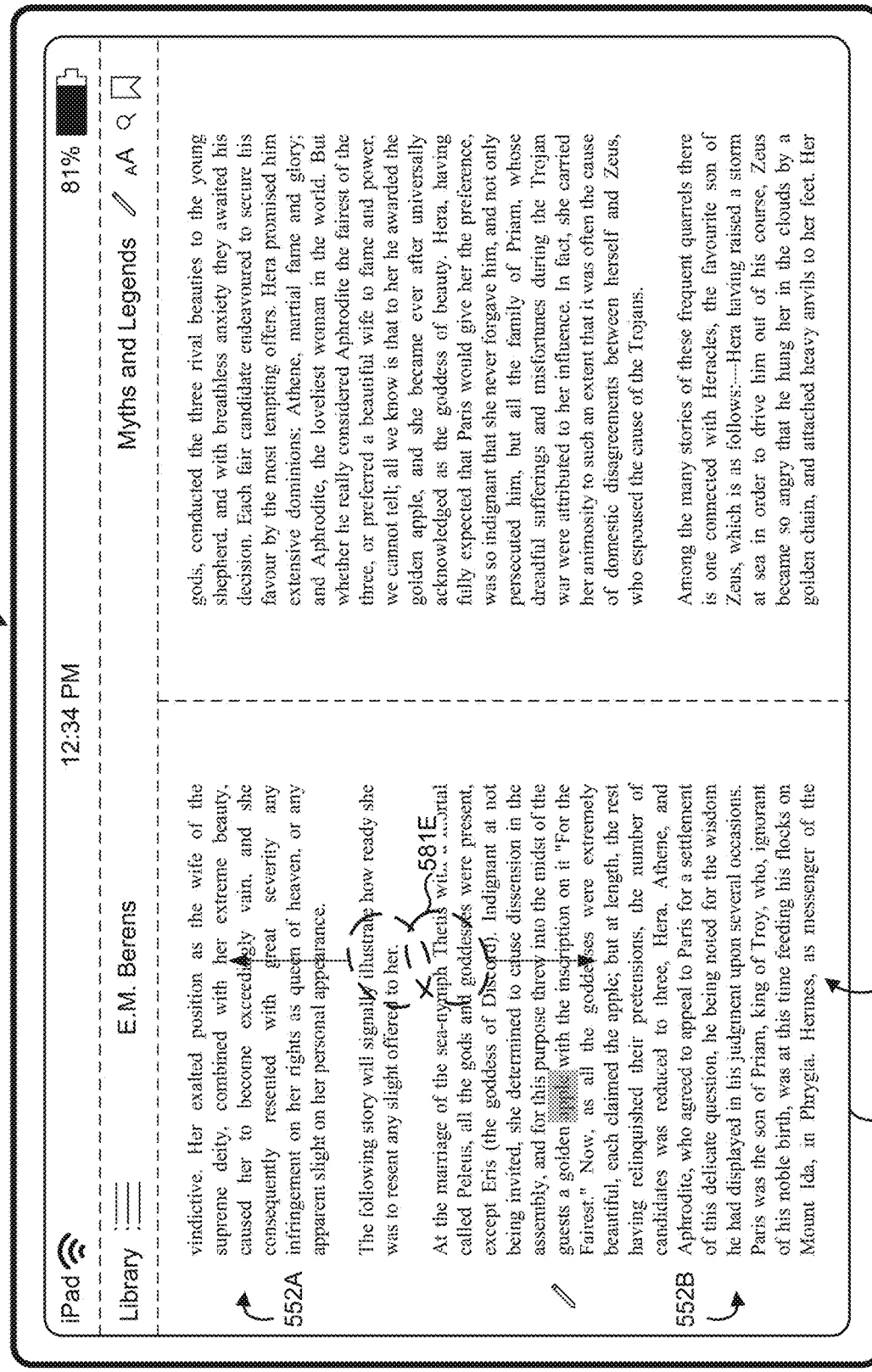

FIG. 5J, like FIG. 5G, illustrates the user interface 500 of FIG. 5F with a de-pinch gesture 581E detected within the first column 521A. The de-pinch gesture 581E of FIG. 5J differs from the de-pinch gesture of FIG. 5G in that the distance moved by the two finger contacts is greater.

Figure 5K:
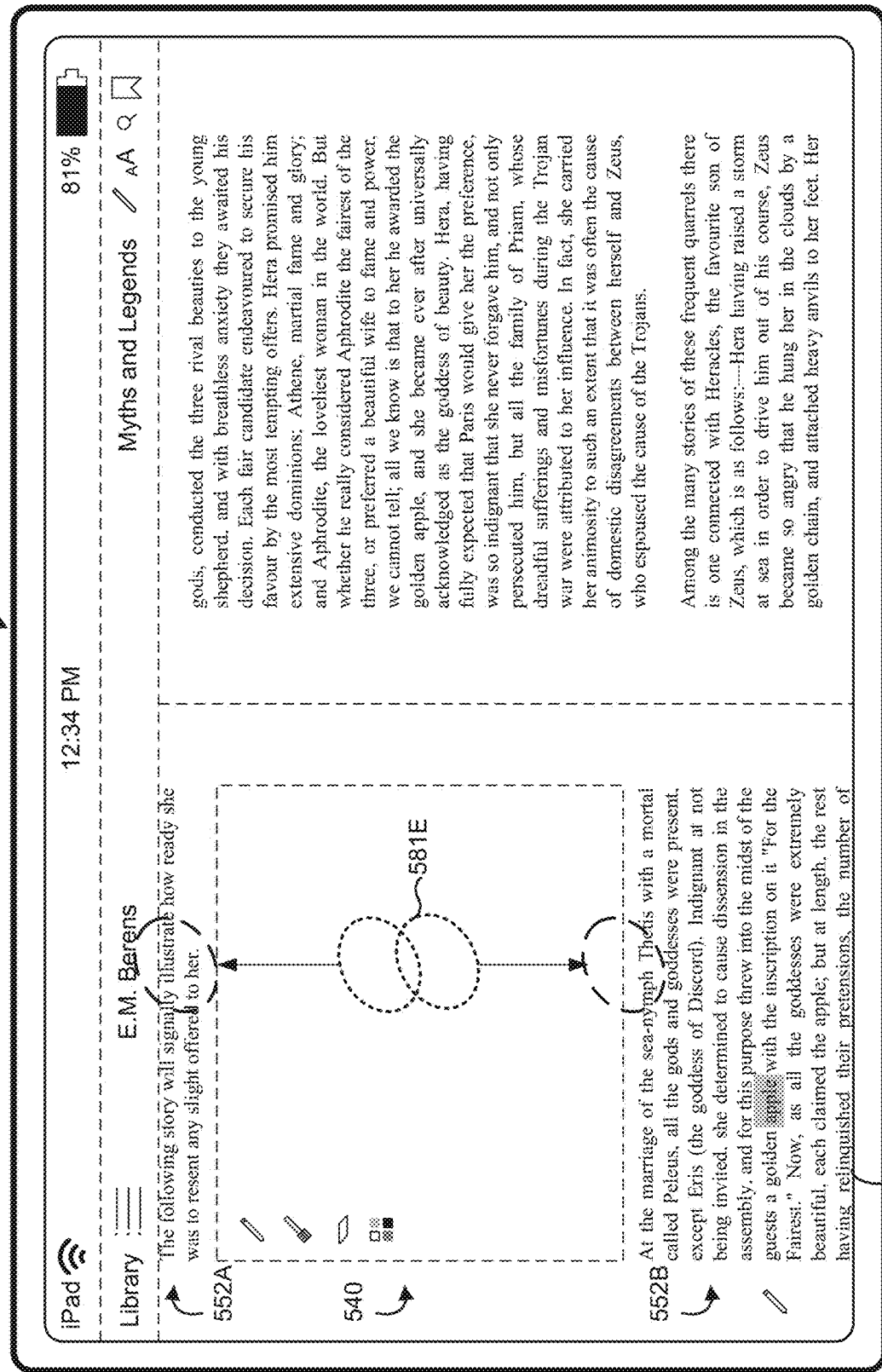

FIG. 5K illustrates the user interface 500, which is displayed in response to detecting the de-pinch gesture 581E. In FIG. 5K, the first portion 552A and second portion 552B are moved relative to each other to display a non-text region of which at least a portion has been converted into a drawing region 540.

In comparing FIG. 5I and FIG. 5K, the drawing panel 540 of FIG. 5K is larger than the drawing panel 540 of FIG. 5I. In various implementations, the size of the drawing panel 540 is proportional to the size of the de-pinch gesture, e.g., the distance moved by the two finger contacts.

As described above, in displaying the drawing panel 540, a first portion 552A of the text is moved relative to a second portion 552B of the text. In particular, the first portion 552A is moved a first distance in a first direction (e.g., up) and the second portion 552B is moved a second distance in a second direction (e.g., down). In some embodiments, the first distance is the same as the second distance. In some embodiments, however, the first distance is different from the second distance. In various implementations, the first distance and the second distance are selected based the location of the input that opens the drawing panel 540. In some implementations, the first distance and second distance are selected so as to maintain at least a subset of the first portion 552A and at least a subset of the second portion 552B on the display. For example, as shown in FIG. 5K, the user interface 500 includes a subset of the first portion 552A above the drawing panel 540 and a subset of the second portion 522B below the drawing panel. In particular, the first distance moved by the first portion 552A is small enough that the first portion 552A is not removed from the display. For example, as shown in FIG. 5K, if the boundary between a first portion 552A above the boundary and a second portion 552B below the boundary is closer to the top of the display, the first portion 552A moves less than the second portion 552B. While, as shown in FIG. 5D (and, similarly, in FIG. 5P described below), if the boundary between the first portion 551A and the second portion 551B is closer to a bottom of the display, the first portion 551A moves more than the second portion 551B.

Figure 5L:
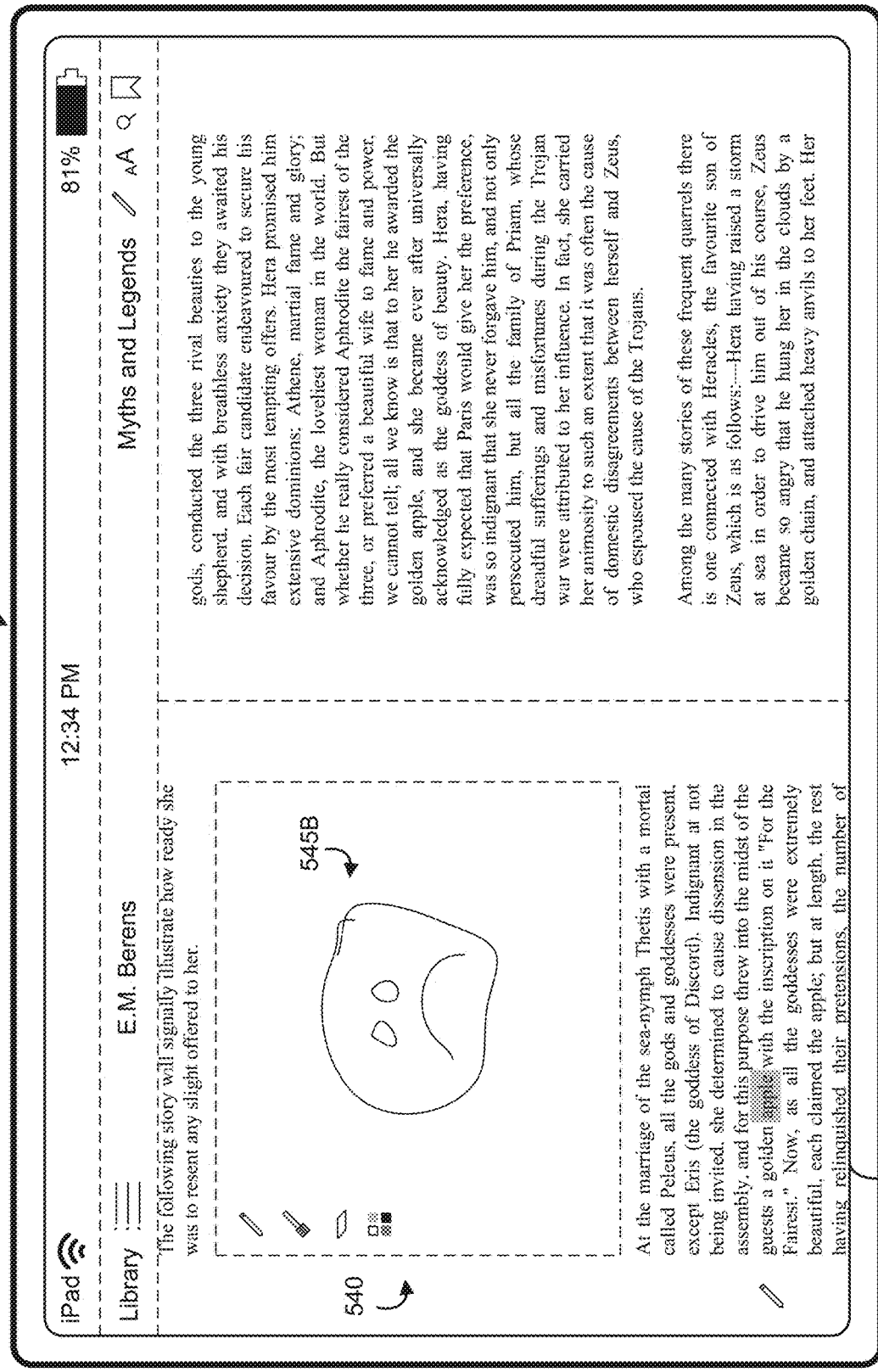

FIG. 5L illustrates the user interface 500 of FIG. 5K, which is displayed in response to detecting drawing input within the drawing panel 540. In FIG. 5L, the drawing panel 540 displays a graphic of a drawing 545B corresponding to the detected drawing input.

FIG. 5M illustrates the user interface 500 of FIG. 5L with a pinch gesture 581F detected within the first column 521. The pinch gesture 581F includes two finger contacts moving towards each other. In various implementations, as illustrated in FIG. 5M, one or both of the two finger contacts can be detected within the drawing panel 540. In some embodiments, one or both of the two finger contacts are detected outside of the drawing panel 540.

Figure 5N:
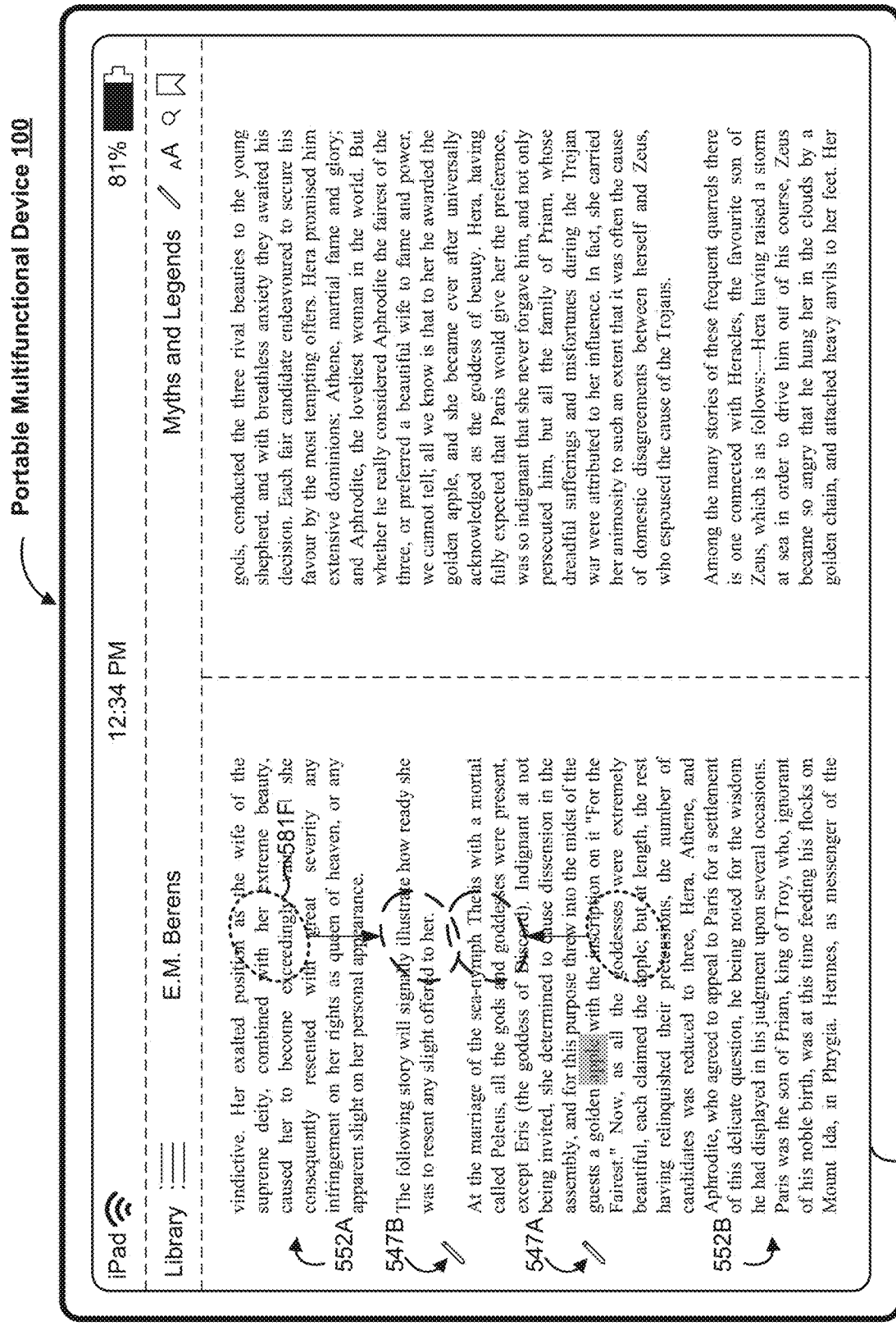

FIG. 5N illustrates the user interface 500, which is displayed in response to detecting the pinch gesture 581F. In response to the pinch gesture 581F, the first portion 552A and second portion 552B have moved relative to each other to cease display of the non-text region and the drawing panel 540 thereof.

In FIG. 5N, the user interface 500 includes a drawing indicator 547B displayed at a location corresponding to a location between the first portion 552A and the second portion 552B. The drawing indicator 547A associated with the previously selected text (e.g., the word "apple") is also displayed.

Figure 5O:
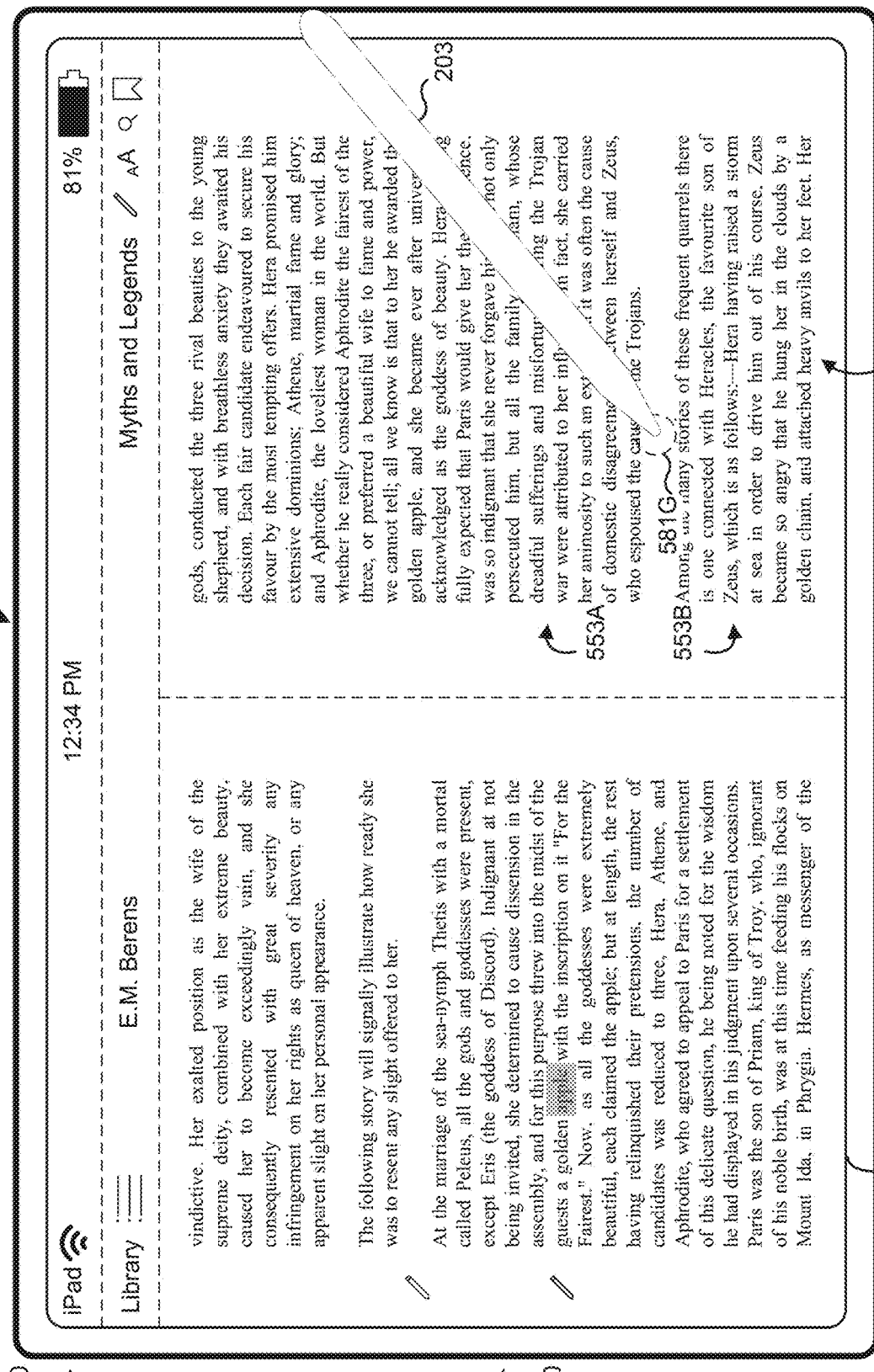

FIG. 5O illustrates the user interface 500 of FIG. 5N with a stylus contact 581G detected at a location between two paragraphs of the text of the second column 522. In particular, the stylus contact 581G is generally between a first portion 553A of text displayed in the second column 522 and a second portion 553B of text displayed in the second column 522.

Figure 5P:
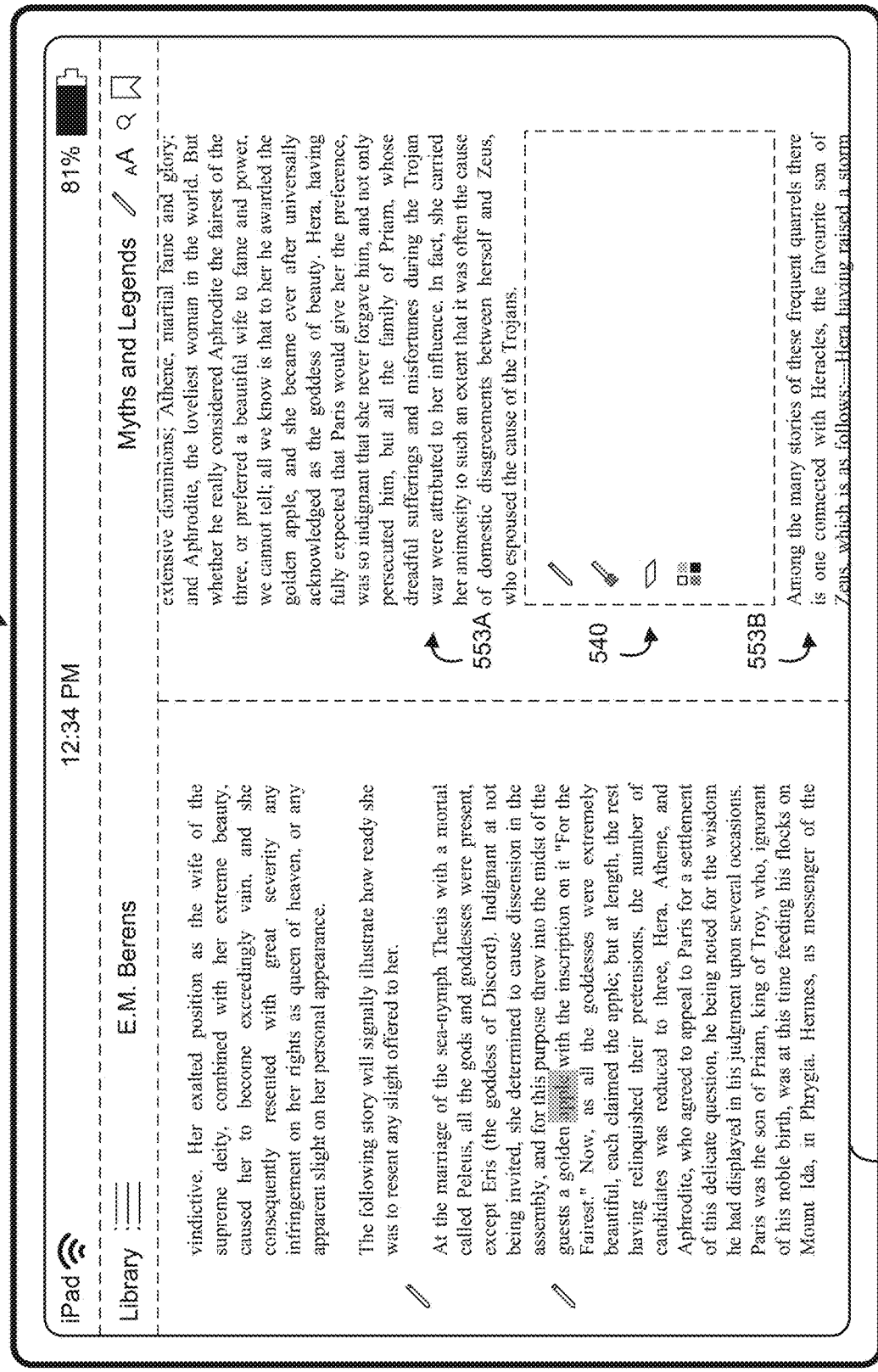

FIG. 5P illustrates the user interface 500, which is displayed in response to detecting the stylus contact 581G. In FIG. 5P, the first portion 553A and second portion 533A are moved relative to each to display a non-text region which has been converted into a drawing region 540.

In various implementations, in response to detecting a tap from the stylus, the user interface 500 displays the drawing panel 540, but, in response to detecting a tap from a finger, the user interface 500 does not display the drawing panel 540. Rather, in response to detecting a tap from a finger, the user interface 500 does not change or changes in another way, such as a navigation operation or displaying the selected text menu 530 described above.

In various implementations, the size of the drawing panel 540 is proportional to a magnitude of a property of the stylus contact 581G. In some embodiments, the property is a force, time, or distance of the stylus contact 581G.

Figure 5Q:
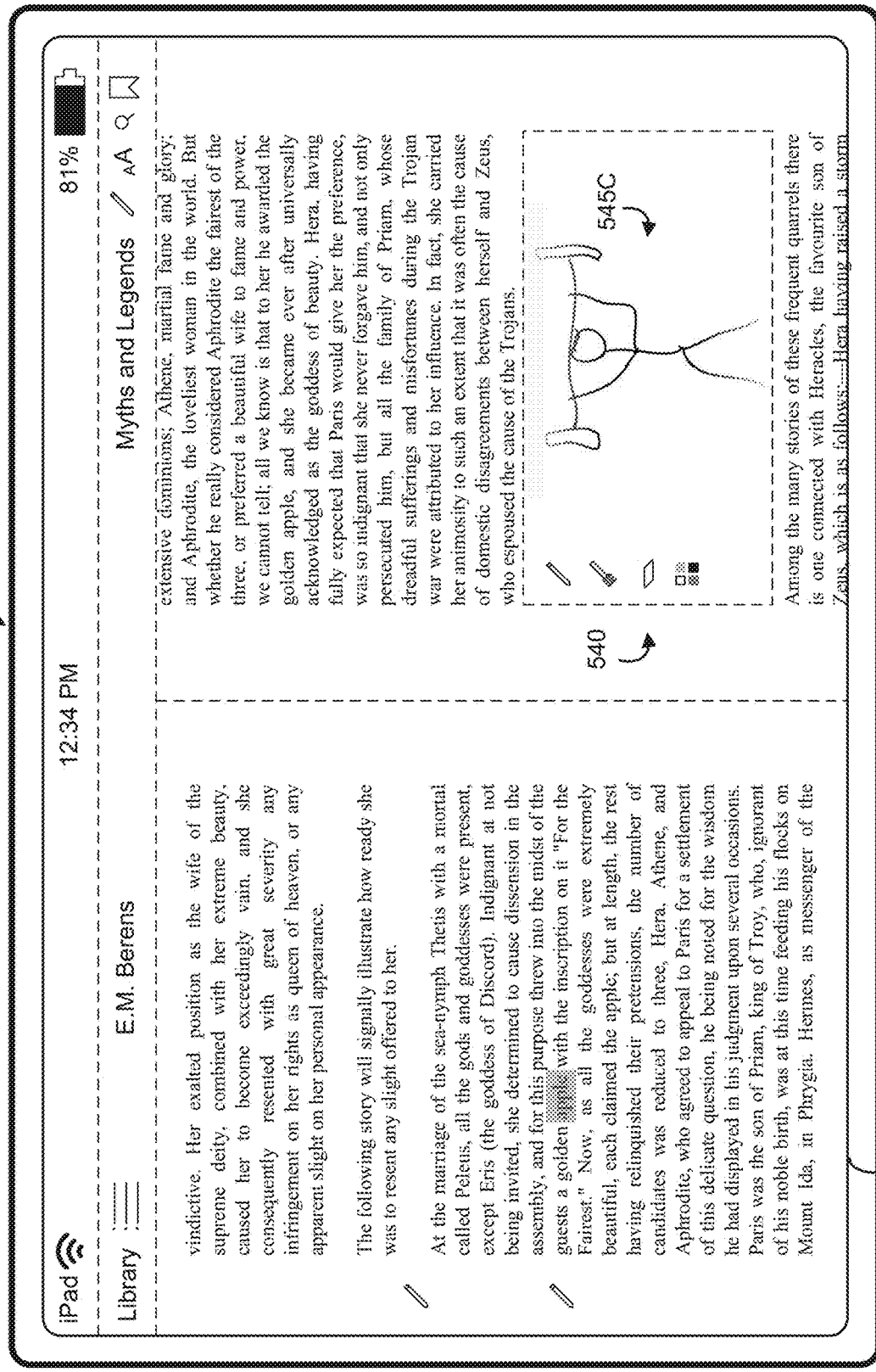

FIG. 5Q illustrates the user interface 500 of FIG. 5P, which is displayed in response to detecting drawing input within the drawing panel 540. In FIG. 5Q, the drawing panel 540 displays a graphic of a drawing 545C corresponding to the detected drawing input. As shown in FIG. 5Q, the drawing panel 540 is displayed with a feathered border so that portions of the drawing 545C that are near the edge of the drawing panel 540 gradually fade out. Thus, the user interface 500 displays the graphic of the drawing 545C by fading the graphic near the edges of the drawing panel 540.

Figure 5R:
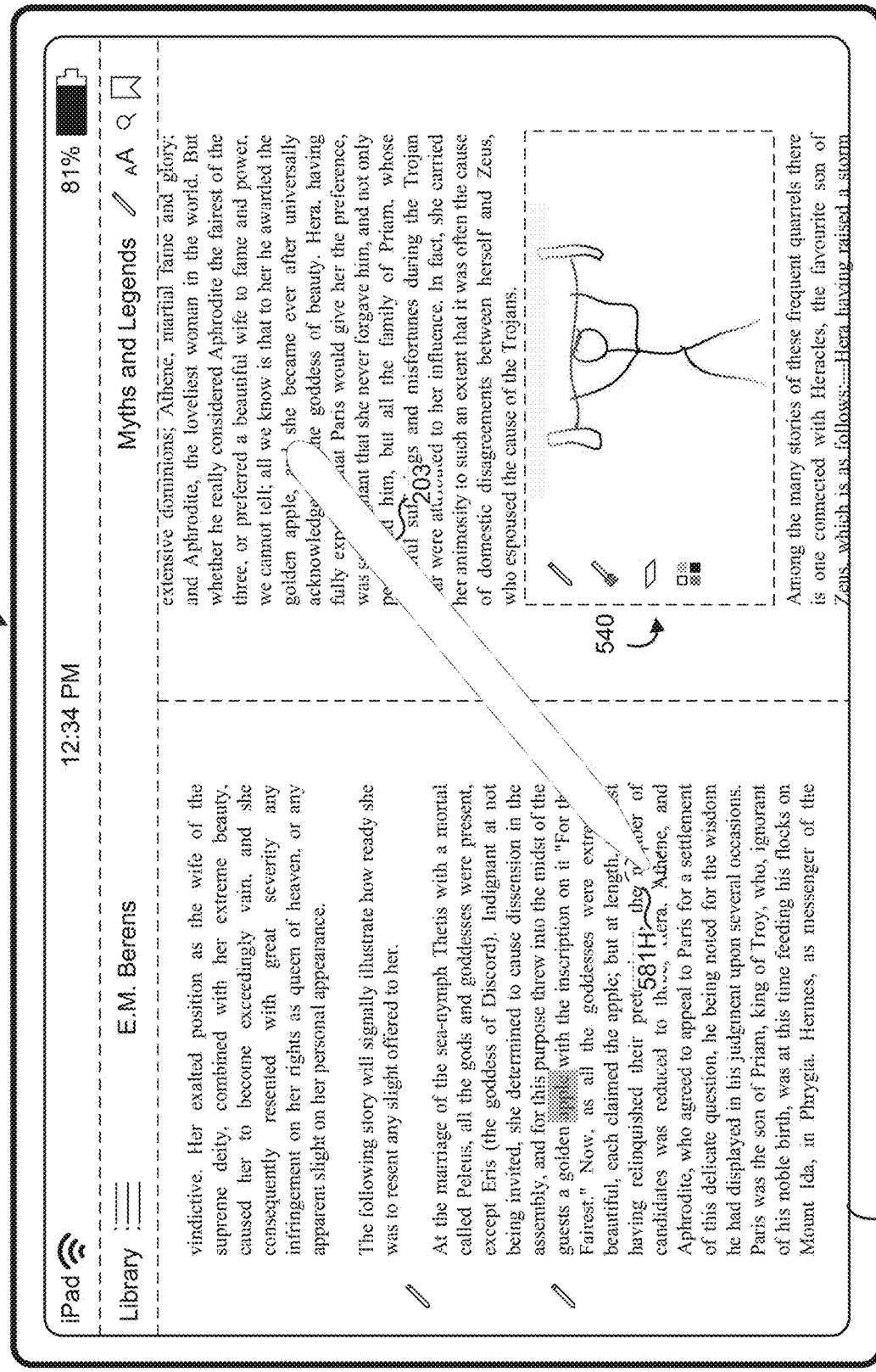

FIG. 5R illustrates the user interface 500 of FIG. 5Q with a stylus contact 581H detected at a location outside the drawing panel 540.

FIG. 5S illustrates the user interface 500 of FIG. 5R, which is displayed in response to detecting the stylus contact 581H. In response to detecting the stylus contact 581H, the first portion 553A and second portion 553B have been moved relative to each other to cease display of the drawing panel 540. In FIG. 5S, the user interface 500 includes a drawing indicator 547C displayed at a location corresponding to a location between the first portion 553A and the second portion 554B. The drawing indicators 547A-547B associated with other drawings are also displayed.

FIG. 5S illustrates a finger contact 581I detected at a location of the drawing indicator 547A associated with the previously selected text (e.g., the word "apple").

Figure 5T:
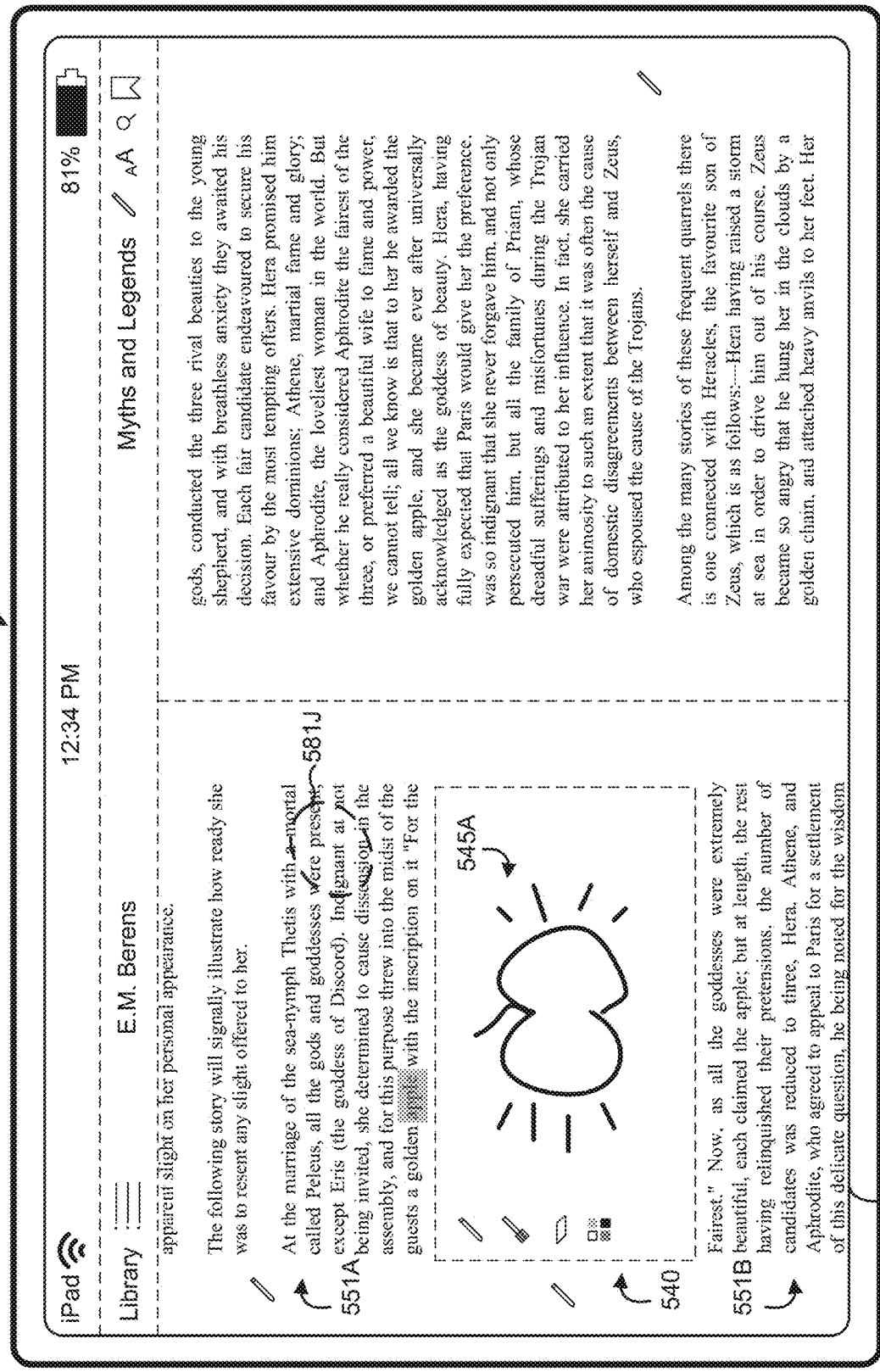

FIG. 5T illustrates the user interface 500, which is displayed in response to detecting the finger contact 581I. In response to detecting the finger contact 581I, the first portion 551A and second portion 551B are moved to display the drawing panel 540 including a graphic of the drawing 545A previously input.

FIG. 5T illustrates a finger contact 581J detected at a location outside the drawing panel 540.

Figure 5U:
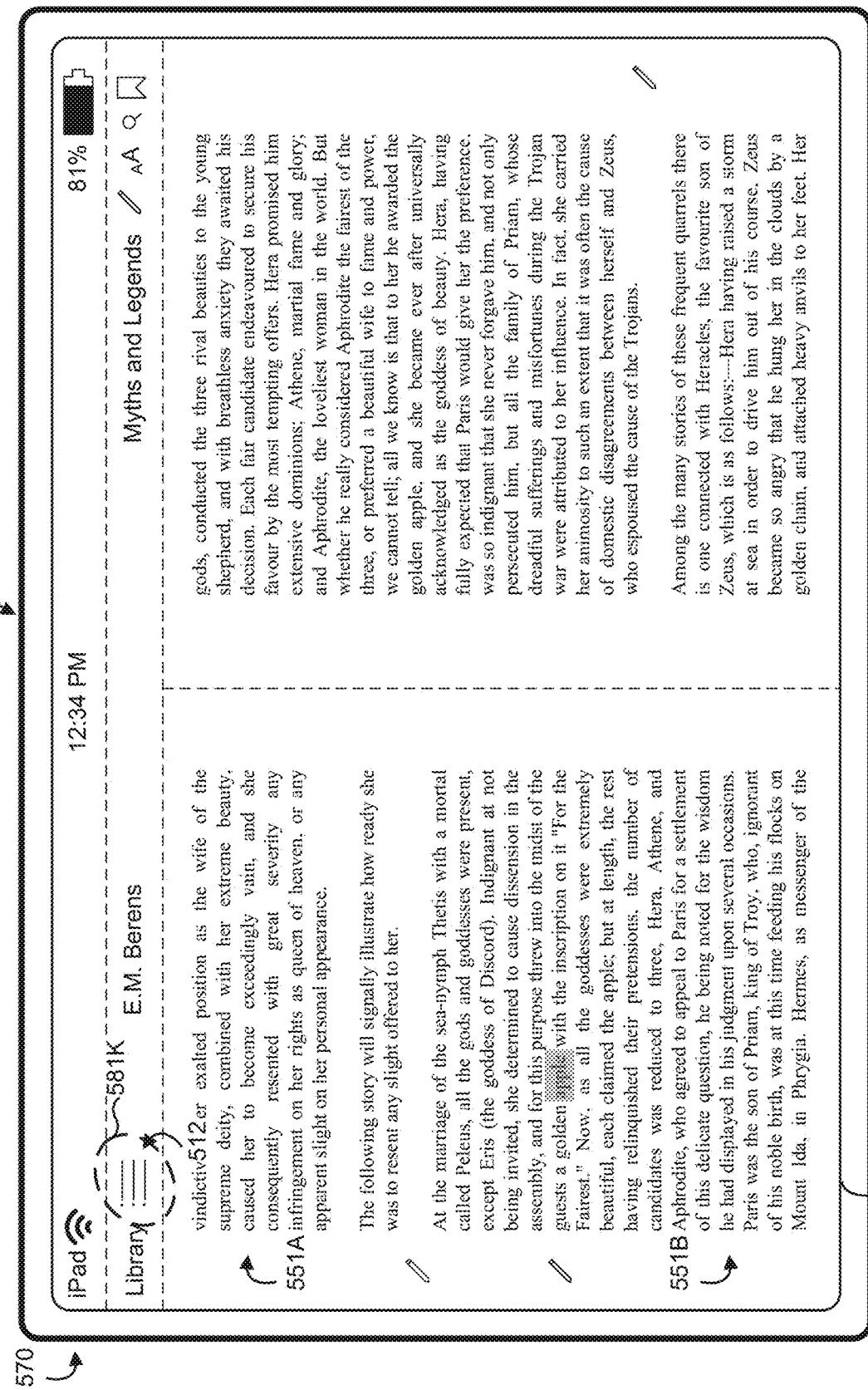

FIG. 5U illustrates the user interface 500, which is displayed in response to detecting the finger contact 581J. In response to detecting the finger contact 581J, the first portion 551A and second portion 551B are moved to cease display of the drawing panel 540.

FIG. 5U illustrates a finger contact 581K detected at a location of the contents affordance 512.

Figure 5V:
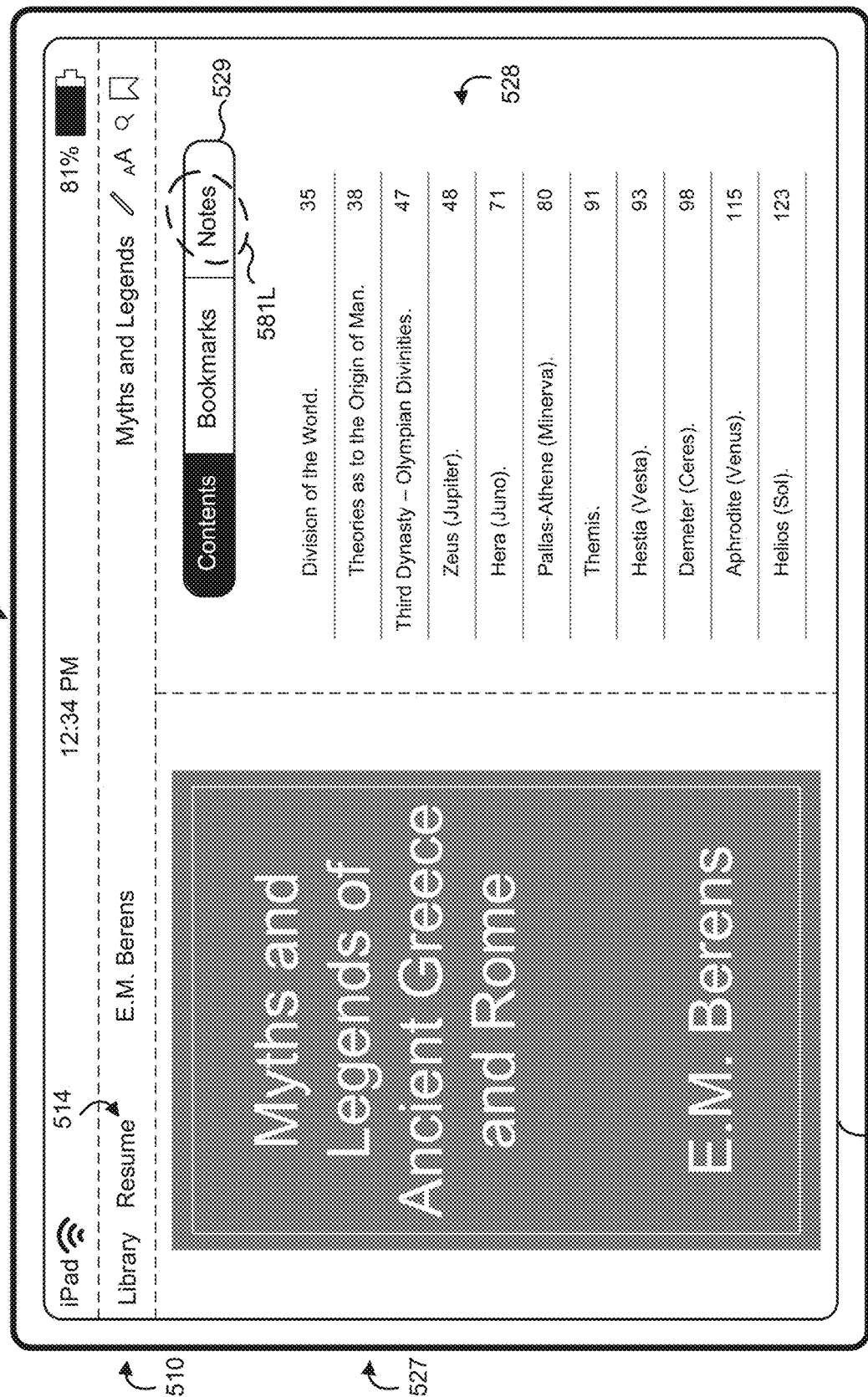

FIG. 5V illustrates the user interface 500, which is displayed in response to detecting the finger contact 581K. In response to detecting the finger contact 581K at the location of the contents affordance 512, the user interface 500 displays a contents view. Within the contents view, the application bar 510 is changed to display, in place of the contents affordance 512, a resume affordance 514 for returning to the reading view illustrated in the previous figures. Within the contents view, the text display region 520 is replaced with a metadata display region 527 which shows, in the contents view, a table of contents 528 of the e-book with affordances for displaying corresponding portions of the text of the e-book.

The metadata display region 527 includes a view toggle affordance 529 for toggling between the contents view, a bookmarks view including a listing of bookmarks of the e-book, and a notes view including a listing of annotations of the e-book.

FIG. 5V illustrates a finger contact 581L detected at a location of the view toggle affordance 529 corresponding to the notes view.

Figure 5W:
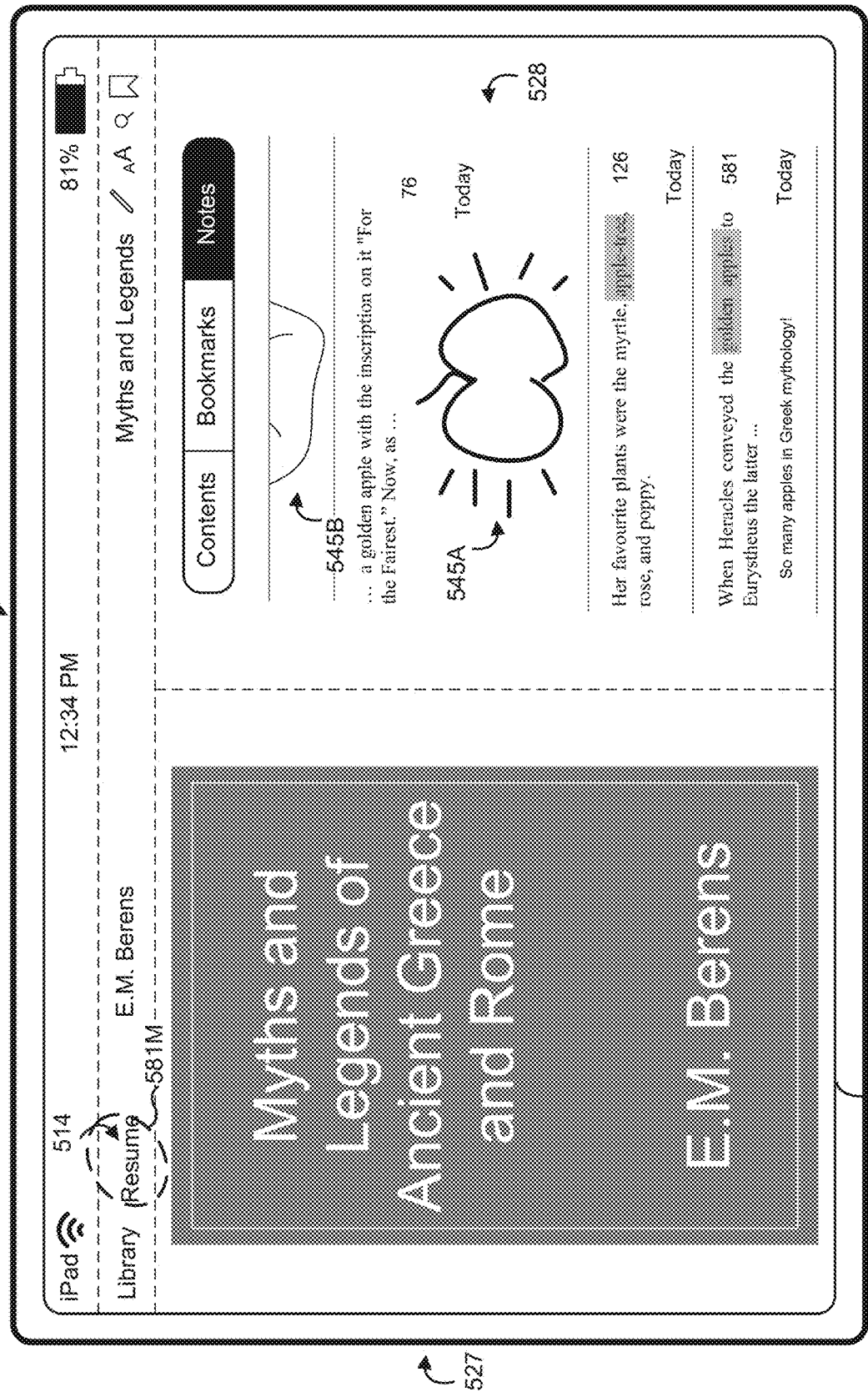

FIG. 5W illustrates the user interface 500, which is displayed in response to detecting the finger contact 581L. In FIG. 5W, the user interface 500 displays a notes view. In the notes view, the metadata display region 527 includes an annotations list 528 listing annotations of the e-book. The annotations list 528 includes drawing annotations added by the user in addition to other annotations added by the user (e.g., notes and highlighting). In particular, as shown in FIG. 5W, the annotations list 528 includes graphics of the drawing 545A (and a portion of the graphic of a portion of the drawing 545B) in conjunction with additional annotations.

FIG. 5W illustrates a finger contact 581M detected at the location of the resume affordance 514.

Figure 5X:

FIG. 5X illustrates the user interface 500, which is displayed in response to detecting the finger contact 581M and additional inputs to navigate to another portion of the e-book. In FIG. 5X, the text display region 520 includes a first arrangement of text 525A in two columns. The first arrangement of text 525A includes various portions of text in various positions. As illustrated below, the text being reflowable allows other arrangements of text to include the various portions of text in different positions.

FIG. 5X illustrates a finger contact 581N detected at the location of the hand-drawn annotations affordance 590. In response to detecting the finger contact 581N at the location of the hand-drawn annotations affordance 590, the user interface 500 enters a hand-drawn annotations mode in which finger contacts are interpreted as hand-drawn annotations. In some embodiments, stylus contacts are interpreted as hand-drawn annotations without explicitly entering the hand-drawn annotations mode (e.g., via the hand-drawn annotations affordance 590). In response to detecting a second finger contact at the location of the hand-drawn annotations affordance 590, the user interface 500 exits the hand-drawn annotations mode and finger contacts are interpreted according to default behavior.

Figure 5Y:
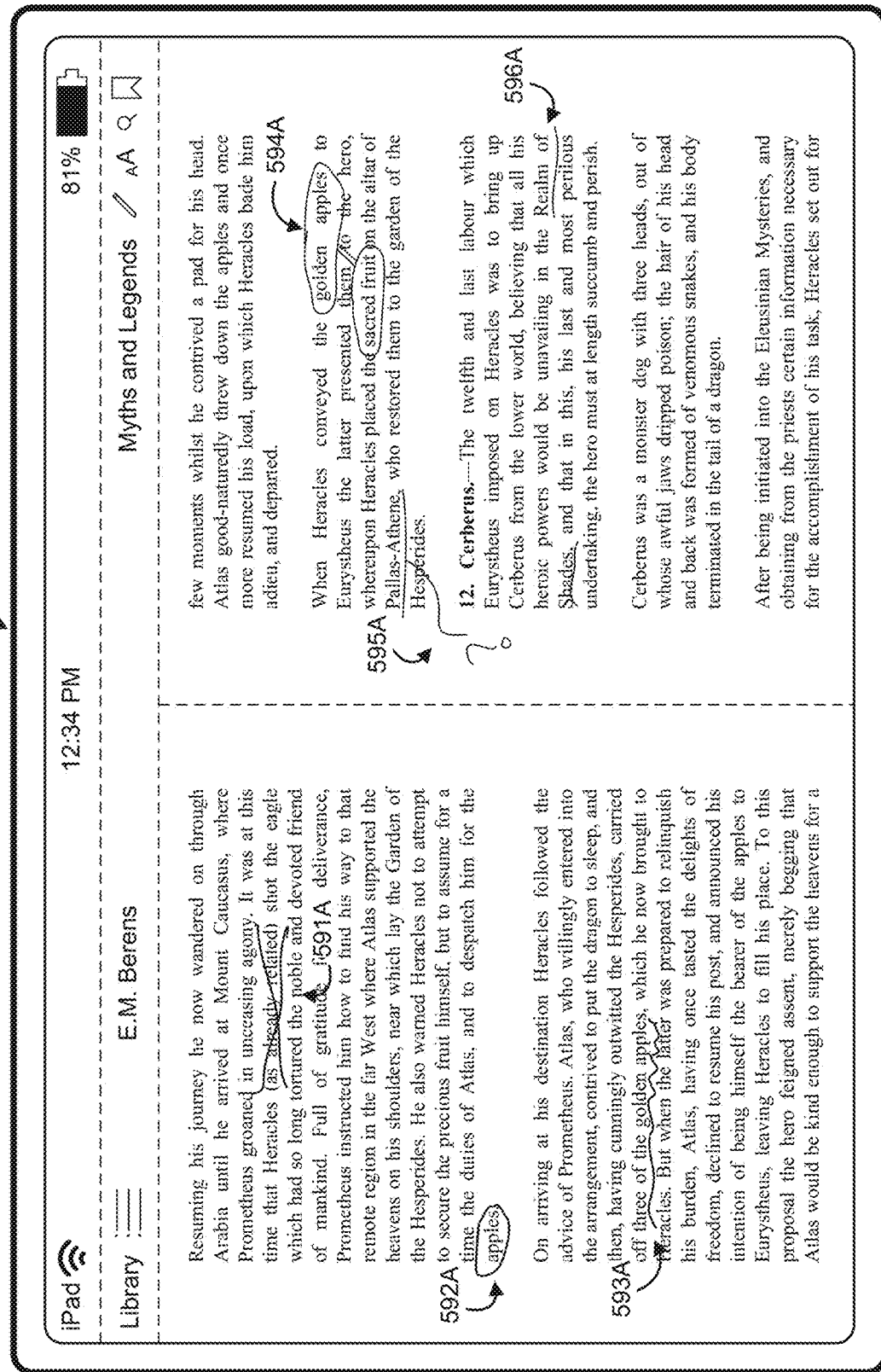

FIG. 5Y illustrates the user interface 500, which is displayed in response to receiving a number of sets of one or more annotation inputs, each set corresponding to an individual annotation associated with a portion of the text (each portion of the text itself including multiple portions as described below). In various implementations, a portion of text includes a character, multiple characters, a word, multiple words, a line, multiple lines, a paragraph, or multiple paragraphs. The user interface 500 displays a representation of each annotation in association with the portion of the text. The shape of the representation corresponds to locations on the display at which the set of annotation inputs are detected. Thus, on a touch-sensitive display, the representation is displayed (at least initially) at the same locations at which contact is detected. Accordingly, the representation is not automatically generated based on selection of an annotation type, but the representation reflects the input provided by an individual user. This allows a user to input a limitless number of different types of annotation.

The user interface 500 includes a first representation of a strikethrough annotation 591A over the portion of the text reading "(as already related)". A strikethrough annotation can be generated in response to detecting a set of one or more annotation inputs that includes one or more strikethrough inputs at least partially detected at a set of locations over the portion of the text associated with the strikethrough annotation. The strikethrough annotation can take various forms, such as a line through the text, crossing out the text (as shown by the first representation of the strikethrough annotation 591A), highlighting the text with a non-black color, or any other annotation over the portion of text.

The user interface includes a first representation of an encircling annotation 592A around the portion of the text reading "apples.". An encircling annotation can be generated in response to detecting a set of one or more annotation inputs includes one or more encircling inputs at least partially detected at a set of locations surrounding the portion of text associated with the encircling annotation. The encircling annotation can take various forms, such as a circle around the text (as shown by the first representation of the encircling annotation 592A), a box around the text, or a cloud shape around the text. Further, the encircling annotation need not completely surround the text, but includes portions on at least two sides of the portion of text. Thus, the encircling annotation can include a line above the text and a line below the text (sandwiching the text) or bracketing the text, or any other annotation surrounding (even if not completely surrounding) the portion of text.

The user interface 500 includes a first representation of an underlining annotation 593A below the portion of text reading "three of the golden apples". An underlining annotation can be generated in response to detecting a set of one or more annotation inputs including one or more underlining inputs at least partially detected at a set of locations below the portion of text associated with the underlining annotation. The underlining annotation can take various forms, such as a straight line, a wavy line (as shown by the first representation of the underlining annotation 593A), a dashed line, or any other annotation below the portion of text.

The user interface 500 includes a first representation of a text-connecting annotation 594A connecting a first portion of the text reading "golden apples" with a second portion of the text reading "sacred fruit". A text-connecting annotation can be generated in response to detecting a set of one or more annotation inputs including a first set of one or more annotation inputs detected at locations associated with the first portion of the text, a second set of one or more annotation inputs detected at locations associated with the second portion of the text, and a third set of one or more annotation inputs detects at locations between the first portion of the text and the second portion of the text. The text-connecting annotation can take various forms, such as one or more lines between encircling annotations (as shown by the first representation of the text-connecting annotation 594A) or one or more lines between underlining annotations.

The user interface 500 includes a first representation of a drawing-connecting annotation 595A connecting a portion of the text reading "Pallas-Athene" to a drawing of a question mark. The drawing-connecting annotation can be generated in response to detecting a set of one or more annotation inputs include a first set of one or more annotation inputs detected at locations associated with a portion of text, a second set of one or more annotation inputs detected at locations unassociated with a portion of text, and a third set of one or more annotation inputs detected at locations between the first portion of text and locations unassociated with a portion of text.

The user interface 500 includes a first representation of an underlining annotation 596A below the portion of text reading "Realm of Shades". The first representation of the underlining annotation 596A includes two separate sub-portions, one below the sub-portion of text reading "Realm of" and another below the sub-portion of text reading "Shades".

Figure 5Z:
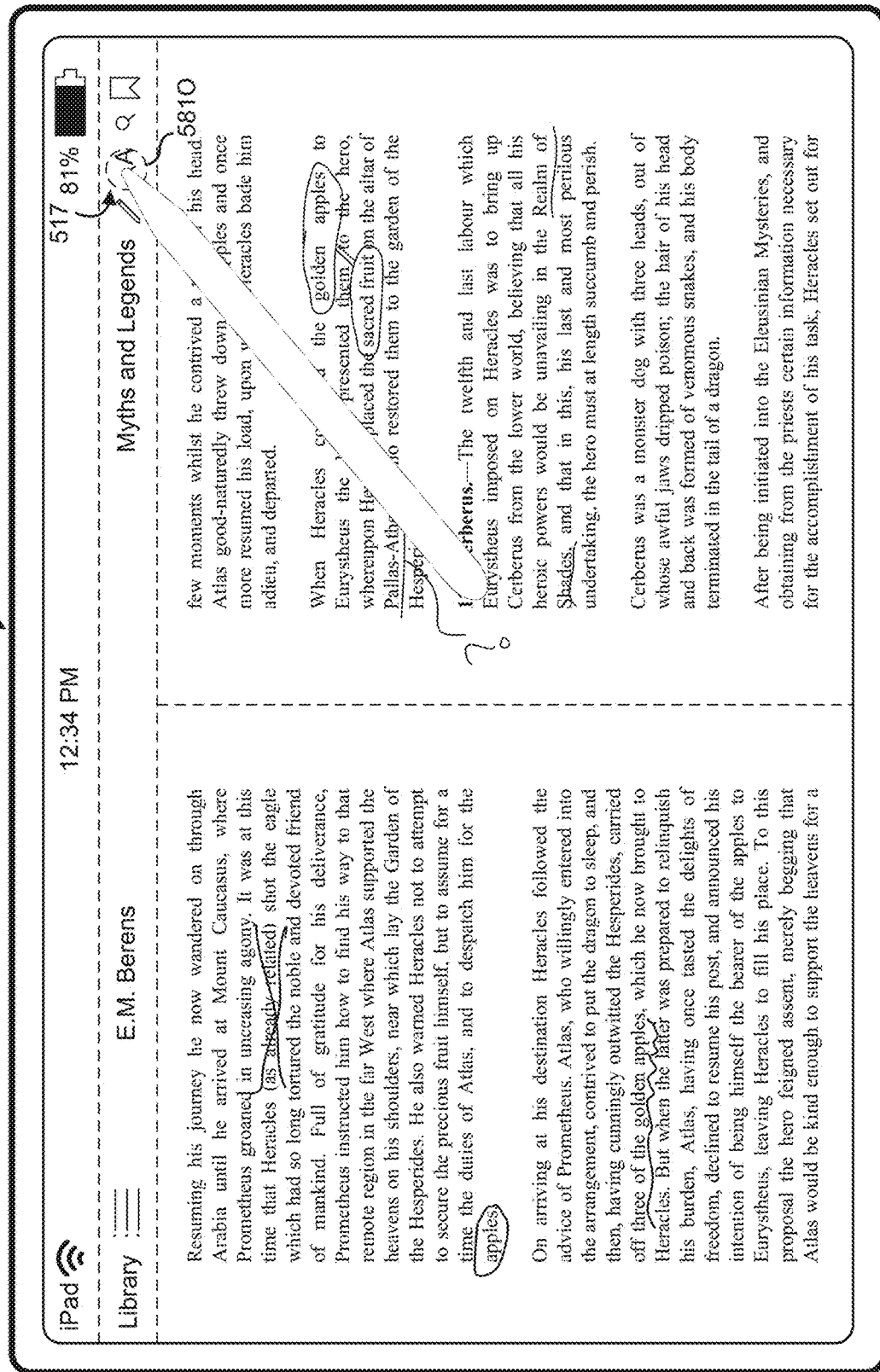
Figure 5A:
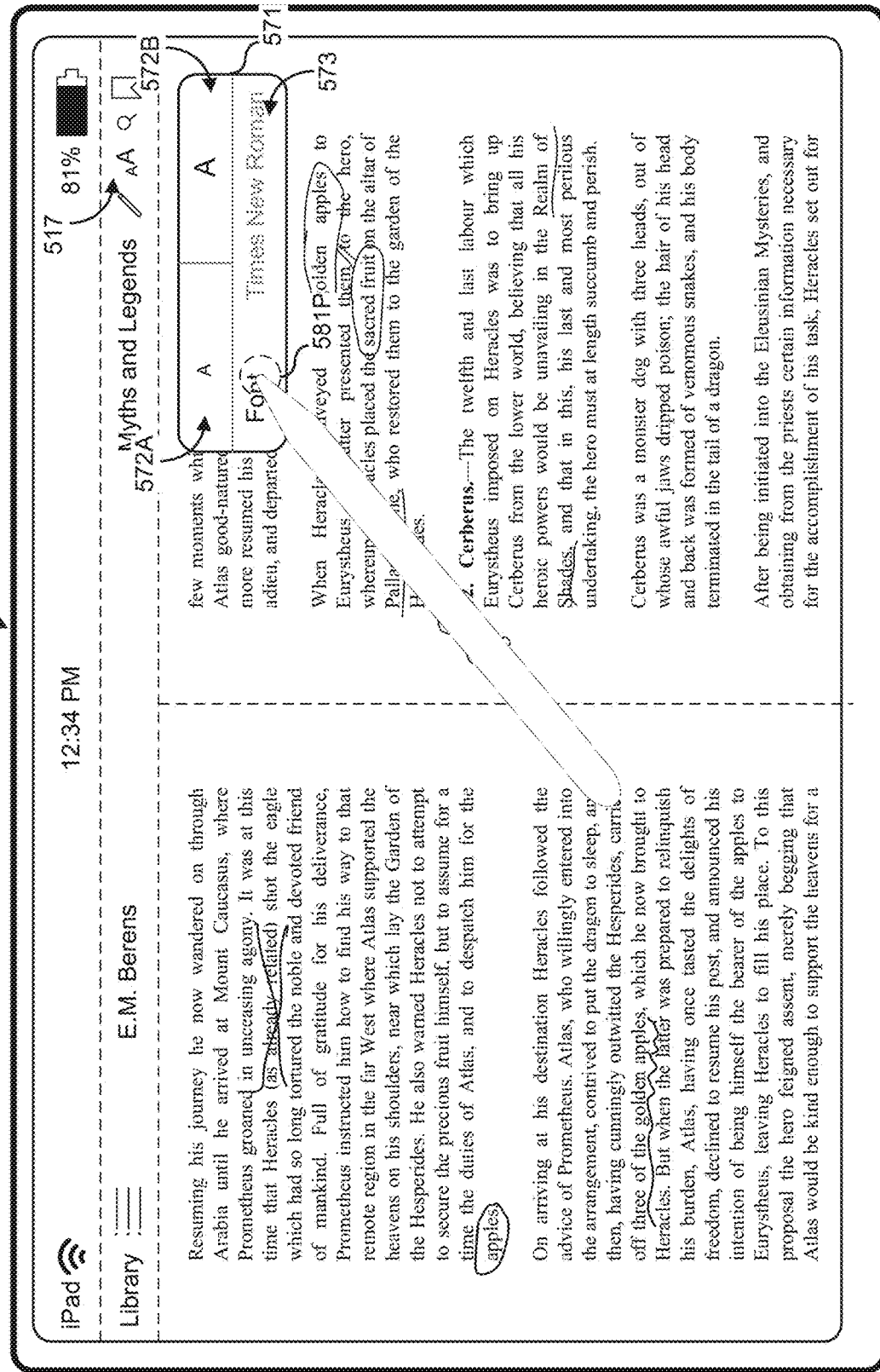
Figure 5A:
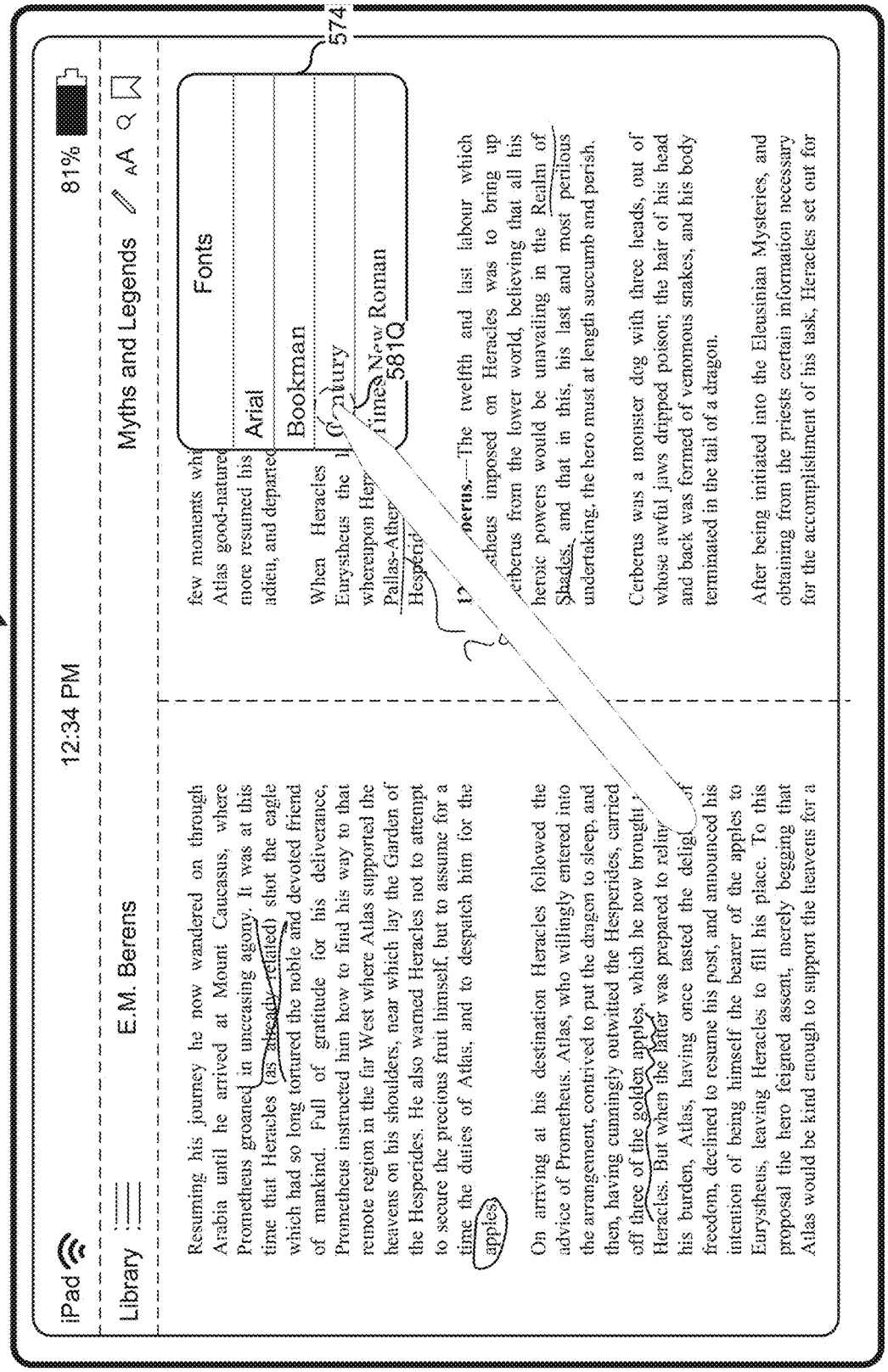
Figure 5A:
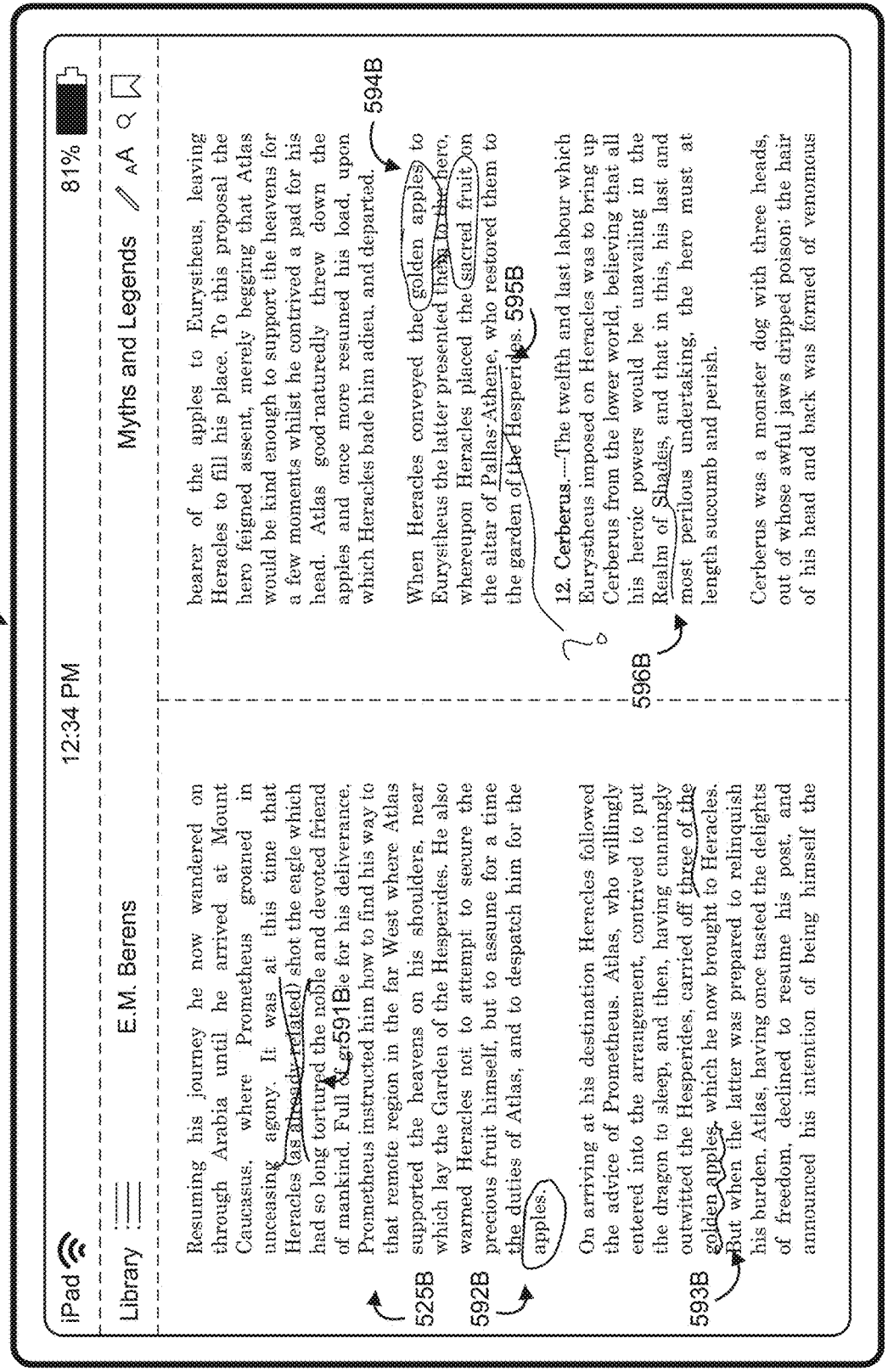
Figure 5A:
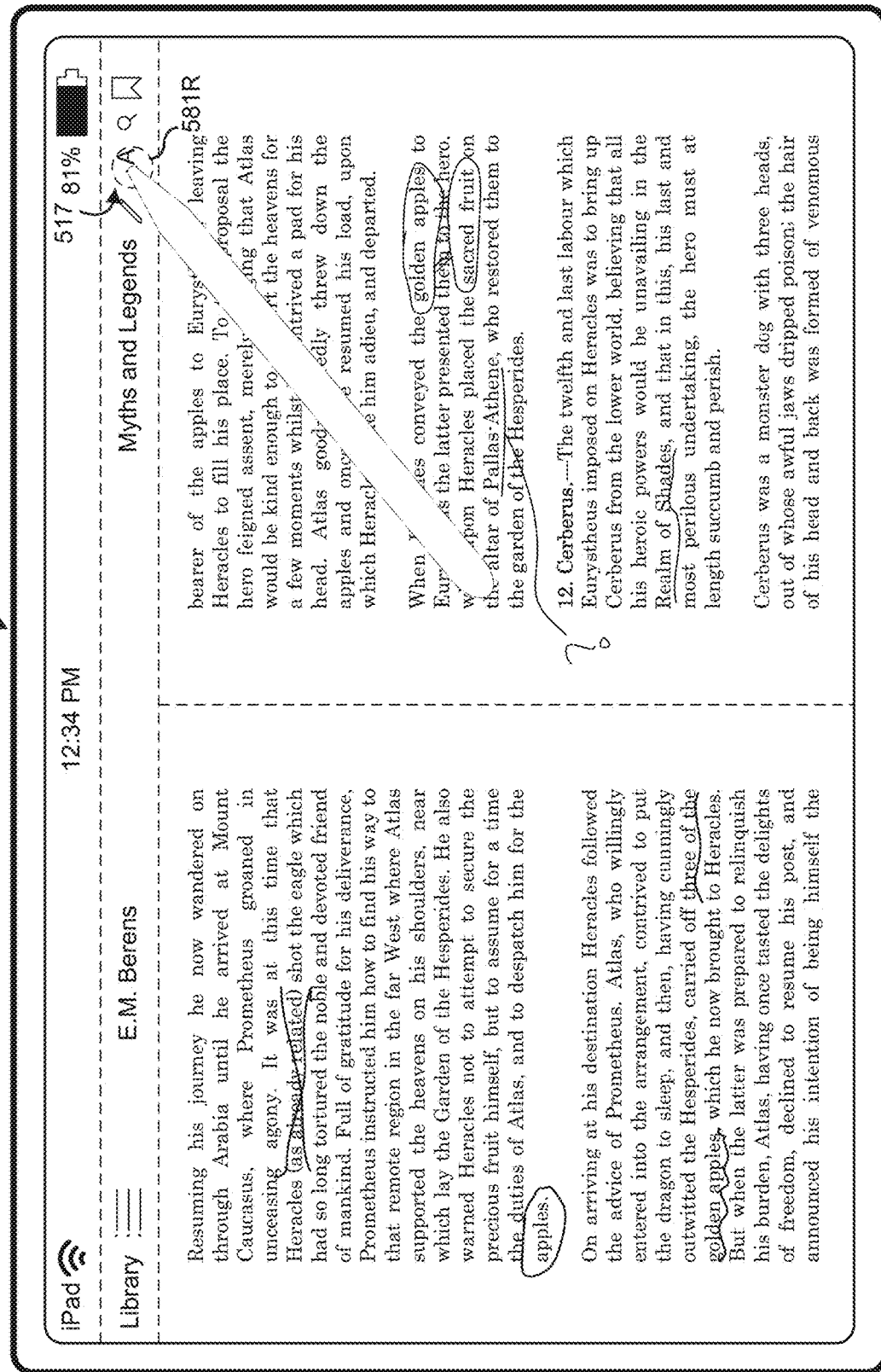
Figure 5A:
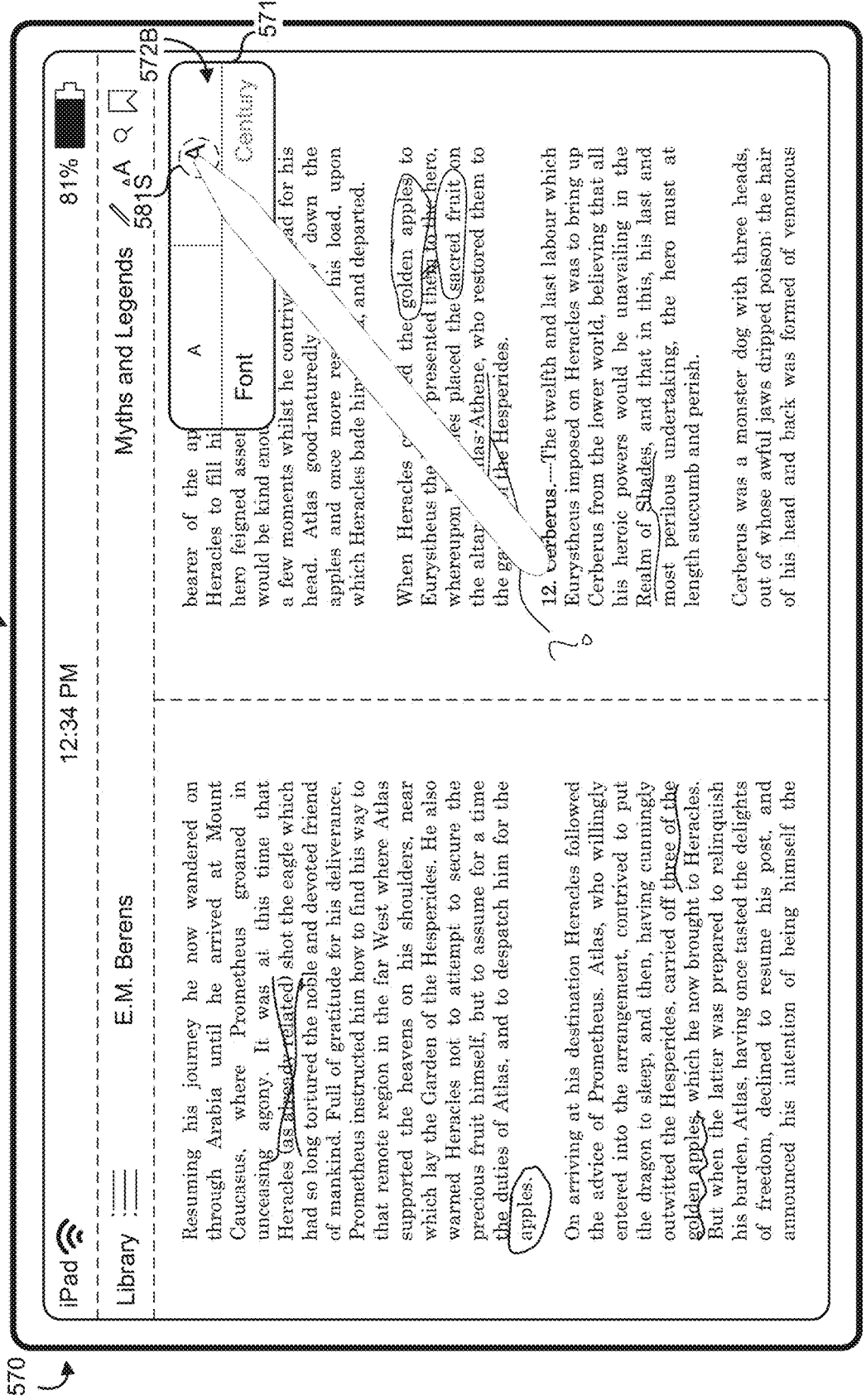
Figure 5A:
Figure 5C:
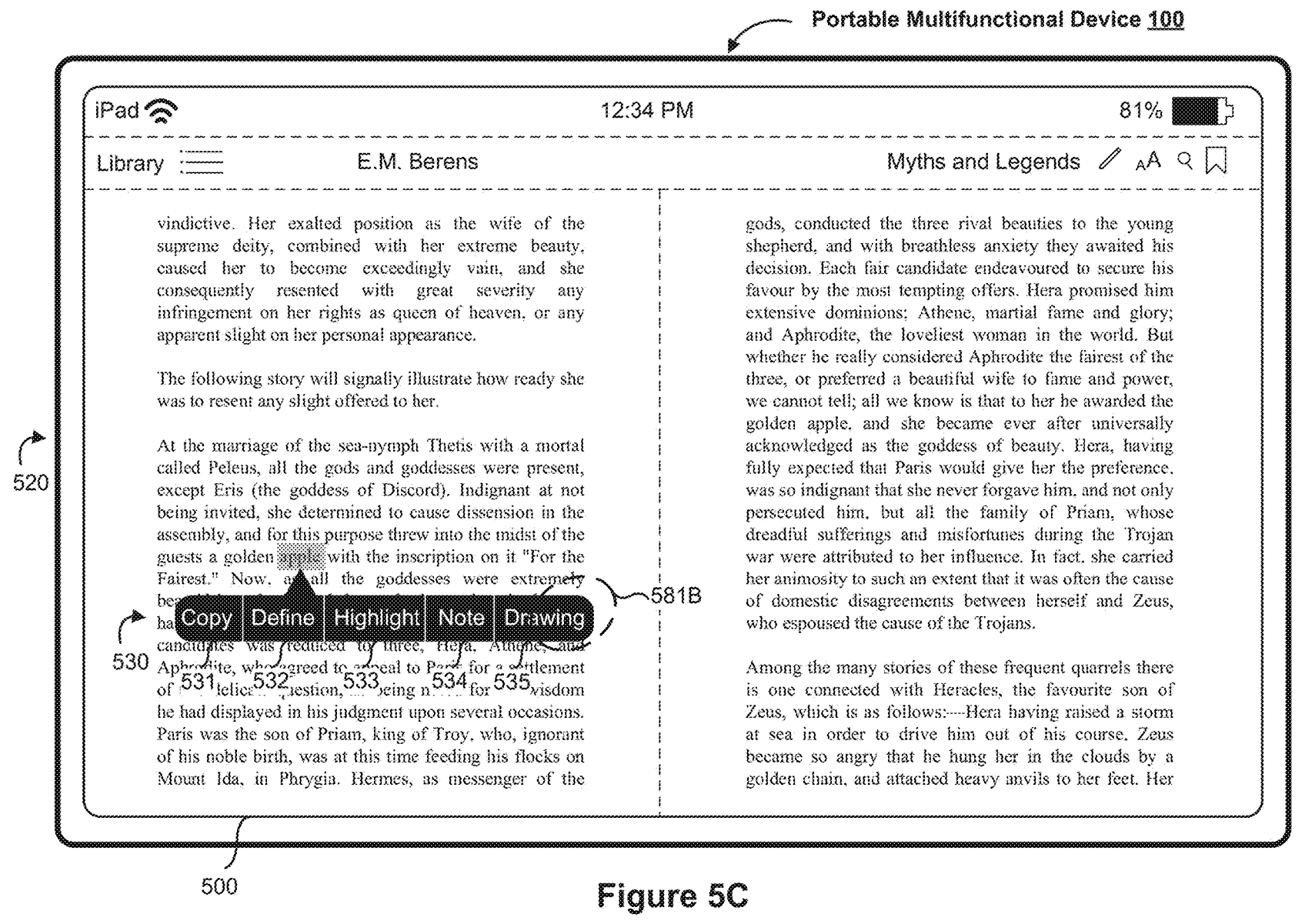
Figure 6A:
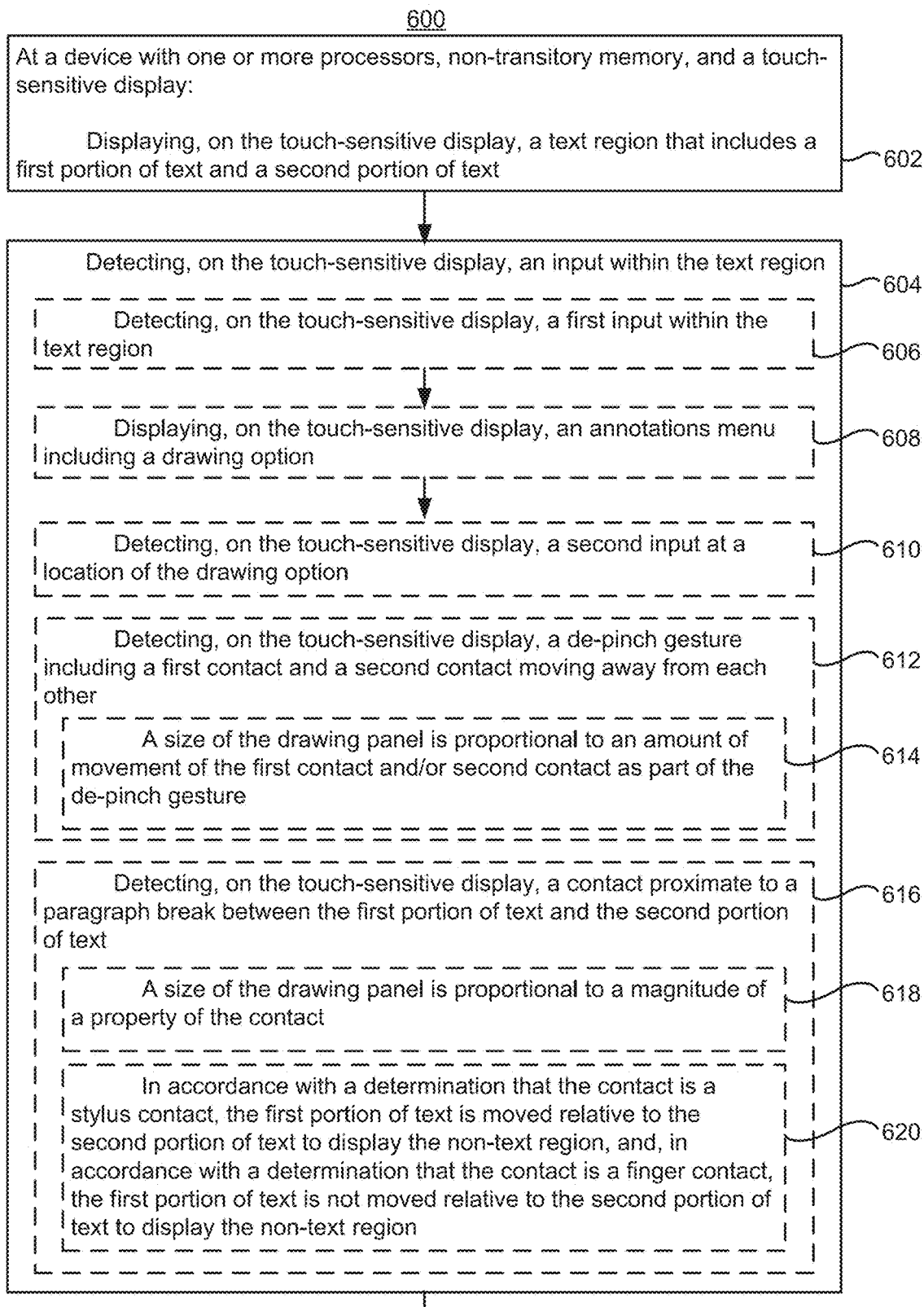
FIGS. 6A-6D are flow diagrams illustrating a method of adding a drawing annotation to text in accordance with some embodiments.
Figure 6B:
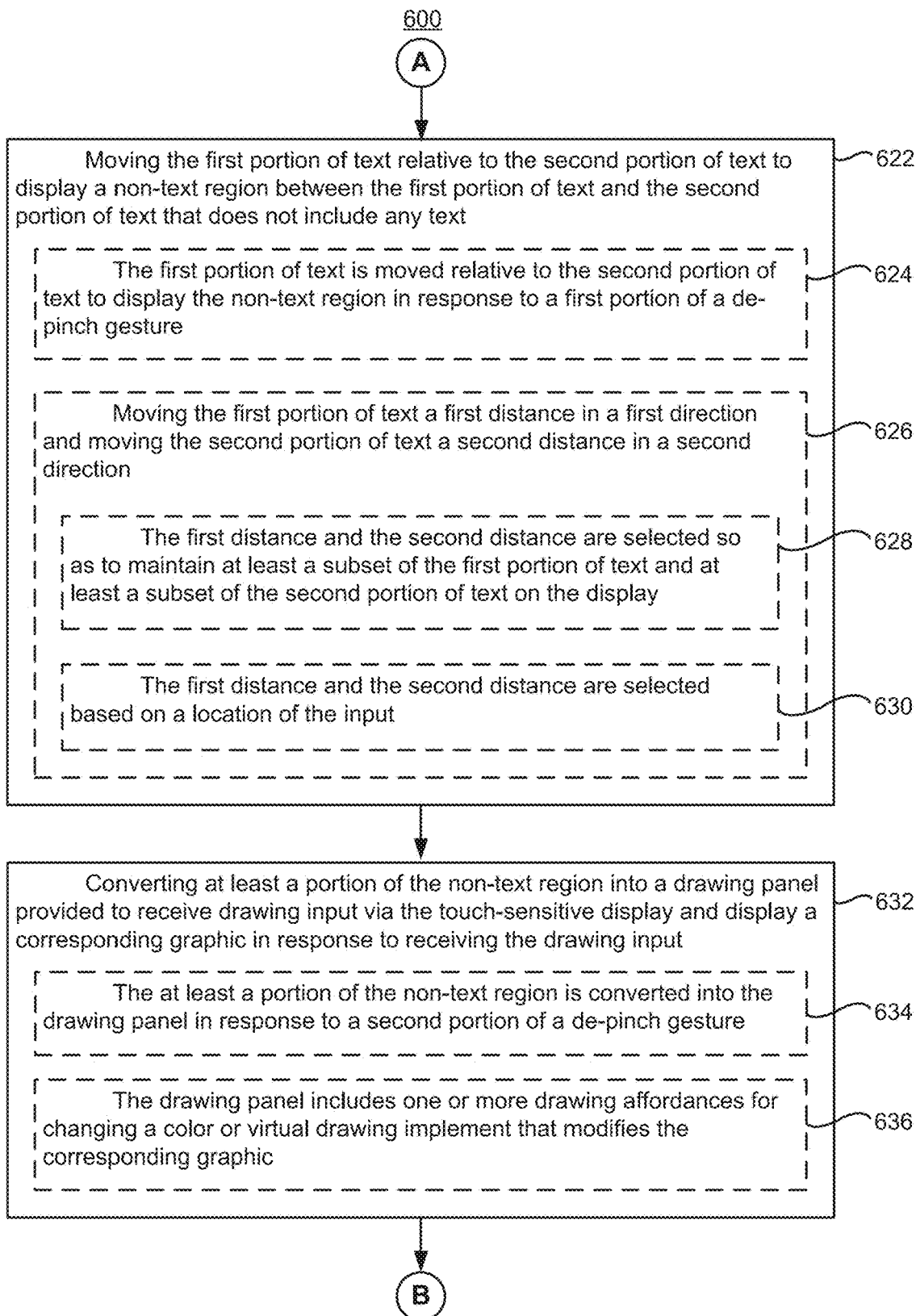
Figure 6C:
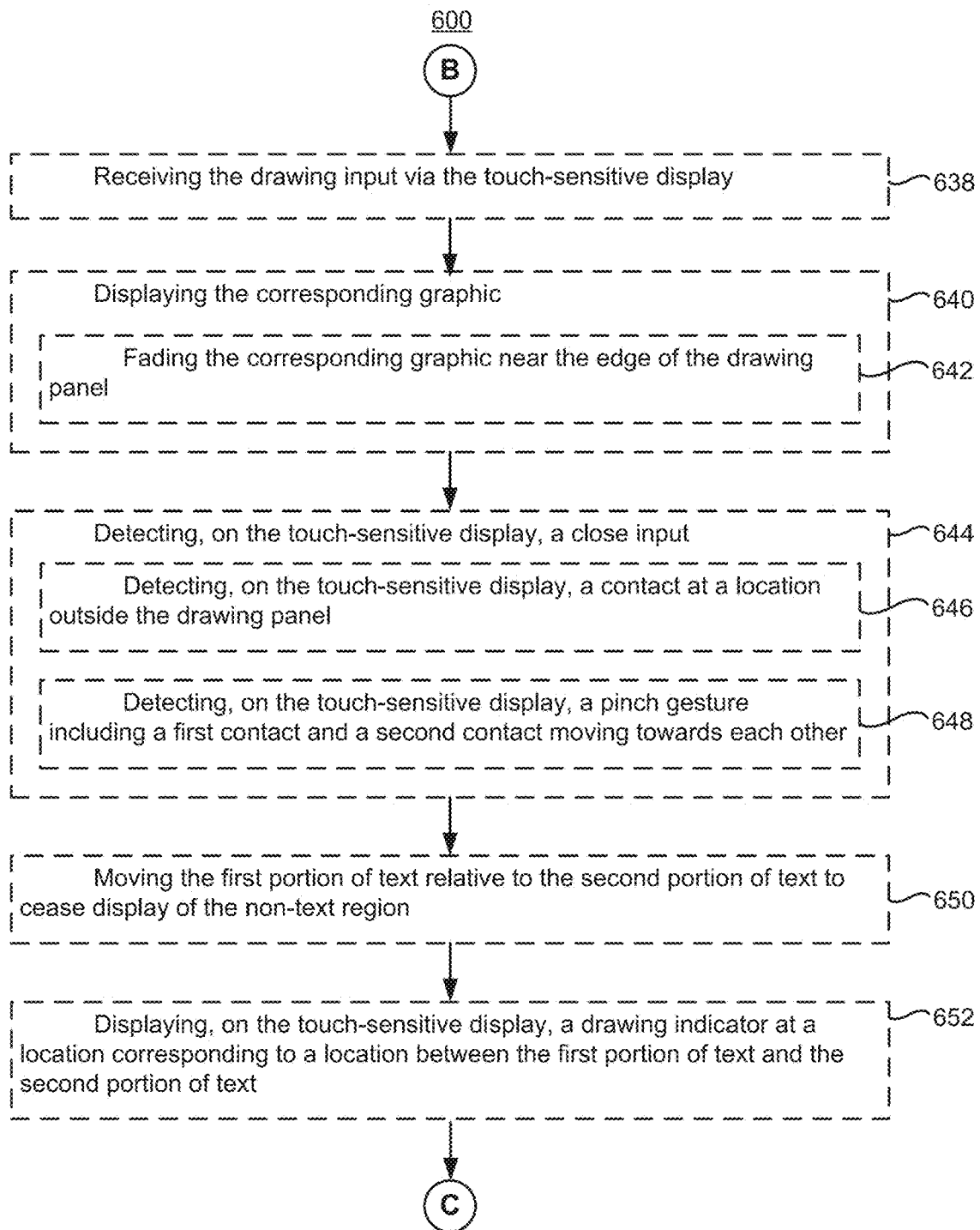
Figure 6D:
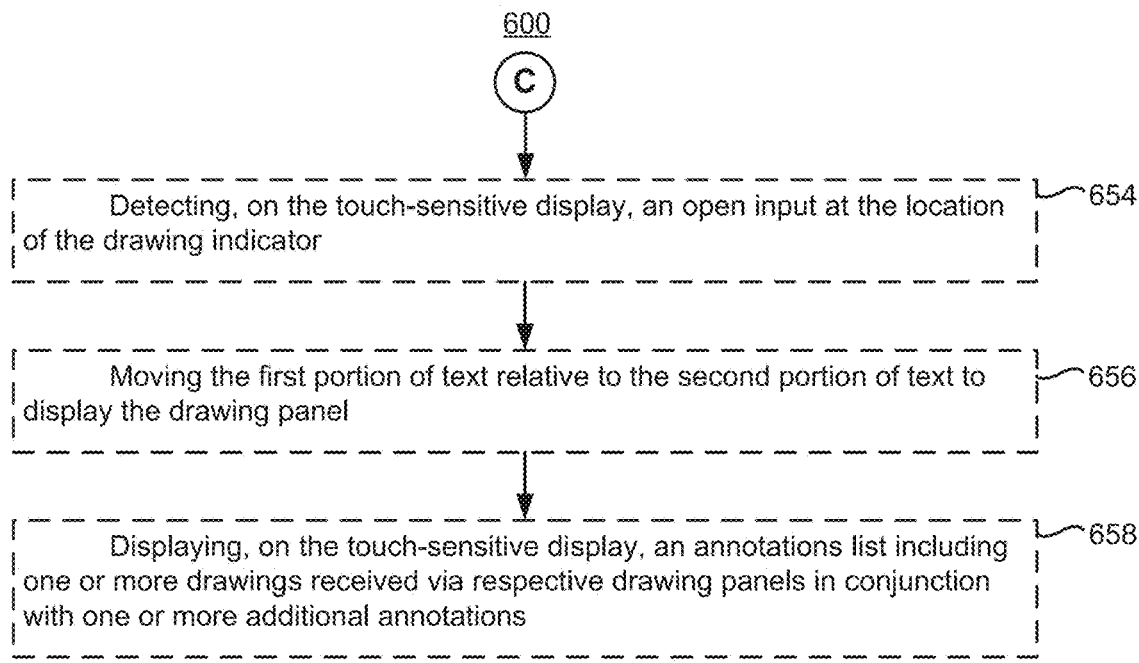
Figure 7B:
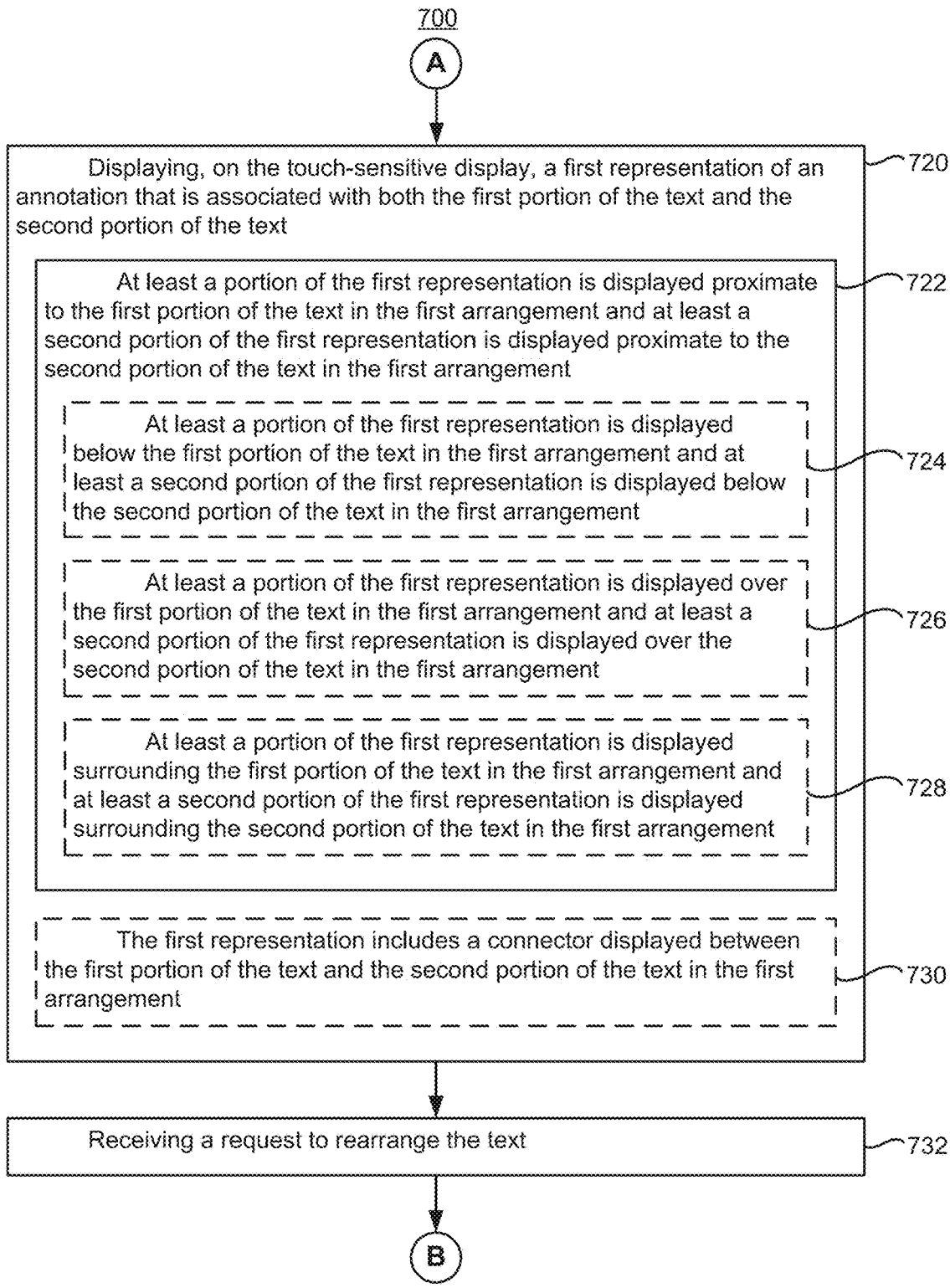

FIG. 5Z illustrates the user interface 500 of FIG. 5Y with a stylus contact 581O detected at the location of the text display options affordance 517.

FIG. 5AA illustrates the user interface 500, which is displayed in response to detecting the stylus contact 581O. In response to detecting the stylus contact 581O at the location of text display options affordance 517, the user interface 500 includes a text display options menu 571. The text display options menu 571 includes a shrink affordance 572A for decreasing the font size of the displayed text, a grow affordance 572B for increasing the font size of the displayed text, and a font selection affordance 573 for selecting a font for the displayed text.

FIG. 5AA illustrates a stylus contact 581P detected at the location of the font selection affordance 573.

FIG. 5AB illustrates the user interface 500, which is displayed in response to detecting the stylus contact 581P. In response to detecting the stylus contact 581P, the user interface 500 includes a font selection menu 574 including a number of affordances for selecting particular fonts for the displayed text.

FIG. 5AB illustrates a stylus contact 581Q detected at a location of a Century selection affordance.

FIG. 5AC illustrates the user interface 500, which is displayed in response to detecting the stylus contact 581Q. In FIG. 5AC, the text display region 520 includes a second arrangement of text 525B in two columns. The second arrangement of text 525B includes various portions of the text previously displayed in the first arrangement of text 525A in various different positions.

The user interface 500 includes a second representation of the strikethrough annotation 591B over the portion of the text reading "(as already related)". Whereas the first representation 591A included a portion which is displayed proximate to a first portion of the text (e.g., "(as already") in the first arrangement and another portion which is displayed proximate to a second portion of the text (e.g., "related)") in the first arrangement, the second representation 591B includes a portion which is displayed proximate to the first portion of the text in the second arrangement and a portion which is displayed proximate to the second portion of the text in the second arrangement. Thus, the same portion of the text is struck through after the rearrangement of the text.

Nevertheless, the second representation 591B is different from the first representation 591A as it is a bit wider due to the different font. Further, the second representation 591B is in a different position than the first representation 591A. However, the second representation 591B has the same shape as the first representation 591A. Two representations (or portions thereof) are considered to have the same shape when one is a linear transformation of the other. Thus, moving, resizing, reflecting, rotating, and stretching a representation does not change its shape. Indeed, the second representation 591B is a relocated and resized version of the first representation 591A. Thus, the look-and-feel of the representations of the annotation is maintained through reflowing of the text.

The user interface 500 includes a second representation of the encircling annotation 592B around the portion of the text reading "apples.". Whereas the first representation 592A included a portion which is displayed proximate to a first portion of the text (e.g., "app") in the first arrangement and another portion which is displayed proximate to a second portion of the text (e.g., "les.") in the first arrangement, the second representation 592B includes a portion which is displayed proximate to the first portion of the text in the second arrangement and a portion which is displayed proximate to the second portion of the text in the second arrangement. Thus, the same portion of the text is encircled after the rearrangement of the text.

Nevertheless, the second representation 592B is different from the first representation 592A as it is a bit wider due to the different font. Further, the second representation 592B is in a different position than the first representation 592A. However, the second representation 592B has the same shape as the first representation 592A. Indeed, the second representation 592B is a relocated and resized version of the first representation 592A. Thus, the look-and-feel of the representations of the annotation is maintained through reflowing of the text.

The user interface 500 includes a second representation of the underlining annotation 593B below the portion of the text reading "three of the golden apples". Whereas the first representation 593A included a portion which is displayed proximate to a first portion of the text (e.g., "thee of the") in the first arrangement and another portion which is displayed proximate to a second portion of the text (e.g., "golden apples") in the first arrangement, the second representation 593B includes a portion which is displayed proximate to the first portion of the text in the second arrangement and a portion which is displayed proximate to the second portion of the text in the second arrangement. Thus, the same portion of the text is underlined after the rearrangement of the text.

In particular, in the first arrangement, the first portion of the text is adjacent to the second portion of the text in the first arrangement, whereas in the second arrangement, the first portion of the text is non-adjacent to the second portion of the text. Thus, in the second arrangement, the second representation 593B is split into two portions, with the first portion displayed proximate to the first portion of the text and the second portion displayed proximate to the second portion of the text in the second arrangement.

In some embodiments, as described below, the second representation, rather than being a split version of the first representation, is a duplicated version of the first representation.

Thus, although the same portion of the text is underlined after the rearrangement of the text, the second representation 593B is different from the first representation 592A at least because it is in two parts. But, the look-and-feel of the representations of the annotation is maintained through reflowing of the text.

The user interface 500 includes a second representation of the text-connecting annotation 594B connecting a first portion of the text reading "golden apples" with a second portion of the text reading "sacred fruit". Whereas the first representation 594A included a portion which is displayed proximate to a first portion of the text (e.g., "golden apples") in the first arrangement and another portion which is displayed proximate to a second portion of the text (e.g., "sacred fruit") in the first arrangement, the second representation 594B includes a portion which is displayed proximate to the first portion of the text in the second arrangement and a portion which is displayed proximate to the second portion of the text in the second arrangement. Thus, the same portions of the text are connected after the rearrangement of the text.

Nevertheless, the second representation 594B is different from the first representation 594A as the two portions of text have moved. Whereas the first representation 594A included a dual-slash connector (//) between the portions of text, the second representation 594B includes a dual-backslash connector (\\) between the portions of text. Both representations include a connector between the two portions of text and the connectors are the same shape. Thus, the look-and-feel of the representations of the annotation is maintained through reflowing of the text.

The user interface 500 includes a second representation of the drawing-connecting annotation 595B connecting a portion of the text reading "Pallas-Athene" to a drawing of a question mark. Whereas the first representation 595A included a portion which is displayed proximate to a first portion of the text (e.g., "Pallas-") in the first arrangement and another portion which is displayed proximate to a second portion of the text (e.g., "Athene") in the first arrangement, the second representation 595B includes a portion which is displayed proximate to the first portion of the text in the second arrangement and a portion which is displayed proximate to the second portion of the text in the second arrangement. Thus, the same portion of text is identified (and connected with the drawing) after the rearrangement of the text.

Nevertheless, the second representation 595B is different from the first representation 595A as the connector between the text and the drawing has been resized. Thus, the look-and-feel of the representations of the annotation is maintained through reflowing of the text.

The user interface 500 includes a second representation of the underlining annotation 596B below the portion of text reading "Realm of Shades". Whereas the first representation 596A included a portion which is displayed proximate to a first portion of the text (e.g., "Realm of") in the first arrangement and another portion which is displayed proximate to a second portion of the text (e.g., "Shades") in the first arrangement, the second representation 595B includes a portion which is displayed proximate to the first portion of the text in the second arrangement and a portion which is displayed proximate to the second portion of the text in the second arrangement. Thus, the same portion of text is underlined after the rearrangement of the text.

Nevertheless, the second representation 596B is different from the first representation 596A as the two portions of the first representation 596A have been merged. In particular, in the first arrangement, the first portion of the text (e.g., "Realm of" is non-adjacent to the second portion of the text (e.g., "Shades"), whereas, in the second arrangement, the first portion of the text is adjacent to the second portion of the text. Thus, the second representation 596B includes two separate elements of the first representation 596A merged together. For example, endpoints of the separate elements are displayed at the same location in the second representation. Thus, the look-and-feel of the representations of the annotation is maintained through reflowing of the text.

FIG. 5AD illustrates the user interface 500 of FIG. 5AC with a stylus contact 581R detected at the location of the text display options affordance 517.

FIG. 5AE illustrates the user interface 500, which is displayed in response to detecting the stylus contact 581R. In response to detecting the stylus contact 581R at the location of text display options affordance 517, the user interface 500 includes the text display options menu 571.

FIG. 5AE illustrates a stylus contact 581S detected at the location of the grow affordance 572B.

FIG. 5AF illustrates the user interface 500, which is displayed in response to detecting the stylus contact 581S. In FIG. 5AF, the text display region 520 includes a third arrangement of text 525C in two columns. The third arrangement of text 525C includes various portions of the text previously displayed in the first arrangement of text 525A and second arrangement of text 525B in various different positions.

The user interface 500 includes a third representation of the strikethrough annotation 591C over the portion of the text reading "(as already related)". Whereas the first representation 591A included a portion which is displayed proximate to a first portion of the text (e.g., "(as already") in the first arrangement and another portion which is displayed proximate to a second portion of the text (e.g., "related)") in the first arrangement, the third representation 591C includes a portion which is displayed proximate to the first portion of the text in the second arrangement and a portion which is displayed proximate to the second portion of the text in the second arrangement. Thus, the same portion of the text is struck through after the rearrangement of the text.

Nevertheless, the third representation 591C is different from the first representation 591C as it includes two separate portions, each having the same shape as the first representation 591A. In particular, whereas, in the first arrangement, the first portion of the text (e.g., "(as already") is adjacent to the second portion of the text (e.g., "related)"), in the second arrangement, the first portion of the text is non-adjacent to the second portion of the text. Thus, the third representation, includes a first instance displayed proximate to the first portion of the text and a second instance displayed proximate to the second portion of the text. Each instance has the same shape as the first representation 591A. Thus, the look-and-feel of the representations of the annotation is maintained through reflowing of the text.

FIGS. 6A-6D illustrate a flow diagram of a method 600 of displaying a drawing panel in accordance with some embodiments. The method 600 is performed at an electronic device (e.g., the portable multifunction device 100 in FIG. 1A, or the device 300 in FIG. 3) with a display and a touch-sensitive surface. In some embodiments, as detailed below as an example, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to add drawing annotations to text. The method reduces the cognitive burden on a user when adding drawing annotations to text, thereby creating a more efficient human-machine interface. For battery-operated electronic devices, enabling a user to add drawing annotations to text faster and more efficiently conserves power and increases the time between battery charges.

The device displays (602), on the touch-sensitive display, a text region that includes a first portion of text and a second portion of text. For example, in FIG. 5A, the device displays a text display region 520 including various portions of text in various positions.

The device detects (604), on the touch-sensitive display, an input within the text region. For example, in FIG. 5B, the device detects a finger contact 581A within the text display region 520. As another example, in FIG. 5G, the device detects a de-pinch gesture 581D within the text display region 520. As another example, in FIG. 5O, the device detects a stylus contact 581G within the text display region 520. In some embodiments, finger contacts are treated in the same manner as stylus contacts. In some embodiments, finger contacts are treated differently from stylus contacts.

In some embodiments, in detecting the input within the text region, the device detects (606), on the touch-sensitive display, a first input within the text region. For example, in FIG. 5B, the device detects a finger contact 581A within the text display region 520. In some embodiments, in response to detecting the first input, the device displays (608), on the touch-sensitive display, an annotations menu including a drawing option. For example, in FIG. 5C, the device displays a selected text menu 530 including a drawing affordance 535 for adding a drawing annotation to the selected text. In some embodiments, the device detects (610), on the touch-sensitive display, a second input at a location of the drawing option. For example, in FIG. 5D, the device detects a finger contact 581B at the location of the drawing affordance 535.

In some embodiments, in detecting the input within the text region, the device detects (612), on the touch-sensitive display, a de-pinch gesture including a first contact and a second contact moving away from each other. Thus, a user can quickly, with a single gesture, open a drawing panel to add drawing annotations to the text, reducing interaction with the device. Reducing interaction with the device conserves power and increases the time between battery charges and reduces wear-and-tear of the device. Further, screen space need not be used to display an affordance for adding a drawing annotation, resulting in a more efficient human-machine interface (as a user need not manipulate the user interface to find affordances for performing the function). For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability. For example, in FIG. 5G, the device detects a de-pinch gesture 581D including a first contact and a second contact moving away from each other. As another example, in FIG. 5J, the device detects a de-pinch gesture 581E including a first contact and a second contact moving away from each other.

In some embodiments, a size of the drawing panel is proportional (614) to an amount of movement of the first contact and/or second contact as part of the de-pinch gesture. Thus, a user can quickly, with a single gesture, set a size of drawing panel, reducing interaction with the device. As noted above, reducing interaction with the device conserves power and increases the time between battery charges and reduces wear-and-tear of the device. For example, in FIG. 5I, the drawing panel 540 is a first size in response to a de-pinch gesture 581D of a first size and, in FIG. 5K, the drawing panel 540 is a second size in response to a de-pinch gesture 581E of a second size.

In some embodiments, in detecting the input with the text region, the device detects (616), on the touch-sensitive display, a contact proximate to a paragraph break between the first portion of text and the second portion of text. By using the location of the contact as the input for opening a drawing panel, the paragraph break provides information to the user and also acts as an interactive affordance. This uses the space of the screen more efficiently, resulting in a more efficient human-machine interface. For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability. For example, in FIG. 5O, the device detects a stylus contact 581G proximate to a paragraph break between a first portion 553A of text and a second portion 553B of text.

In some embodiments, in accordance with a determination (620) that the contact is a stylus contact, the first portion of text is moved relative to the second portion of text to display the non-text region, and, in accordance with a determination that the contact is a finger contact, the first portion of text is not moved relative to the second portion of text to display the non-text region. By using the type of input (finger or stylus) to determine user interface response, the space on the screen is used more efficiently and the amount of user interaction with the device is reduced. For example, in FIG. 5P, in accordance with a determination that the stylus contact 581G is a stylus contact, the first portion 553A of text is moved relative to the second 553B portion of text to display a non-text region that has been converted into a drawing panel 540. In contrast, in FIG. 5C, in accordance with a determination that the finger contact 581A is a finger contact, the drawing panel is not displayed.

In response to detecting the input within the text region, the device moves (622) the first portion of text relative to the second portion of text to display a non-text region between the first portion of text and the second portion of text that does not include any text. For example, in FIG. 5H, the first portion 552A of text has been moved relative to the second portion 552B of text to display a non-text region 549 between the first portion 552A of text and the second portion 552B that does not include any text. As another example, in FIG. 5D, the first portion 551A of text has been moved relative to the second portion 551B of text to display a non-text region that has been converted into a drawing panel 540.

In some embodiments, the first portion of text is moved (624) relative to the second portion of text to display the non-text region in response to a first portion of a de-pinch gesture. By associating the movement of the text with a first portion of a gesture and associating the conversion of the non-text region into a drawing panel with a second portion of the gesture, partial gestures provide additional information to user regarding the availability of the drawing panel feature and increases the likelihood that the user will manipulate the user interface in an efficient manner, conserving power and increasing the time between battery charges and reducing wear-and-tear of the device. For example, in FIG. 5H, the first portion 552A of text has been moved relative to the second portion 552B of text to display a non-text region 549 in response to a first portion of a de-pinch gesture 581D (e.g., detecting the two contacts and their movement a first distance away from each other).

In some embodiments, in moving the first portion of text relative to the second portion of text, the device moves (626) the first portion of text a first distance in a first direction and moves the second portion of text a second distance in a second direction. Thus, both the first portion of text and the second portion of text are moved. For example, in FIG. 5D, the first portion 551A of text is moved a first distance in a first direction (e.g., up) and the second portion 552B of text is moved a second distance in a second direction (e.g., the opposite direction, down).

In some embodiments, the first distance and the second distance are selected (628) so as to maintain at least a subset of the first portion of text and at least a subset of the second portion of text on the display. Accordingly, the user is provided additional context while providing the drawing input, reducing the likelihood that the user will close the drawing panel to access that context and re-open the drawing panel to provide the drawing input. This reduces user interaction with the device, conserving power and increasing the time between battery charges and reducing wear-and-tear of the device. For example, in FIG. 5K, the first portion 552A of text and the second portion 552B of text are moved such that at least a subset of the first portion 552A of text and at least a subset of the second portion 552B of text are maintained on the display.

In some embodiments, the first distance and the second distance are selected (630) based on a location of the input. For example, in FIG. 5I, the first portion 552A of text is moved a particular first distance based on the location of de-pinch gesture 581D being closer to the top of the display. In FIG. 5P, the first portion 553A of text is moved a different first distance based on the location of the stylus contact 581G being closer to the bottom of the display.

The device converts (632) at least a portion of the non-text region into a drawing panel provided to receive drawing input via the touch-sensitive display and display a corresponding graphic in response to receiving the drawing input. For example, in FIG. 5I, the device increases the size of the non-text region 549 and converts at least a portion of the non-text region 549 into a drawing panel 540. As another example, FIG. 5P illustrates at least a portion of non-text region converted into a drawing panel 540.

In some embodiments, the device converts (634) at least a portion of the non-text region into a drawing panel in response to a second portion of a de-pinch gesture. For example, in FIG. 5I, the device converts at least a portion of the non-text region 549 into a drawing panel 540 in response to a second portion of a de-pinch gesture 581D. In some embodiments, the first portion of the de-pinch gesture is moving the contacts a first distance away from each other and the second portion of the de-pinch gesture is moving the contacts a second distance away from each other. Thus, the non-text region appears when the contacts begin to move away from each other and is converted once the contacts are a threshold distance away from each other. In some embodiments, the first portion of the de-pinch gesture is moving the contacts away from each other and the second portion of the de-pinch gesture is lifting the contacts from the display. Thus, the non-text region appears (and changes in size) as the contacts move away from each other and is converted once the contacts are ended.

In some embodiments, the drawing panel includes (636) one or more drawing affordances for changing a color or virtual drawing implement that modifies the corresponding graphic. For example, in FIG. 5D, the drawing panel 540 includes a number of drawing affordances 541-544 for changing a color or virtual drawing implement that modifies the corresponding graphic. In particular, the drawing panel 540 includes a drawing-mode affordance 541 for entering into a drawing mode (e.g., selecting a virtual pencil tool) for adding lines to a drawing within the drawing panel 540. The drawing panel 540 includes a brush affordance 542 for selecting a virtual paintbrush for adding brushstrokes to a drawing within the drawing panel 540. The drawing panel 540 includes an eraser affordance 543 for erasing portions of a drawing within the drawing panel 540. The drawing panel 540 includes a color affordance 544 for selecting a color of additions to a drawing within the drawing panel 540.

In some embodiments, the device receives (638) drawing input via the touch-sensitive display and displays (640) the corresponding graphic. For example, in FIG. 5E, the device displays a graphic 545A of a golden apple in response to receiving drawing input via the touch-sensitive display.

In some embodiments, in displaying the corresponding graphic, the device fades (642) the corresponding graphic near the edge of the drawing panel. This provides a user feedback regarding the limits of the drawing panel, preventing the user from attempt to provide drawing input outside the drawing panel (and, thus, closing the drawing panel and potentially having the user reopen the drawing panel). This reduces user interaction with the device conserving power and increases the time between battery charges and reducing wear-and-tear of the device. For example, in FIG. 5Q, the device displays a graphic 545C of a strongman that is faded near the edges of the drawing panel.

In some embodiments, the device detects (644), on the touch-sensitive display, a close input. For example, in FIG. 5E, the device detects a finger contact 581C. As another example, in FIG. 5M, the device detects a pinch gesture 581F. As another example, in FIG. 5R, the device detects a stylus contact 581H.

In some embodiments, in detecting the close input, the device detects (646), on the touch-sensitive display, a contact at a location outside the drawing panel. Thus, screen space need not be used for an affordance to close the drawing panel, efficiently using the space on the screen, resulting in a more efficient human-machine interface. For example, in FIG. 5E, the device detects a finger contact 581C at a location outside the drawing panel 540. As another example, in FIG. 5R, the device detects a stylus contact 581H at a location outside the drawing panel 540.

In some embodiments, in detecting the close input, the device detects (648), on the touch-sensitive display, a pinch gesture including a first contact and a second contact moving towards each other. Thus, screen space need not be used for an affordance to close the drawing panel, efficiently using the space on the screen, resulting in a more efficient human-machine interface. For example, in FIG. 5M, the device detects a pinch gesture 581F including a first contact and a second contact moving towards each other.

In some embodiments, in response to detecting the close input, the device moves (650) the first portion of text relative to the second portion of text to cease display of the non-text region. For example, in FIG. 5F, the device moves the first portion 551A of text relative to the second portion 551B of text to cease display of the non-text region converted into a drawing panel 540.

In some embodiments, the device displays (652), on the touch-sensitive display, a drawing indicator at a location corresponding to a location between the first portion of text and the second portion of text. For example, in FIG. 5F, the device displays a drawing indicator 547A at a location to the left (e.g., in the margin) of a location between the first portion 551A of text and the second portion 551B of text.

In some embodiments, the device detects (654), on the touch-sensitive display, an open input at the location of the drawing indicator. Thus, the drawing indicator provides information to a user (regarding the presence of the drawing) and also acts as an interactive affordance. This uses the space on the screen more efficiently, resulting in a more efficient human-machine interface (as a user need not manipulate the user interface to find affordances for performing the functions of interacting with the image). For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability. For example, in FIG. 5S, the device detects a finger contact 581I at the location of the drawing indicator 547A.

In some embodiments, in response to detecting the open input, the device moves the first portion of text relative to the second portion of text to display the drawing panel. For example, in FIG. 5T, the device moves the first portion 551A of text relative to the second portion 551B of text to display the drawing panel 540 including the corresponding graphic 545A.

In some embodiments, the device displays, on the touch-sensitive display, an annotations list including one or more drawings received via respective drawing panels in conjunction with one or more additional annotations. For example, in FIG. 5W, the device displays an annotations list 528 includes including graphics of the drawing 545A (and a portion of the graphic of a portion of the drawing 545B) in conjunction with additional annotations.

It should be understood that the particular order in which the operations in FIGS. 6A-6D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6D. For example, displayed text arrangements, inputs associated with displayed text arrangements, affordances, and user interface responses described above with reference to method 600 optionally have one or more of the characteristics of displayed text regions, inputs associated with text regions, affordances, and user interface responses described herein with reference to other methods described herein (e.g., method 700). For brevity, these details are not repeated here.

FIG. 7A-7D illustrate a flow diagram of a method 700 of annotating reflowable text in accordance with some embodiments. The method 700 is performed at an electronic device (e.g., the portable multifunction device 100 in FIG. 1A, or the device 300 in FIG. 3) with a display and a touch-sensitive surface. In some embodiments (as described below as an example), the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 800 provides an intuitive way to annotate reflowable text. The method reduces the cognitive burden on a user when annotating reflowable text, thereby creating a more efficient human-machine interface. For battery-operated electronic devices, enabling a user to annotate reflowable text faster and more efficiently conserves power and increases the time between battery charges.

The device displays (702), on the touch-sensitive display, a first arrangement of text in which a first portion of the text has a first position with respect to a second portion of the text. For example, in FIG. 5X, the text display region 520 includes a first arrangement of text 525A in which various portions of the text have various positions with respect to other portions of the text.

While the text is displayed in the first arrangement, the device detects (704), via the touch-sensitive display, a set of one or more annotation inputs. For example, in FIG. 5Y, the user interface 500 illustrates the results of multiple sets of one or more annotation inputs.

In some embodiments, in detecting the set of one or more annotation inputs, the device detects (706), via the touch-sensitive display, an input at a location of an annotations affordance displayed on the touch-sensitive display. For example, in FIG. 5X, a finger touch 581N is detected at a location of an annotations affordance 590 displayed as part of the user interface. In some embodiments, in detecting the set of one or more annotation inputs, the device detects (708), via the touch-sensitive display, one or more finger contacts. In some embodiments, in detecting the set of one or more annotation inputs, the device detects (710), via the touch-sensitive display, one or more stylus contacts. By using the type of input (finger or stylus) to determine user interface response, the space on the screen is used more efficiently and the amount of user interaction with the device is reduced. In some embodiments, finger contacts are treated in the same manner as stylus contacts. In some embodiments, finger contacts are treated differently from stylus contacts.

In some embodiments, the set of one or more annotation inputs includes (712) one or more underlining inputs at least partially detected at a set of locations below the first portion of the text and the second portion of the text. For example, in FIG. 5Y, the device displays a first representation of an underlining annotation 593A in response to underlining inputs at least partially detected at a set of locations below a first portion of the text (e.g., "three of the") and a second portion of the text (e.g., "golden apples").

In some embodiments, the set of one or more annotation inputs includes (714) one or more strikethrough inputs at least partially detected at a set of locations over the first portion of the text and the second portion of the text. For example, in FIG. 5Y, the device displays a first representation of a strikethrough annotation 591A in response to strikethrough inputs at least partially detected at a set of locations over a first portion of the text (e.g., "(as already") and a second portion of the text (e.g., "related")").

In some embodiments, the set of one or more annotation inputs includes (716) one or more encircling inputs at least partially detected at a set of locations surrounding the first portion of the text and the second portion of the text. For example, in FIG. 5Y, the device displays a first representation of an encircling annotation 592A in response to encircling inputs at least partially detected at a set of locations surrounding a first portion of the text (e.g., "app") and a second portion of the text (e.g., "les.").

In some embodiments, the set of one or more annotation inputs includes (718) a first set of one or more annotation inputs detected at locations associated with the first portion of the text, a second set of one or more annotation inputs detected at locations associated with the second portion of the text, and a third set of one or more annotation inputs detected at locations between the first portion of the text and the second portion of the text. For example, in FIG. 5Y, the device displays a first representation of a text-connecting annotation 594A in response to a first set of one or more annotation inputs detects at locations associated with a first portion of the text (e.g., an encircling gesture surrounding the text reading "golden apples"), a second set of one or more annotations inputs detected at locations associated with a second portion of the text (e.g., an encircling gesture surrounding the text reading "sacred fruit"), and a third set of one or more annotations inputs detected at locations between the two texts (e.g., the dual-slash connector).

The device displays (720), on the touch-sensitive display, a first representation of an annotation that is associated with both the first portion of the text and the second portion of the text. At least a portion of the first representation is displayed (722) proximate to the first portion of the text in the first arrangement and at least a second portion of the first representation is displayed proximate to the second portion of the text in the first arrangement. For example, in FIG. 5Y, the device displays a first representation of a strikethrough annotation 591A that is associated with a first portion of the text reading "(as already" and a second portion of the text reading "related)". As another example, in FIG. 5Y, the device displays a first representation of an encircling annotation 592A that is associated with a first portion of the text ready "app" and a second portion of the text reading "les." As another example, in FIG. 5Y, the device displays a first representation of an underlining annotation 593A that is associated with a first portion of the text reading "three of the" and a second portion of the text reading "golden apples". As another example, in FIG. 5Y, the device display a first representation of a text-connecting annotation 594A that is associated with a first portion of the text reading "golden apples" and a second portion of the text reading "sacred fruit".

In some embodiments, at least a portion of the first representation is displayed (724) below the first portion of the text in the first arrangement and at least a second portion of the first representation is displayed below the second portion of the text in the first arrangement. For example, in FIG. 5Y, in the first arrangement 525A of text, at least a portion of the first representation of the underlining annotation 593A is displayed below a first portion of the text reading "three of the" and at least a portion of the first representation of the underlining annotation 593A is displayed below a second portion of the text reading "golden apples".

In some embodiments, at least a portion of the first representation is displayed (726) over the first portion of the text in the first arrangement and at least a second portion of the first arrangement is displayed over the second portion of the text in the first arrangement. For example, in FIG. 5Y, in the first arrangement 525A of text, at least a portion of the first representation of the strikethrough annotation 591A is displayed over a first portion of the text reading "(as already" and at least a portion of the first representation of the strikethrough annotation 591A is displayed over a second portion of the text reading "related)". By dividing the strikethrough annotation 591A into two or more components in accordance with various implementations, the strikethrough annotation 591A can track rearranged text in order to allow a user to change text reading and/or presentation preferences. In the present example, the text reading "(as already" and the text reading "related)" can thus be separated in order to reflow the text in order to conform to the reading and/or presentation preferences of a user, and provides visual feedback to the user indicating that annotations to one arrangement of displayed text will cause the device to associate and adapt the presentation of the annotations to other arrangements of the displayed text (e.g., reflowed from a first arrangement to a second arrangement). Providing improved visual feedback to the user enhances the operability of the device and makes the user-device interface more efficient (e.g., by encouraging the user to provide inputs that use available features and reducing user mistakes when operating/interacting with the device) which, additionally, reduces power usage and improves battery life of the device by enabling the user to use the device more quickly and efficiently.

In some embodiments, at least a portion of the first representation is displayed (728) surrounding the first portion of the text in the first arrangement and at least a second portion of the first arrangement is displayed surrounding the second portion of the text in the first arrangement. For example, in FIG. 5Y, in the first arrangement 525A of text, at least a portion of the first representation of the encircling annotation 592A is displayed surrounding a first portion of the text reading "app" and at least portion of the first representation of the encircling annotation 592A is displayed surrounding a second portion of the text reading "les.". Similar to the dividing the strikethrough annotation 591A, by dividing the encircling annotation 592A into two or more components in accordance with various implementations, the encircling annotation 592A can track rearranged text in order to allow a user to change text reading and/or presentation preferences. In the present example, the text comprising "apples" can thus be separated in order to reflow the text in order to conform to the reading and/or presentation preferences of a user, and provides visual feedback to the user indicating that annotations to one arrangement of displayed text will cause the device to associate and adapt the presentation of the annotations to other arrangements of the displayed text (e.g., reflowed from a first arrangement to a second arrangement). Providing improved visual feedback to the user enhances the operability of the device and makes the user-device interface more efficient (e.g., by encouraging the user to provide inputs that use available features and reducing user mistakes when operating/interacting with the device) which, additionally, reduces power usage and improves battery life of the device by enabling the user to use the device more quickly and efficiently.

In some embodiments, the first representation includes (730) a connector displayed between the first portion of the text and the second portion of the text in the first arrangement. For example, in FIG. 5Y, in the first arrangement 525A of text, the first representation of the text-connecting annotation 594A includes a dual-slash connector displayed between a first portion of the text reading "golden apples" and a second portion of the text reading "sacred fruit".

After displaying the first representation of the annotation (which can include continuing to display the first representation of the annotation), the device receives (732) a request to rearrange the text. For example, in FIG. 5AB, the device detects a stylus contact 581Q at a location of a Century selection affordance of the font selection menu 574. Thus, the request to rearrange the text is a request to change the font of the text. As another example, in FIG. 5AE, the device detects a stylus contact 581S at a location of a grow affordance 572B of the text display options menu 571. Thus, the request to rearrange the text is a request to change the font size of the text.

In response to receiving the request to rearrange the text, the device concurrently displays (734), on the touch-sensitive display, a second arrangement of the text in which the first portion of the text has a second position with respect to the second portion of the text, wherein the second position is different from the first position, and a second representation of the annotation that is associated with both the first portion of the text and the second portion of the text, wherein the second representation is different from the first representation. At least a portion of the second representation is displayed (736) proximate to the first portion of the text in the second arrangement and at least a second portion of the second representation is displayed proximate to the second portion of the text in the second arrangement.

Rearranging the text can make it easier for a user to read the text, increasing their reading speed and reducing the amount of user interaction with the device, conserving power and increases the time between battery charges and reduces wear-and-tear of the device. Maintaining the annotations in association with the same portions of text after rearrangement increases the likelihood that a user will reflow the text to their reading preference. In other words, annotations track rearranged text in order to allow a user to change text reading and/or presentation preferences. Adjusting the display of the annotations as a function of changes to the display of the text provides visual feedback to the user indicating that annotations to one arrangement of displayed text will cause the device to associate and adapt the presentation of the annotations to other arrangements of the displayed text (e.g., reflowed from a first arrangement to a second arrangement). Providing improved visual feedback to the user enhances the operability of the device and makes the user-device interface more efficient (e.g., by encouraging the user to provide inputs that use available features and reducing user mistakes when operating/interacting with the device) which, additionally, reduces power usage and improves battery life of the device by enabling the user to use the device more quickly and efficiently.

For example, in FIG. 5AC, the device displays a second arrangement of the text 525B in which the first portion of the text reading "(as already" has a second position with respect to the second portion of the text reading "related)", wherein the second position is different from the first position (of FIG. 5Y). For example, the two portions of text are separated by a space of a different size due to the different font and different justification (due to fewer words in the same line). The device also displays a second representation of the strikethrough annotation 591B that is associated with both the first portion of the text and the second portion of the text. The second representation of the strikethrough annotation 591B is different from the first representation of the strikethrough annotation 591A (of FIG. 5Y) at least because it a bit wider due to the different font.

As another example, in FIG. 5AC, the device displays a second arrangement of the text 525B in which the first portion of the text reading "three of the" has a second position with respect to the second portion of the text reading "golden apples", wherein the second position is different from the first position (of FIG. 5Y). For example, in FIG. 5Y, the first portion of the text is to the left of the second portion of the text and, in FIG. 5AC, the first portion of the text is to the right of the second portion of the text. The device also displays a second representation of the underlining annotation 593B that is associated with both the first portion of the text and the second portion of the text. The second representation of the underlining annotation 593B is different from the first representation of the underlining annotation 593A (of FIG. 5Y) at least because it is in two parts.

In some embodiments, at least a portion of the second representation is displayed (738) below the first portion of the text in the second arrangement and at least a second portion of the second representation is displayed below the second portion of the text in the second arrangement. For example, in FIG. 5AC, in the second arrangement 525B of text, at least a portion of the second representation of the underlining annotation 593B is displayed below a first portion of the text reading "three of the" and at least a portion of the second representation of the underlining annotation 593B is displayed below a second portion of the text reading "golden apples".

In some embodiments, at least a portion of the second representation is displayed (740) over the first portion of the text in the second arrangement and at least a second portion of the second representation is displayed over the second portion of the text in the second arrangement. For example, in FIG. 5AC, in the second arrangement 525B of text, at least a portion of the second representation of the strikethrough annotation 591B is displayed over a first portion of the text reading "(as already" and at least a portion of the second representation of the strikethrough annotation 591B is displayed over a second portion of the text reading "related)".

In some embodiments, at least a portion of the second representation is displayed (742) surrounding the first portion of the text in the second arrangement and at least a second portion of the second arrangement is displayed surrounding the second portion of the text in the second arrangement. For example, in FIG. 5AC, in the second arrangement 525B of text, at least a portion of the second representation of the encircling annotation 592B is displayed surrounding a first portion of the text reading "app" and at least portion of the second representation of the encircling annotation 592B is displayed surrounding a second portion of the text reading "les.". Again, similar to the dividing the strikethrough annotation 591A, by dividing the encircling annotation 592B into two or more components in accordance with various implementations, the encircling annotation 592B can track rearranged text in order to allow a user to change text reading and/or presentation preferences. In the present example, the text comprising "apples" can thus be separated in order to reflow the text in order to conform to the reading and/or presentation preferences of a user, and provides visual feedback to the user indicating that annotations to one arrangement of displayed text will cause the device to associate and adapt the presentation of the annotations to other arrangements of the displayed text (e.g., reflowed from a first arrangement to a second arrangement).

Providing improved visual feedback to the user enhances the operability of the device and makes the user-device interface more efficient (e.g., by encouraging the user to provide inputs that use available features and reducing user mistakes when operating/interacting with the device) which, additionally, reduces power usage and improves battery life of the device by enabling the user to use the device more quickly and efficiently.

In some embodiments, the second representation includes (744) a connector displayed between the first portion of the text and the second portion of the text in the second arrangement. For example, in FIG. 5AC, in the second arrangement 525B of text, the second representation of the text-connecting annotation 594B includes a dual-backslash connector displayed between a first portion of the text reading "golden apples" and a second portion of the text reading "sacred fruit". In some embodiments, the first connector of the first representation has the same shape (746) as the second connector of the second representation. For example, in FIG. 5AC, the dual-backslash connector of the second representation of the text-connecting annotation 594B is the same shape as the dual-slash connector of the first representation of the text-connecting annotation 594A, having been rotated (or reflected) and possibly resized.

In some embodiments, the second representation has the same shape (748) as the first representation. By maintaining the look-and-feel of the annotations, a user can input a limitless number of different types of annotation efficiently providing a variety of information, meaning, and context. Efficiently providing this information reduces the user interaction with the device (e.g., a wavy line indicating that a word is confusing can be input rather than a detailed note explaining such). For example, in FIG. 5AC, the second representation of the strikethrough annotation 591B has the same shape as the first representation of the strikethrough annotation 591A of FIG. 5Y. As another example, in FIG. 5AC, the second representation of the encircling annotation 593B has the same shape as the first representation of the encircling annotation 593A of FIG. 5Y. Presenting similar annotations using similar shapes and visual indicia provides visual feedback to the user that enhances the operability of the device and makes the user-device interface more efficient (e.g., by encouraging the user to provide inputs that use available features and reducing user mistakes when operating/interacting with the device) which, additionally, reduces power usage and improves battery life of the device by enabling the user to use the device more quickly and efficiently.

In some embodiments, the second representation is a relocated and resized version of the first representation. For example, in FIG. 5AC, the second representation of the strikethrough annotation 591B is a relocated and resized version of the first representation of the strikethrough annotation 591A of FIG. 5Y. As another example, in FIG. 5AC, the second representation of the encircling annotation 593B is a relocated and resized version of the first representation of the encircling annotation 593A of FIG. 5Y.

In some embodiments, the first portion of the text is adjacent to the second portion of the text in the first arrangement and is non-adjacent in the second arrangement. Thus, in some embodiments, a first portion of the second representation corresponding to a first portion of the first representation is displayed (752) proximate to the first portion of the text in the second arrangement and a second portion of the second representation corresponding to a second portion of the first representation is displayed proximate to the second portion of the text in the second arrangement. For example, in FIG. 5AC, a first portion of the second representation of the underlining annotation 593B corresponding to the left portion of the first representation of the underlining annotation 593A (of FIG. 5Y) is displayed proximate to the portion of the text reading "three of the" and a second portion of the second representation of the underlining annotation 593B corresponding to the right portion of the first representation of the underlining annotation 593A is displayed proximate to the portion of the text reading "golden apples".

As noted above, in some embodiments, the first portion of the text is adjacent to the second portion of the text in the first arrangement and is non-adjacent in the second arrangement. Thus, in some embodiments, a first portion of the second representation corresponding to at least a portion of the first representation is displayed (754) proximate to the first portion of the text in the second arrangement and a second portion of the second representation corresponding to the at least a portion of the first representation is displayed proximate to the second portion of the text in the second arrangement. For example, in FIG. 5AF, a first portion of the third representation of the strikethrough annotation 591C corresponding to the entire first representation of the strikethrough annotation 591A is displayed proximate to the portion of the text reading "(as already" and a second portion of the third representation of the strikethrough annotation 591C corresponding to the same entire first representation of the strikethrough annotation 591A is displayed proximate to the portion of the text reading "related)".

In some embodiments, the first portion of the text is non-adjacent to the second portion of the text in the first arrangement and is adjacent in the second arrangement. Thus, in some embodiments, the second representation includes (756) two separate portions of the first representation merged together. For example, in FIG. 5AC, the second representation of the underlining annotation 596B includes two separate portions of the first representation of the underlining annotation 596A (e.g., the portion of the representation below the portion of the text reading "Realm of" and the portion of the representation below the portion of the text reading "Shades") merged together.

It should be understood that the particular order in which the operations in FIGS. 7A-7D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7D. For example, displayed text regions, inputs associated with text regions, affordances, and user interface responses described above with reference to method 700 optionally have one or more of the characteristics of displayed text arrangements, inputs associated with displayed text arrangements, affordances, and user interface responses described herein with reference to other methods described herein (e.g., method 600). For brevity, these details are not repeated here.

Figure 8:
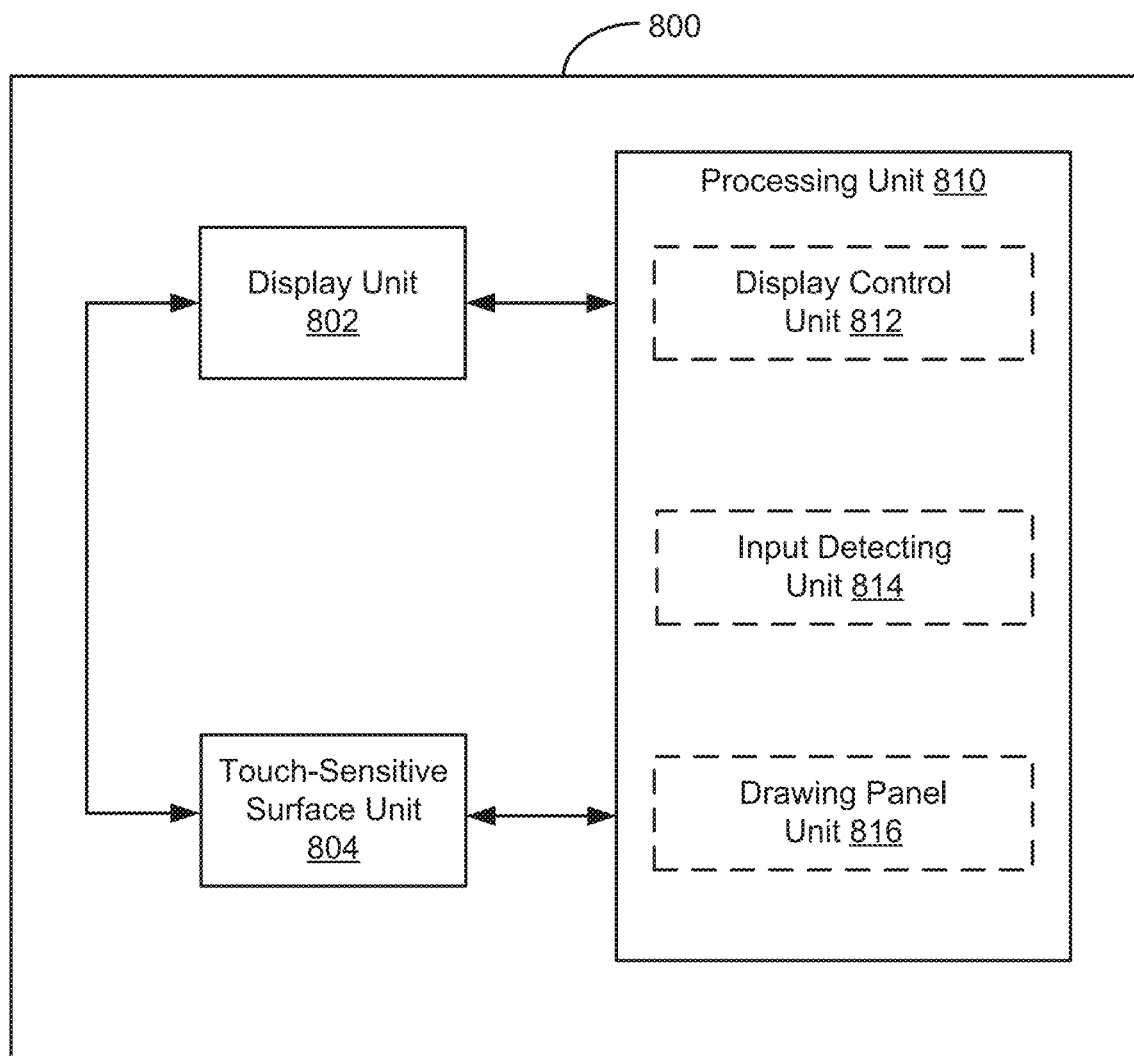
FIGS. 8-9 are functional block diagrams of an electronic device in accordance with some embodiments.

In accordance with some embodiments, FIG. 8 shows a functional block diagram of an electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 includes a display unit 802 configured to display a user interface, a touch-sensitive surface unit 804 configured to detect contacts, and a processing unit 810 coupled with the display unit 802 and the touch-sensitive surface unit 804. In some embodiments, the processing unit 810 includes: a display control unit 812, an input detecting unit 814, and a drawing panel unit 816.

The processing unit 810 is configured to display (e.g., with the display control unit 812), on the display unit 802, a text region that includes a first portion of text and a second portion of text.

The processing unit 810 is configured to detect (e.g., with the input detecting unit 814), via the touch-sensitive surface unit 804, an input within the text region. In some embodiments, the processing unit 810 is configured to detect (e.g., with the input detecting unit 814), via the touch-sensitive surface unit 804, a first input within the text region and, in response to detecting the first input, display (e.g., with the display control unit 812), on the display unit 802, an annotations menu including a drawing option. In some embodiments, the processing unit 810 is configured to detect (e.g., with the input detecting unit 814), via the touch-sensitive surface unit 804, a second input at a location of the drawing option.

In some embodiments, the processing unit 810 is configured to detect (e.g., with the input detecting unit 814), via the touch-sensitive surface unit 804, a de-pinch gesture including a first contact and a second contact moving away from each other. In some embodiments, a size of the drawing panel (e.g., as provided by the drawing panel unit 816 as described below) is proportional to an amount of movement of the first contact and/or second contact as part of the de-pinch gesture.

In some embodiments, the processing unit 810 is configured to detect (e.g., with the input detecting unit 814), via the touch-sensitive surface unit 804, a contact proximate to a paragraph break between the first portion of text and second portion of text. In some embodiments, a size of the drawing panel (e.g., as provided by the drawing panel unit 816 as described below) is proportional to a magnitude of a property of the contact. In some embodiments, the processing unit 810 is configured to, in accordance with a determination that the contact is a stylus contact, move (e.g., with the drawing panel unit 816 as described below) the first portion of text relative to the second portion of text to display a non-text region, and, in accordance with a determination that the contact is a finger contact, not move the first portion of text relative to the second portion of text to display the non-text region.

The processing unit 810 is configured to move (e.g., with the drawing panel unit 816) the first portion of text relative to the second portion of text display a non-text region between the first portion of text and the second portion of text. In some embodiments, the processing unit 810 moves (e.g., with the drawing panel unit 816) the first portion of text relative to the second portion of text to display the non-text region in response to a first portion of a de-pinch gesture. In some embodiments, the processing unit 810 is configured to move (e.g., with the drawing panel unit 816) the first portion of text a first distance in a first direction and move (e.g., with the drawing panel unit 816) the second portion of text a second distance in a second direction. In some embodiments, the processing unit 810 is configured to select (e.g., with the drawing panel unit 816) the first distance and the second distance so as to maintain at least a subset of the first portion of text and at least a subset of the second portion of text on the display unit 802. In some embodiments, the processing unit 810 is configured to select (e.g., with the drawing panel unit 816) the first distance and the second distance based on a location of the input.

The processing unit 810 is configured to convert (e.g., with the drawing panel unit 816) at least a portion of the non-text region into a drawing panel provided to receive drawing input via the touch-sensitive surface 804 and display a corresponding graphic in response to receiving the drawing input. In some embodiments, the processing unit 810 converts (e.g., with the drawing panel unit 816) the at least a portion of the non-text region into the drawing panel in response to a second portion of a de-pinch gesture. In some embodiments, the drawing panel includes one or more drawing affordances for changing a color or virtual drawing implement that modifies the corresponding graphic.

In some embodiments, the processing unit 810 is configured to receive (e.g., with the input detecting unit 814) the drawing input via the touch-sensitive surface 804. In some embodiments, the processing unit 810 is configured to display (e.g., with the display control unit 802) the corresponding graphic. In some embodiments, the processing unit 810 is configured to fade (e.g., with the display control unit 802) the corresponding graphic near the edge of the drawing panel.

In some embodiments, the processing unit 810 is configured to detect (e.g., with the input detecting unit 814), via the touch-sensitive surface unit 804, a close input. In some embodiments, the processing unit 810 is configured to detect (e.g., with the input detecting unit 814), via the touch-sensitive surface unit 804, a contact at a location outside the drawing panel. In some embodiments, the processing unit 810 is configured to detect (e.g., with the input detecting unit 814), via the touch-sensitive surface unit 804, a pinch gesture including a first contact and a second contact moving towards each other.

In some embodiments, the processing unit 810 is configured to, in response to detecting the close input, move (e.g., with the drawing panel unit 816) the first portion of text relative to the second portion of text to cease display of the non-text region.

In some embodiments, the processing unit 810 is configured to display (e.g., with the display control unit 812), on the display unit 802, a drawing indicator at a location corresponding to a location between the first portion of text and the second portion of text.

In some embodiments, the processing unit 810 is configured to detect (e.g., with the input detecting unit 814), via the touch-sensitive surface unit 804, an open input at the location of the drawing indication.

In some embodiments, the processing unit 810 is configured to, in response to detecting the open input, move (e.g., with the drawing panel unit 816) the first portion of text relative to the second portion of text to display the drawing panel.

In some embodiments, the processing unit 810 is configured to display (e.g., with the display control unit 812), via the display unit 802, an annotations list including one or more drawings received via respective drawing panels in conjunction with one or more additional annotations.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 8. For example, display operation 602, detect operation 604, move operation 622, and convert operation 632 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9:
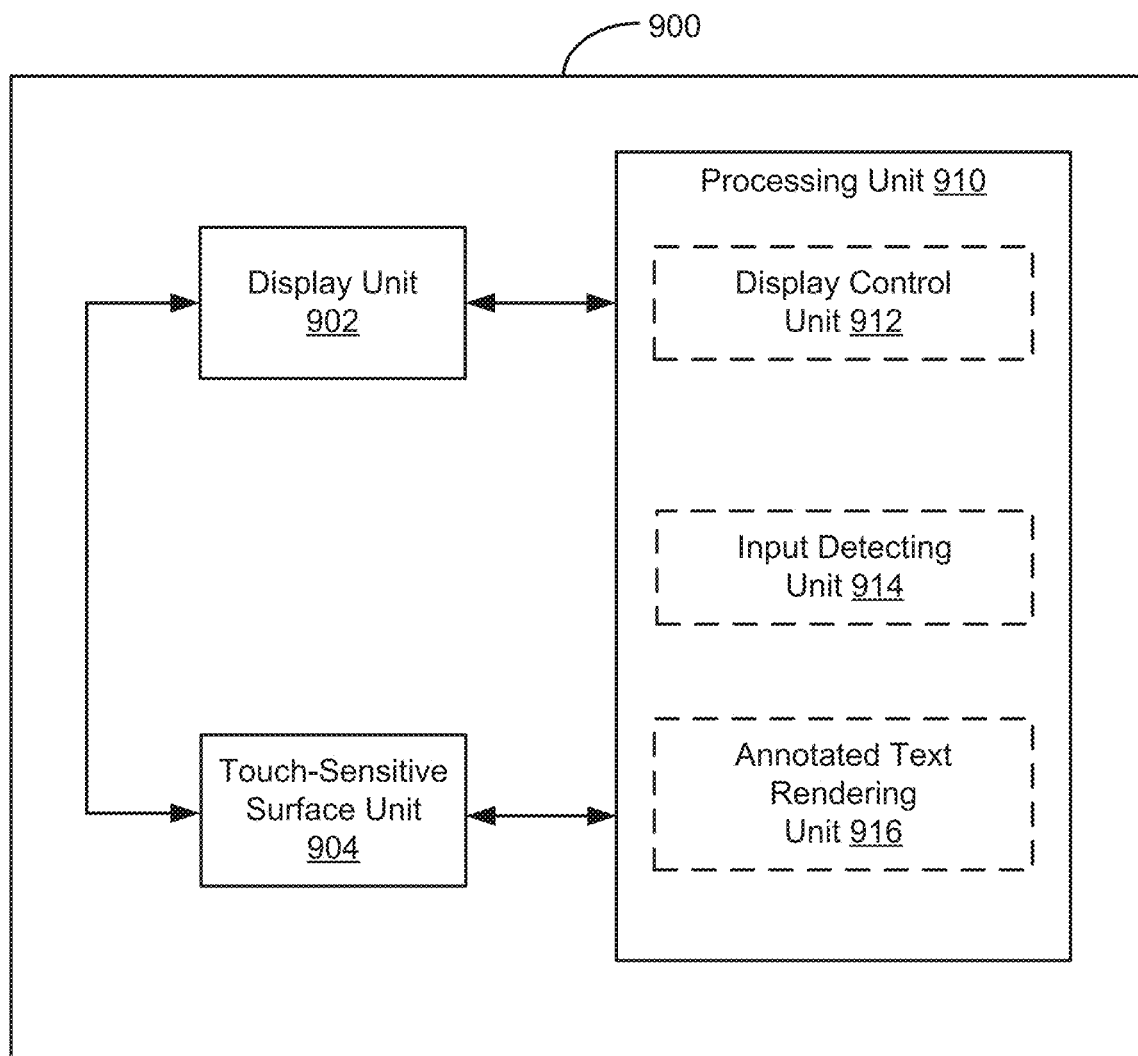

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display a user interface, a touch-sensitive surface unit 904 configured to detect contacts, and a processing unit 910 coupled with the display unit 902 and the touch-sensitive surface unit 904. In some embodiments, the processing unit 910 includes: a display control unit 912, an input detecting unit 914, and an annotated text rendering unit 916.

The processing unit 910 is configured to display (e.g., with the display control unit 912), on the display unit 902, a first arrangement of text in which a first portion of the text has a first position with respect to a second portion of the text.

The processing unit 910 is configured to, while the text is displayed in the first arrangement, detect (e.g., with the input detecting unit 914), via the touch-sensitive surface unit 904, a set of one or more annotation inputs. In some embodiments, the processing unit 910 is configured to detect (e.g., with the input detecting unit 914), via the touch-sensitive surface unit 904, an input at a location of an annotations affordance displayed on the display unit 902 and to detect (e.g., with the input detecting unit), via the touch-sensitive surface unit 904, one or more finger contacts. In some embodiments, the processing unit 910 is configured to detect (e.g., with the input detecting unit 914), via the touch-sensitive surface unit 904, one or more stylus contacts.

In some embodiments, the processing unit 910 is configured to detect (e.g., with the input detecting unit 914), via the touch-sensitive surface unit 904, a set of one or more annotation inputs include one or more underlining inputs at least partially detected at a set of locations below the first portion of the text and the second portion of the text.

In some embodiments, the processing unit 910 is configured to detect (e.g., with the input detecting unit 914), via the touch-sensitive surface unit 904, a set of one or more annotation inputs including one or more strikethrough inputs at least partially detected at a set of locations over the first portion of the text and the second portion of the text.

In some embodiments, the processing unit 910 is configured to detect (e.g., with the input detecting unit 914), via the touch-sensitive surface unit 904, a set of one or more annotation inputs including one or more encircling inputs at least partially detected at a set of locations surrounding the first portion of the text and the second portion of the text.

In some embodiments, the processing unit 910 is configured to detect (e.g., with the input detecting unit 914), via the touch-sensitive surface unit 904, a set of one or more annotation inputs including a first set of one or more annotation inputs detected at locations associated with the first portion of the text, a second set of one or more annotation inputs detected at locations associated with the second portion of the text, and a third set of one or more annotation inputs detected at locations between the first portion of the text and the second portion of the text The processing unit 910 is configured to display (e.g., with the display control unit 912), on the display unit 902, a first representation of an annotation that is associated with both the first portion of the text and the second portion of the text. The processing unit 910 is configured to display (e.g., with the display control unit 912), on the display unit 902, a least a portion of the first representation is proximate to the first portion of the text in the first arrangement and at least a second portion of the first representation proximate to the second portion of the text in the first arrangement.

In some embodiments, such as when the set of one or more annotation inputs includes underlining inputs, the processing unit 910 is configured to display (e.g., with the display control unit 912), on the display unit, 902 at least a portion of the first representation below the first portion of the text in the first arrangement and at least a second portion of the first representation below the second portion of the text in the first arrangement.

In some embodiments, such as when the set of one or more annotation inputs includes strikethrough inputs, the processing unit 910 is configured to display (e.g., with the display control unit 912), on the display unit 902, at least a portion of the first representation over the first portion of the text in the first arrangement and at least a second portion of the first representation over the second portion of the text in the first arrangement.

In some embodiments, such as when the set of one or more annotation inputs includes encircling inputs, the processing unit 910 is configured to display (e.g., with the display control unit 912), on the display unit 902, at least a portion of the first representation surrounding the first portion of the text in the first arrangement and at least a second portion of the first representation surrounding the second portion of the text in the first arrangement.

In some embodiments, the processing unit 910 is configured to display (e.g., with the display control unit 912), on the display unit 902, the first representation with a connector between the first portion of the text and the second portion of the text.

The processing unit 910 is configured to receive (e.g., via the input detecting unit 914) a request to rearrange the text.

The processing unit 910 is configured to, in response to receiving the request to rearrange the text, concurrently display (e.g., with the display control unit 914), on the display unit 902, a second arrangement of the text in which the first portion of the text has a second position with respect to the second portion of the text, wherein the second position is different from the first position, and a second representation of the annotation that is associated with both the first portion of the text and the second portion of the text, wherein the second representation is different from the first representation. The processing unit 910 is configured to display (e.g., with the display control unit 912), on the display unit 902, at least a portion of the second representation proximate to the first portion of the text in the second arrangement and at least a second portion of the second representation proximate to the second portion of the text in the second arrangement.

In some embodiments, such as when the set of one or more annotation inputs includes underlining inputs, the processing unit 910 is configured to display (e.g., with the display control unit 912), on the display unit, 902 at least a portion of the second representation below the first portion of the text in the second arrangement and at least a second portion of the second representation below the second portion of the text in the second arrangement.

In some embodiments, such as when the set of one or more annotation inputs includes strikethrough inputs, the processing unit 910 is configured to display (e.g., with the display control unit 912), on the display unit 902, at least a portion of the second representation over the first portion of the text in the second arrangement and at least a second portion of the second representation over the second portion of the text in the second arrangement.

In some embodiments, such as when the set of one or more annotation inputs includes encircling inputs, the processing unit 910 is configured to display (e.g., with the display control unit 912), on the display unit 902, at least a portion of the second representation surrounding the first portion of the text in the second arrangement and at least a second portion of the second representation surrounding the second portion of the text in the second arrangement.

In some embodiments, the processing unit 910 is configured to display (e.g., with the display control unit 912), on the display unit 902, the second representation with a connector between the first portion of the text and the second portion of the text. In some embodiments, the connector is the same shape as the connector of the first representation.

In some embodiments, the processing unit 910 is configured to display (e.g., with the display control unit 912), on the display unit 902, the second representation having the same shape as the first representation. In some embodiments, the processing unit 910 is configured to display (e.g., with the display control unit 912), on the display unit 902, the second representation as a relocated and resized version of the first representation.

In some embodiments, the processing unit 910 is configured to display (e.g., with the display control unit 912), on the display unit 902, a first portion of the second representation corresponding to a first portion of the first representation proximate to the first portion of the text in the second arrangement and a second portion of the second representation corresponding to a second portion of the first representation proximate to the second portion of the text in the second arrangement.

In some embodiments, the processing unit 910 is configured to display (e.g., with the display control unit 912), on the display unit 902, a first portion of the second representation corresponding to at least a portion of the first representation proximate to the first portion of the text in the second arrangement and a second portion of the second representation corresponding to the at least a portion of the first representation proximate to the second portion of the text in the second arrangement.

In some embodiments, the processing unit 910 is configured to display (e.g., with the display control unit 912), on the display unit 902, the second representation including two separate portions of the first representation merged together.

The operations described above with reference to FIGS. 7A-7D are, optionally, implemented by components depicted in FIGS. 1A-1B or FIG. 9. For example, display operation 702, detect operation 704, display operation 720, receive operation 732, and display operations 734 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device with one or more processors, non-transitory memory, and a touch-sensitive display:
displaying, on the touch-sensitive display, a first arrangement of text in which a first portion of the text has a first position with respect to a second portion of the text;
displaying, on the touch-sensitive display, a first representation of an annotation that is associated with the first portion of the text and the second portion of the text, wherein the first representation of the annotation has a positional relationship with the first and second portions of the text;

displaying, on the touch-sensitive display, a menu-triggering affordance;

in response to detecting a first user input directed to the menu-triggering affordance, displaying a menu that includes a text size decreasing affordance for decreasing a font size of the text, a text size increasing affordance for increasing the font size of the text and a font changing affordance for changing a font style for the text;

detecting a second user input directed to the text size decreasing affordance, the text size increasing affordance or the font changing affordance resulting in a particular font option and a request to rearrange the text based on the particular font option; and in response to detecting the request to rearrange the text, concurrently displaying, on the touch-sensitive display:
- a second arrangement of the text in which the first portion of the text has a second position with respect to the second portion of the text, wherein the second position is different from the first position, and wherein the second arrangement of text is based on the particular font option; and
- a second representation of the annotation that is associated with the first portion of the text and the second portion of the text, wherein the second representation of the annotation is different from the first representation of the annotation, and wherein the second representation of the annotation maintains the positional relationship with the first and second portions of the text, and wherein the second representation of the annotation is based on the particular font option.

2. The method of claim 1, wherein the second representation of the annotation has a same shape as the first representation of the annotation.

3. The method of claim 1, wherein the second representation of the annotation is a relocated and resized version of the first representation of the annotation.

4. The method of claim 1, further comprising:
while the text is displayed in the first arrangement, detecting, via the touch-sensitive display, a set of one or more annotation inputs; and
in response to detecting the set of one or more annotation inputs, displaying the first representation of the annotation.

5. The method of claim 4, wherein:
the set of one or more annotation inputs includes one or more underlining inputs at least partially detected at a set of locations below the first portion of the text and the second portion of the text;
at least a portion of the first representation of the annotation is displayed below the first portion of the text in the first arrangement and at least a portion of the first representation of the annotation is displayed below the second portion of the text in the first arrangement; and
at least a portion of the second representation of the annotation is displayed below the first portion of the text in the second arrangement and at least a portion of the first representation of the annotation is displayed below the second portion of the text in the second arrangement.

6. The method of claim 4, wherein:
the set of one or more annotation inputs includes one or more strikethrough inputs at least partially detected at a set of locations over the first portion of the text and the second portion of the text;
at least a portion of the first representation of the annotation is displayed over the first portion of the text in the first arrangement and at least a portion of the first representation of the annotation is displayed over the second portion of the text in the first arrangement; and
at least a portion of the second representation of the annotation is displayed over the first portion of the text in the second arrangement and at least a portion of the first representation of the annotation is displayed over the second portion of the text in the second arrangement.

7. The method of claim 4, wherein:
the set of one or more annotation inputs includes one or more encircling inputs at least partially detected at a set of locations surrounding the first portion of the text and the second portion of the text;
at least a portion of the first representation of the annotation is displayed surrounding the first portion of the text in the first arrangement and at least a portion of the first representation of the annotation is displayed surrounding the second portion of the text in the first arrangement; and
at least a portion of the second representation of the annotation is displayed surrounding the first portion of the text in the second arrangement and at least a portion of the first representation of the annotation is displayed surrounding the second portion of the text in the second arrangement.

8. The method of claim 4, wherein:
the set of one or more annotation inputs includes a first set of one or more annotation inputs detected at locations associated with the first portion of the text, a second set of one or more annotation inputs detected at locations associated with the second portion of the text, and a third set of one or more annotation inputs detected at locations between the first portion of the text and the second portion of the text;
the first representation of the annotation includes a first connector displayed between the first portion of the text and the second portion of the text in the first arrangement; and
the second representation of the annotation includes a second connector displayed between the first portion of the text and the second portion of the text in the second arrangement.

9. The method of claim 4, wherein detecting the set of one or more annotation inputs includes detecting one or more stylus contacts.

10. The method of claim 4, wherein detecting the set of one or more annotation inputs includes:
detecting an input at a location of an annotations affordance displayed on the touch-sensitive display; and
detecting one or more finger contacts.

11. The method of claim 1, wherein:
the first portion of the text has the first position adjacent to the second portion of the text in the first arrangement;
the first portion of the text has the second position non-adjacent to the second portion of the text in the second arrangement;
a first portion of the second representation of the annotation corresponding to a first portion of the first representation of the annotation is displayed proximate to the first portion of the text in the second arrangement; and a second portion of the second representation of the annotation corresponding to a second portion of the first representation of the annotation is displayed proximate to the second portion of the text in the second arrangement.

12. The method of claim 1, wherein:
the first portion of the text is adjacent to the second portion of the text in the first arrangement;
the first portion of the text is non-adjacent to the second portion of the text in the second arrangement;
a first instance of the second representation of the annotation corresponding to at least a portion of the first representation of the annotation is displayed proximate to the first portion of the text in the second arrangement; and
a second instance of the second representation of the annotation corresponding to the at least a portion of the first representation of the annotation is displayed proximate to the second portion of the text in the second arrangement.

13. The method of claim 1, wherein:
at least a portion of the first representation of the annotation is displayed proximate to the first portion of the text in the first arrangement;
at least a portion of the first representation of the annotation is displayed proximate to the second portion of the text in the first arrangement;
at least a portion of the second representation of the annotation is displayed proximate to the first portion of the text in the second arrangement; and
at least a portion of the second representation of the annotation is displayed proximate to the second portion of the text in the second arrangement.

14. An electronic device comprising:
a display unit configured to display a user interface;
one or more input units configured to receive inputs; and
a processing unit coupled with the display unit and the one or more input units, the processing unit configured to:
display, on the display unit, a first arrangement of text in which a first portion of the text has a first position with respect to a second portion of the text;
display, on the display unit, a first representation of an annotation that is associated with the first portion of the text and the second portion of the text, wherein the first representation of the annotation has a positional relationship with the first and second portions of the text;
display, on the display unit, a menu-triggering affordance;
in response to detecting a first user input directed to the menu-triggering affordance, display a menu that includes a text size decreasing affordance for decreasing a font size of the text, a text size increasing affordance for increasing the font size of the text and a font changing affordance for changing a font style for the text;
detect a second user input directed to the text size decreasing affordance, the text size increasing affordance or the font changing affordance resulting in a particular font option and a request to rearrange the text based on the particular font option; and
in response to detecting the request to rearrange the text, concurrently display, on the display unit:
a second arrangement of the text in which the first portion of the text has a second position with respect to the second portion of the text, wherein the second position is different from the first position, and wherein the second arrangement of text is based on the particular font option; and
a second representation of the annotation that is associated with the first portion of the text and the second portion of the text, wherein the second representation of the annotation is different from the first representation of the annotation, and wherein the second representation of the annotation maintains the positional relationship with the first and second portions of the text, and wherein the second representation of the annotation is based on the particular font option.

15. The electronic device of claim 14, wherein the second representation of the annotation has a same shape as the first representation of the annotation.

16. The electronic device of claim 14, wherein the second representation of the annotation is a relocated and resized version of the first representation of the annotation.

17. The electronic device of claim 14, wherein the processing unit is further configured to:
while the text is displayed in the first arrangement, detect, via the one or more input units, a set of one or more annotation inputs; and
in response to detecting the set of one or more annotation inputs, display the first representation of the annotation.

18. The electronic device of claim 17, wherein:
the set of one or more annotation inputs includes one or more underlining inputs at least partially detected at a set of locations below the first portion of the text and the second portion of the text;
at least a portion of the first representation of the annotation is displayed below the first portion of the text in the first arrangement and at least a portion of the first representation of the annotation is displayed below the second portion of the text in the first arrangement; and
at least a portion of the second representation of the annotation is displayed below the first portion of the text in the second arrangement and at least a portion of the first representation of the annotation is displayed below the second portion of the text in the second arrangement.

19. The electronic device of claim 17, wherein:
the set of one or more annotation inputs includes one or more strikethrough inputs at least partially detected at a set of locations over the first portion of the text and the second portion of the text;
at least a portion of the first representation of the annotation is displayed over the first portion of the text in the first arrangement and at least a portion of the first representation of the annotation is displayed over the second portion of the text in the first arrangement; and
at least a portion of the second representation of the annotation is displayed over the first portion of the text in the second arrangement and at least a portion of the first representation of the annotation is displayed over the second portion of the text in the second arrangement.

20. The electronic device of claim 17, wherein:
the set of one or more annotation inputs includes one or more encircling inputs at least partially detected at a set of locations surrounding the first portion of the text and the second portion of the text;
at least a portion of the first representation of the annotation is displayed surrounding the first portion of the text in the first arrangement and at least a portion of the first representation of the annotation is displayed surrounding the second portion of the text in the first arrangement; and at least a portion of the second representation of the annotation is displayed surrounding the first portion of the text in the second arrangement and at least a portion of the first representation of the annotation is displayed surrounding the second portion of the text in the second arrangement.

21. The electronic device of claim 17, wherein:

the set of one or more annotation inputs includes a first set of one or more annotation inputs detected at locations associated with the first portion of the text, a second set of one or more annotation inputs detected at locations associated with the second portion of the text, and a third set of one or more annotation inputs detected at locations between the first portion of the text and the second portion of the text;

the first representation of the annotation includes a first connector displayed between the first portion of the text and the second portion of the text in the first arrangement; and the second representation of the annotation includes a second connector displayed between the first portion of the text and the second portion of the text in the second arrangement.

22. The electronic device of claim 21, wherein the second connector has a same shape as the first connector.

23. The electronic device of claim 17, wherein, to detect the set of one or more annotation inputs, the processing unit is further configured to:

detect one or more stylus contacts.

24. The electronic device of claim 17, wherein, to detect the set of one or more annotation inputs, the processing unit is further configured to:

detect an input at a location of an annotations affordance displayed on the display unit; and detect one or more finger contacts.

25. The electronic device of claim 14, wherein:

at least a portion of the first representation of the annotation is displayed proximate to the first portion of the text in the first arrangement;

at least a portion of the first representation of the annotation is displayed proximate to the second portion of the text in the first arrangement;

at least a portion of the second representation of the annotation is displayed proximate to the first portion of the text in the second arrangement; and at least a portion of the second representation of the annotation is displayed proximate to the second portion of the text in the second arrangement.

26. The electronic device of claim 14, wherein:

the first portion of the text has the first position adjacent to the second portion of the text in the first arrangement;

the first portion of the text has the second position non-adjacent to the second portion of the text in the second arrangement;

a first portion of the second representation of the annotation corresponding to a first portion of the first representation of the annotation is displayed proximate to the first portion of the text in the second arrangement; and a second portion of the second representation of the annotation corresponding to a second portion of the first representation of the annotation is displayed proximate to the second portion of the text in the second arrangement.

27. The electronic device of claim 14, wherein:

the first portion of the text is adjacent to the second portion of the text in the first arrangement;

the first portion of the text is non-adjacent to the second portion of the text in the second arrangement;

a first instance of the second representation of the annotation corresponding to at least a portion of the first representation of the annotation is displayed proximate to the first portion of the text in the second arrangement; and a second instance of the second representation of the annotation corresponding to the at least a portion of the first representation of the annotation is displayed proximate to the second portion of the text in the second arrangement.

28. The electronic device of claim 14, wherein:

the first portion of the text is non-adjacent to the second portion of the text in the first arrangement;

the first portion of the text is adjacent to the second portion of the text in the second arrangement; and the second representation of the annotation includes two separate portions of the first representation of the annotation merged together.

29. The electronic device of claim 14, wherein, to detect the request, the processing unit is further configured to:

receive the request after displaying the first representation of the annotation.

30. A non-transitory computer readable storage medium storing one or more programs, the one or more programs comprising instructions, which, when executed by an electronic device with a display, and an input device, cause the electronic device to:

display, on the display, a first arrangement of text in which a first portion of the text has a first position with respect to a second portion of the text;

display, on the display, a first representation of an annotation that is associated with the first portion of the text and the second portion of the text, wherein the first representation of the annotation has a positional relationship with the first and second portions of the text;

display, on the display, a menu-triggering affordance;

in response to detecting a first user input directed to the menu-triggering affordance, display a menu that includes a text size decreasing affordance for decreasing a font size of the text, a text size increasing affordance for increasing the font size of the text and a font changing affordance for changing a font style for the text;

detect a second user input directed to the text size decreasing affordance, the text size increasing affordance or the font changing affordance resulting in a particular font option and a request to rearrange the text based on the particular font option; and in response to detecting the request to rearrange the text, concurrently display, on the display:

a second arrangement of the text in which the first portion of the text has a second position with respect to the second portion of the text, wherein the second position is different from the first position, and wherein the second arrangement of text is based on the particular font option; and a second representation of the annotation that is associated with the first portion of the text and the second portion of the text, wherein the second representation of the annotation is different from the first representation of the annotation, and wherein the second representation of the annotation maintains the positional relationship with the first and second portions of the text, and wherein the second representation of the annotation is based on the particular font option.

31. The non-transitory computer readable storage medium of claim 30, wherein the instructions further cause the electronic device to:
while the text is displayed in the first arrangement, detect, via the input device, to set of one or more annotation inputs; and
in response to detecting the set of one or more annotation inputs, display the first representation of the annotation.

32. The non-transitory computer readable storage medium of claim 31, wherein:
the set of one or more annotation inputs includes one or more underlining inputs at least partially detected at a set of locations below the first portion of the text and the second portion of the text;
at least a portion of the first representation of the annotation is displayed below the first portion of the text in the first arrangement and at least a portion of the first representation of the annotation is displayed below the second portion of the text in the first arrangement; and
at least a portion of the second representation of the annotation is displayed below the first portion of the text in the second arrangement and at least a portion of the first representation of the annotation is displayed below the second portion of the text in the second arrangement.

33. The non-transitory computer readable storage medium of claim 31, wherein:
the set of one or more annotation inputs includes one or more strikethrough inputs at least partially detected at a set of locations over the first portion of the text and the second portion of the text;
at least a portion of the first representation of the annotation is displayed over the first portion of the text in the first arrangement and at least a portion of the first representation of the annotation is displayed over the second portion of the text in the first arrangement; and
at least a portion of the second representation of the annotation is displayed over the first portion of the text in the second arrangement and at least a portion of the first representation of the annotation is displayed over the second portion of the text in the second arrangement.

34. The non-transitory computer readable storage medium of claim 31, wherein:
the set of one or more annotation inputs includes one or more encircling inputs at least partially detected at a set of locations surrounding the first portion of the text and the second portion of the text;
at least a portion of the first representation of the annotation is displayed surrounding the first portion of the text in the first arrangement and at least a portion of the first representation of the annotation is displayed surrounding the second portion of the text in the first arrangement;
and at least a portion of the second representation of the annotation is displayed surrounding the first portion of the text in the second arrangement and at least a portion of the first representation of the annotation is displayed surrounding the second portion of the text in the second arrangement.

35. The non-transitory computer readable storage medium of claim 31, wherein:
the set of one or more annotation inputs includes a first set of one or more annotation inputs detected at locations associated with the first portion of the text, a second set of one or more annotation inputs detected at locations associated with the second portion of the text, and a third set of one or more annotation inputs detected at locations between the first portion of the text and the second portion of the text;
the first representation of the annotation includes a first connector displayed between the first portion of the text and the second portion of the text in the first arrangement; and
the second representation of the annotation includes a second connector displayed between the first portion of the text and the second portion of the text in the second arrangement.

36. The non-transitory computer readable storage medium of claim 31, wherein, to detect the set of one or more annotation inputs, the instructions further cause the electronic device to:
detect one or more stylus contacts.

37. The non-transitory computer readable storage medium of claim 31, wherein, to detect the set of one or more annotation inputs, the instructions further cause the electronic device to:
detect an input at a location of an annotations affordance displayed on the display; and
detect one or more finger contacts.

38. The non-transitory computer readable storage medium of claim 30, wherein:
at least a portion of the first representation of the annotation is displayed proximate to the first portion of the text in the first arrangement;
at least a portion of the first representation of the annotation is displayed proximate to the second portion of the text in the first arrangement;
at least a portion of the second representation of the annotation is displayed proximate to the first portion of the text in the second arrangement;
at least a portion of the second representation of the annotation is displayed proximate to the second portion of the text in the second arrangement.

39. The non-transitory computer readable storage medium of claim 30, wherein the second representation of the annotation has a same shape as the first representation of the annotation.

40. The non-transitory computer readable storage medium of claim 30, wherein the second representation of the annotation is a relocated and resized version of the first representation of the annotation.

41. The non-transitory computer readable storage medium of claim 30, wherein:
the first portion of the text has the first position adjacent to the second portion of the text in the first arrangement;
the first portion of the text has the second position non-adjacent to the second portion of the text in the second arrangement;
a first portion of the second representation of the annotation corresponding to a first portion of the first representation of the annotation is displayed proximate to the first portion of the text in the second arrangement; and
a second portion of the second representation of the annotation corresponding to a second portion of the first representation of the annotation is displayed proximate to the second portion of the text in the second arrangement.

42. The non-transitory computer readable storage medium of claim 30, wherein:
- the first portion of the text is adjacent to the second portion of the text in the first arrangement;
- the first portion of the text is non-adjacent to the second portion of the text in the second arrangement;
- a first instance of the second representation of the annotation corresponding to at least a portion of the first representation of the annotation is displayed proximate to the first portion of the text in the second arrangement; and
- a second instance of the second representation of the annotation corresponding to the at least a portion of the first representation of the annotation is displayed proximate to the second portion of the text in the second arrangement.

* * * * *